United States Patent
Bromberg et al.

(10) Patent No.: US 12,233,643 B2
(45) Date of Patent: Feb. 25, 2025

(54) PRINTING ASSEMBLIES AND METHODS FOR USING THE SAME

(71) Applicant: General Electric Company, Schenectady, NY (US)

(72) Inventors: Vadim Bromberg, Niskayuna, NY (US); John Sterle, Clifton Park, NY (US); Carlos H. Bonilla, Lebanon, OH (US); Kwok Pong Chan, Niskayuna, NY (US); Mary Kathryn Thompson, Fairfield Township, OH (US); Ruben E. Fairman, Forest Park, OH (US); Jacob Mayer, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 629 days.

(21) Appl. No.: 17/612,868

(22) PCT Filed: May 22, 2020

(86) PCT No.: PCT/US2020/034189
§ 371 (c)(1),
(2) Date: Nov. 19, 2021

(87) PCT Pub. No.: WO2020/237138
PCT Pub. Date: Nov. 26, 2020

(65) Prior Publication Data
US 2022/0227127 A1 Jul. 21, 2022

Related U.S. Application Data

(60) Provisional application No. 62/851,957, filed on May 23, 2019.

(51) Int. Cl.
*B41J 2/045* (2006.01)

(52) U.S. Cl.
CPC ....... *B41J 2/04505* (2013.01); *B41J 2/04586* (2013.01)

(58) Field of Classification Search
CPC .................................................. B41J 2/04586
See application file for complete search history.

(56) References Cited

U.S. PATENT DOCUMENTS

| 4,034,219 A | 7/1977 | Louden et al. |
| 4,680,895 A | 7/1987 | Roestenberg |
| (Continued) | | |

FOREIGN PATENT DOCUMENTS

| CN | 1980795 A | 6/2007 |
| CN | 103703296 A | 4/2014 |
| (Continued) | | |

OTHER PUBLICATIONS

Chinese Office Action for Application No. 202080052631.1 dated Jan. 31, 2024 (15 pages with English Translation).
(Continued)

*Primary Examiner* — Thinh H Nguyen
(74) *Attorney, Agent, or Firm* — Dinsmore & Shohl LLP

(57) ABSTRACT

An apparatus includes a printing head (154) comprising jet nozzles (158) spaced apart from one another, where a distance from a first jet nozzle to a second jet nozzle positioned adjacent the first jet nozzle defines a jet-spacing, a printing head position control assembly includes a first actuator assembly (102) to move the printing head along the longitudinal axis and a second actuator assembly (103) to move the printing head along a latitudinal axis, and an control unit communicatively coupled to the printing head position control assembly. The control unit causes jet nozzles to dispense drops of binder (50) while the printing head traverses a first pass trajectory along the longitudinal axis in a first direction, indexes the printing head to a second
(Continued)

pass trajectory along the latitudinal axis, and causes jet nozzles to dispense drops of binder while the printing head traverses the second pass trajectory along the longitudinal axis in a second direction.

20 Claims, 34 Drawing Sheets

(56) References Cited

U.S. PATENT DOCUMENTS

| | | | |
|---|---|---|---|
| 4,722,824 | A | 2/1988 | Wiech, Jr. |
| 4,853,717 | A | 8/1989 | Harmon et al. |
| 5,204,055 | A | 4/1993 | Sachs et al. |
| 5,234,636 | A | 8/1993 | Hull et al. |
| 5,387,380 | A | 2/1995 | Cima et al. |
| 5,610,824 | A | 3/1997 | Vinson et al. |
| 5,672,579 | A | 9/1997 | Diaz et al. |
| 5,810,988 | A | 9/1998 | Smith, Jr. et al. |
| 5,847,283 | A | 12/1998 | Finot et al. |
| 5,902,537 | A | 5/1999 | Almquist et al. |
| 5,997,128 | A | 12/1999 | Lou et al. |
| 6,007,318 | A | 12/1999 | Russell et al. |
| 6,146,567 | A | 11/2000 | Sachs et al. |
| 6,158,838 | A | 12/2000 | Capurso |
| 6,159,085 | A | 12/2000 | Hara |
| 6,164,751 | A | 12/2000 | Griffin et al. |
| 6,241,337 | B1 | 6/2001 | Sharma et al. |
| 6,372,178 | B1 | 4/2002 | Tseng |
| 6,375,874 | B1 | 4/2002 | Russell et al. |
| 6,406,122 | B1 | 6/2002 | Sharma et al. |
| 6,416,850 | B1 | 7/2002 | Bredt et al. |
| 6,454,811 | B1 | 9/2002 | Sherwood et al. |
| 6,497,471 | B1 | 12/2002 | Gargir |
| 6,595,618 | B1 | 7/2003 | Roy et al. |
| 6,596,224 | B1 | 7/2003 | Sachs et al. |
| 6,764,636 | B1 | 7/2004 | Allanic et al. |
| 6,896,839 | B2 | 5/2005 | Kubo et al. |
| 6,899,777 | B2 | 5/2005 | Vaidyanathan et al. |
| 6,986,654 | B2 | 1/2006 | Imiolek et al. |
| 6,989,115 | B2 | 1/2006 | Russell et al. |
| 7,037,382 | B2 | 5/2006 | Davidson et al. |
| 7,225,803 | B2 | 6/2007 | Boyadjieff |
| 7,291,002 | B2 | 11/2007 | Russell et al. |
| 7,296,990 | B2 | 11/2007 | Devos et al. |
| 7,387,359 | B2 | 6/2008 | Hernandez et al. |
| 7,389,154 | B2 | 6/2008 | Hunter et al. |
| 7,435,368 | B2 | 10/2008 | Davidson et al. |
| 7,520,740 | B2 | 4/2009 | Wahlstrom et al. |
| 7,665,636 | B2 | 2/2010 | Ederer et al. |
| 7,686,995 | B2 | 3/2010 | Davidson et al. |
| 7,690,909 | B2 | 4/2010 | Wahlstrom |
| 7,700,020 | B2 | 4/2010 | Nielsen et al. |
| 7,736,578 | B2 | 6/2010 | Ederer |
| 7,790,093 | B2 | 9/2010 | Shkolnik et al. |
| 7,824,001 | B2 | 11/2010 | Fienup et al. |
| 7,897,074 | B2 | 3/2011 | Batchelder et al. |
| 7,962,238 | B2 | 6/2011 | Shkolnik et al. |
| 7,979,152 | B2 | 7/2011 | Davidson |
| 8,017,055 | B2 | 9/2011 | Davidson et al. |
| 8,033,812 | B2 | 10/2011 | Collins et al. |
| 8,105,527 | B2 | 1/2012 | Wahlstrom |
| 8,167,395 | B2 | 5/2012 | Fienup et al. |
| 8,185,229 | B2 | 5/2012 | Davidson |
| 8,862,260 | B2 | 10/2014 | Shkolnik et al. |
| 8,979,244 | B2 | 3/2015 | Kritchman et al. |
| 8,997,799 | B2 | 4/2015 | Hodson et al. |
| 9,193,164 | B2 | 11/2015 | Kritchman et al. |
| 9,403,322 | B2 | 8/2016 | Das et al. |
| 9,415,443 | B2 | 8/2016 | Ljungblad et al. |
| 9,434,838 | B2 | 9/2016 | Jung et al. |
| 9,446,448 | B2 | 9/2016 | McCoy et al. |
| 9,561,622 | B2 | 2/2017 | Das et al. |
| 9,586,364 | B2 | 3/2017 | El-Siblani et al. |
| 9,757,831 | B2 | 9/2017 | Ederer et al. |
| 9,912,915 | B2 | 3/2018 | Sinclair |
| 9,956,612 | B1 | 5/2018 | Redding et al. |
| 9,962,767 | B2 | 5/2018 | Buller et al. |
| 10,000,009 | B2 | 6/2018 | Maier |
| 10,022,794 | B1 | 7/2018 | Redding et al. |
| 10,022,795 | B1 | 7/2018 | Redding et al. |
| 10,029,440 | B2 | 7/2018 | Satoh |
| 10,073,434 | B1 | 9/2018 | Hollander |
| 10,232,443 | B2 | 3/2019 | Myerberg et al. |
| 2001/0050448 | A1 | 12/2001 | Kubo et al. |
| 2002/0079601 | A1 | 6/2002 | Russell et al. |
| 2002/0089081 | A1 | 7/2002 | Fong |
| 2003/0151167 | A1* | 8/2003 | Kritchman ............. B33Y 30/00 700/118 |
| 2004/0145623 | A1 | 7/2004 | Choi |
| 2004/0160472 | A1 | 8/2004 | Khalid et al. |
| 2004/0173946 | A1 | 9/2004 | Pfeifer et al. |
| 2004/0263557 | A1 | 12/2004 | Premnath et al. |
| 2006/0098040 | A1 | 5/2006 | Kang |
| 2006/0246222 | A1 | 11/2006 | Winkler |
| 2007/0077323 | A1 | 4/2007 | Stonesmith et al. |
| 2008/0190905 | A1 | 8/2008 | Heinlein |
| 2008/0200104 | A1 | 8/2008 | Chuang |
| 2008/0241404 | A1 | 10/2008 | Allaman et al. |
| 2010/0121476 | A1 | 5/2010 | Kritchman |
| 2010/0151136 | A1 | 6/2010 | Davidson et al. |
| 2011/0074866 | A1 | 3/2011 | Imamura et al. |
| 2011/0190923 | A1 | 8/2011 | Matsui et al. |
| 2012/0274701 | A1 | 11/2012 | Zhou et al. |
| 2013/0000553 | A1 | 1/2013 | Hoechsmann et al. |
| 2013/0108726 | A1 | 5/2013 | Uckelmann et al. |
| 2014/0092172 | A1 | 4/2014 | Koshi et al. |
| 2014/0220168 | A1 | 8/2014 | Perez et al. |
| 2015/0145177 | A1 | 5/2015 | El-Siblani et al. |
| 2015/0151973 | A1 | 6/2015 | Lee et al. |
| 2015/0258706 | A1 | 9/2015 | Okamoto et al. |
| 2015/0266242 | A1 | 9/2015 | Comb et al. |
| 2015/0273762 | A1 | 10/2015 | Okamoto |
| 2015/0343533 | A1 | 12/2015 | Park et al. |
| 2016/0039207 | A1 | 2/2016 | Kritchman et al. |
| 2016/0067929 | A1 | 3/2016 | Park |
| 2016/0075085 | A1 | 3/2016 | Sasaki |
| 2016/0151973 | A1 | 6/2016 | Jover et al. |
| 2016/0214320 | A1 | 7/2016 | Sasaki et al. |
| 2016/0221263 | A1 | 8/2016 | Din et al. |
| 2016/0221269 | A1 | 8/2016 | Okamoto et al. |
| 2016/0325496 | A1 | 11/2016 | De Pena et al. |
| 2016/0325503 | A1 | 11/2016 | Mironets et al. |
| 2016/0332380 | A1 | 11/2016 | De Pena et al. |
| 2016/0342149 | A1 | 11/2016 | Napadensky |
| 2016/0361874 | A1 | 12/2016 | Park et al. |
| 2016/0368054 | A1 | 12/2016 | Ng et al. |
| 2016/0368214 | A1 | 12/2016 | Sasaki et al. |
| 2017/0014911 | A1 | 1/2017 | Ng et al. |
| 2017/0021569 | A1 | 1/2017 | Puigardeu Aramendia et al. |
| 2017/0056974 | A1 | 3/2017 | Miyashita et al. |
| 2017/0072644 | A1 | 3/2017 | Ng et al. |
| 2017/0095980 | A1 | 4/2017 | Kritchman et al. |
| 2017/0100937 | A1 | 4/2017 | Ohnishi |
| 2017/0115594 | A1 | 4/2017 | Martin |
| 2017/0136695 | A1 | 5/2017 | Versluys et al. |
| 2017/0203513 | A1 | 7/2017 | Chanclon et al. |
| 2017/0217104 | A1 | 8/2017 | Cortes I Herms et al. |
| 2017/0239889 | A1 | 8/2017 | Ganapathiappan et al. |
| 2017/0239932 | A1 | 8/2017 | Knecht et al. |
| 2017/0252975 | A1 | 9/2017 | Park |
| 2017/0259456 | A1 | 9/2017 | Sasaki et al. |
| 2017/0305142 | A1 | 10/2017 | Yamaguchi |
| 2017/0318186 | A1 | 11/2017 | Morovic et al. |
| 2017/0326792 | A1 | 11/2017 | Paternoster et al. |
| 2017/0334138 | A1 | 11/2017 | Vilajosana et al. |
| 2017/0341365 | A1 | 11/2017 | De Lajudie et al. |
| 2017/0355137 | A1 | 12/2017 | Ederer et al. |
| 2017/0368756 | A1 | 12/2017 | Sanz Ananos et al. |
| 2018/0001559 | A1 | 1/2018 | Paternoster et al. |
| 2018/0004192 | A1 | 1/2018 | Perret et al. |
| 2018/0009157 | A1 | 1/2018 | Gutierrez et al. |
| 2018/0009167 | A1 | 1/2018 | Alejandre et al. |
| 2018/0011475 | A1 | 1/2018 | Donovan et al. |

(56) References Cited

U.S. PATENT DOCUMENTS

| | | |
|---|---|---|
| 2018/0071820 A1 | 3/2018 | Natarajan et al. |
| 2018/0079137 A1 | 3/2018 | Herzog et al. |
| 2018/0126632 A1 | 5/2018 | Bonatsos et al. |
| 2018/0141271 A1 | 5/2018 | Gunther et al. |
| 2018/0154480 A1 | 6/2018 | Bai et al. |
| 2018/0193947 A1 | 7/2018 | Harding et al. |
| 2018/0200791 A1 | 7/2018 | Redding et al. |
| 2018/0236549 A1 | 8/2018 | Spears et al. |
| 2018/0311898 A1 | 11/2018 | Schwarzbaum et al. |
| 2018/0326660 A1 | 11/2018 | Gifford et al. |
| 2018/0339467 A1 | 11/2018 | Donovan et al. |
| 2018/0370213 A1 | 12/2018 | Gold et al. |
| 2019/0001571 A1 | 1/2019 | Stockett et al. |
| 2019/0022752 A1 | 1/2019 | Twelves, Jr. et al. |
| 2019/0091766 A1 | 3/2019 | Kasperchik et al. |
| 2019/0111619 A1 | 4/2019 | Schalk et al. |
| 2019/0118468 A1 | 4/2019 | Bobar et al. |
| 2019/0126554 A1 | 5/2019 | Iwase |

FOREIGN PATENT DOCUMENTS

| | | |
|---|---|---|
| CN | 204366039 U | 6/2015 |
| CN | 105682930 A | 6/2016 |
| CN | 106862570 A | 6/2017 |
| CN | 107175827 A | 9/2017 |
| CN | 107364126 A | 11/2017 |
| CN | 108165961 A | 6/2018 |
| CN | 108927491 A | 12/2018 |
| DE | 102016215113 A1 | 2/2018 |
| EP | 1018429 A1 | 7/2000 |
| EP | 1108546 A1 | 6/2001 |
| EP | 1270185 A1 | 1/2003 |
| EP | 1440803 A1 | 7/2004 |
| EP | 1946907 A2 | 7/2008 |
| EP | 2543514 A2 | 1/2013 |
| EP | 3168035 A1 | 5/2017 |
| EP | 3205483 A1 | 8/2017 |
| EP | 3486008 A1 | 5/2019 |
| GB | 2550341 A | 11/2017 |
| GB | 2568518 A | 5/2019 |
| JP | H11157087 A | 6/1999 |
| JP | 2001334582 A | 12/2001 |
| JP | 2003508246 A | 3/2003 |
| JP | 2003211687 A | 7/2003 |
| JP | 2005319650 A | 11/2005 |
| JP | 2008086846 A | 4/2008 |
| JP | 2014065179 A | 4/2014 |
| JP | 2014527481 A | 10/2014 |
| JP | 2015174338 A | 10/2015 |
| JP | 2015182428 A | 10/2015 |
| JP | 2015193184 A | 11/2015 |
| JP | 2016093909 A | 5/2016 |
| JP | 2016107543 A | 6/2016 |
| JP | 2016141151 A | 8/2016 |
| JP | 2017508063 A | 3/2017 |
| JP | 2018503543 A | 2/2018 |
| JP | 2018516774 A | 6/2018 |
| JP | 2018520029 A | 7/2018 |
| JP | 2018523595 A | 8/2018 |
| JP | 2018526527 A | 9/2018 |
| WO | 20010117783 A1 | 3/2001 |
| WO | 2015100085 A2 | 7/2015 |
| WO | 2015151832 A1 | 10/2015 |
| WO | 2017023281 A1 | 2/2017 |
| WO | 2017177603 A1 | 10/2017 |
| WO | 2017196337 A1 | 11/2017 |
| WO | 2018026011 A1 | 2/2018 |
| WO | 2018072975 A1 | 4/2018 |
| WO | 2018091007 A1 | 5/2018 |
| WO | 2018143953 A1 | 8/2018 |
| WO | 2018194688 A1 | 10/2018 |
| WO | 2018231205 A1 | 12/2018 |
| WO | 2019027405 A1 | 2/2019 |
| WO | 2019027431 A1 | 2/2019 |
| WO | 2019059099 A1 | 3/2019 |
| WO | 2019066781 A1 | 4/2019 |
| WO | 2019194795 A1 | 10/2019 |
| WO | 2020237161 A1 | 11/2020 |

OTHER PUBLICATIONS

European Patent Office Action for Application No. 20732044.1 dated Dec. 18, 2023 (7 pages).

International Search Report and Written Opinion for application PCT/US2020/034254 mail date Aug. 24, 2020 (14 pages).

International Search Report and Written Opinion for application PCT/US2020/034261 mail date Jan. 29, 2021 (32 pages).

Japanese Office Action for Application No. 2021-567071 dated Nov. 29, 2022 (8 pages).

International Search Report and Written Opinion for application PCT/US2020/034144 mail date Jan. 13, 2021 (22 pages).

International Search Report and Written Opinion for application PCT/US2020/034207 mail date Sep. 1, 2020 (16 pages).

International Search Report and Written Opinion for application PCT/US2020/034205 mail date Nov. 13, 2020 (23 pages).

Japanese Patent Office Action for Application No. 2021-567073 dated Dec. 6, 2022 (5 pages).

International Search Report and Written Opinion for application PCT/US2020/034189 mail date Oct. 1, 2020 (24 pages).

International Search Report and Written Opinion for application PCT/US2020/034204 mail date Sep. 2, 2020 (15 pages).

International Search Report and Written Opinion for application PCT/US2020/034244 mail date Nov. 12, 2020 (23 pages).

Hewlett Packard Thermal Inkjet Printhead information sheet, undated (1 page).

International Search Report and Written Opinion for application PCT/US2020/034145 mail date Dec. 1, 2020 (21 pages).

International Search Report and Written Opinion for application PCT/US2020/034259 mail date of Dec. 1, 2020 (23 pages).

International Search Report and Written Opinion application PCT/US2020/034142 mail date Aug. 20, 2020 (15 pages).

International Search Report and Written Opinion for application PCT/US2020/034141 mail date Aug. 20, 2020 (27 pages).

Mercedes-Benz USA: "Magic Vision Control—Mercedes-Benz Windshield Wipers", YouTube, dated Nov. 21, 2013 (Nov. 21, 2013), pp. 1-1, XP054980752, Retrieved from the Internet: URL:https://www.youtube.com/watch?v=07AZHkkLROk [retrieved on Aug. 5, 2020] 0:13-0:40.

International Search Report and Written Opinion for application PCT/US2020/034140 mail date Nov. 27, 2020 (21 pages).

Hewlett Packard HP LaserJet Pro M404 Series information sheet, undated, https://www8.hp.com/h20195/v2/GetPDF.aspx/4AA7-4955EEP.pdf (5 pages).

"Solution Preparation Guidelines" The Sekisui Chemical Group, httpswww.sekisui-sc.comwp-contentuploadsSelvoIPVOH_SolutionPreparationGuidelines_EN.pdf.

Cooke et al., "Process Intermittent Measurement for Powder-Bed Based Additive Manufacturing" National Institute of Standards and Technology, Gaithersburg, MD 208991, Institute for Research In Electronics and Applied Physics, University of Maryland, College Park, MD 20742-3511., Aug. 17, 2011.

Hong et al., "Solvent Effect on Structural Change of Poly(vinyl alcohol) Physical Gels" Journal of Applied Polymer Science • Sep. 1998, DOI: 10.1002/(SICI)1097-4628(19980919)69:123.0.CO;2-U.

Shanjani et al., "Material Spreading and Compaction in Powder-Based Solid Freeform Fabrication Methods: Mathematical Modeling" Department of Mechanical and Mechatronics Engineering, University of Waterloo, 200 University Avenue West Waterloo, ON N2L 3G1, Canada, Sep. 10, 2008.

Sparrow, "Evonik, Voxeljet partner to develop 3D-printing systems for series production of finished plastic parts", Plastics Today, Nov. 10, 2019, https://www.plasticstoday.com/3d-printing/evonik-voxeljet-partner-develop-3d-printing-systems-series-production-finished-plastic.

"Advanced DLP For Superior 3D Printing" EnvisionTec, Mar. 9, 2017.

(56) References Cited

OTHER PUBLICATIONS

European Patent Office Action for Application No. 20735467.1 dated Mar. 16, 2023 (4 pages).
European Patent Office Action for Application No. 20732377.5 dated Mar. 9, 2023 (5 pages).

* cited by examiner

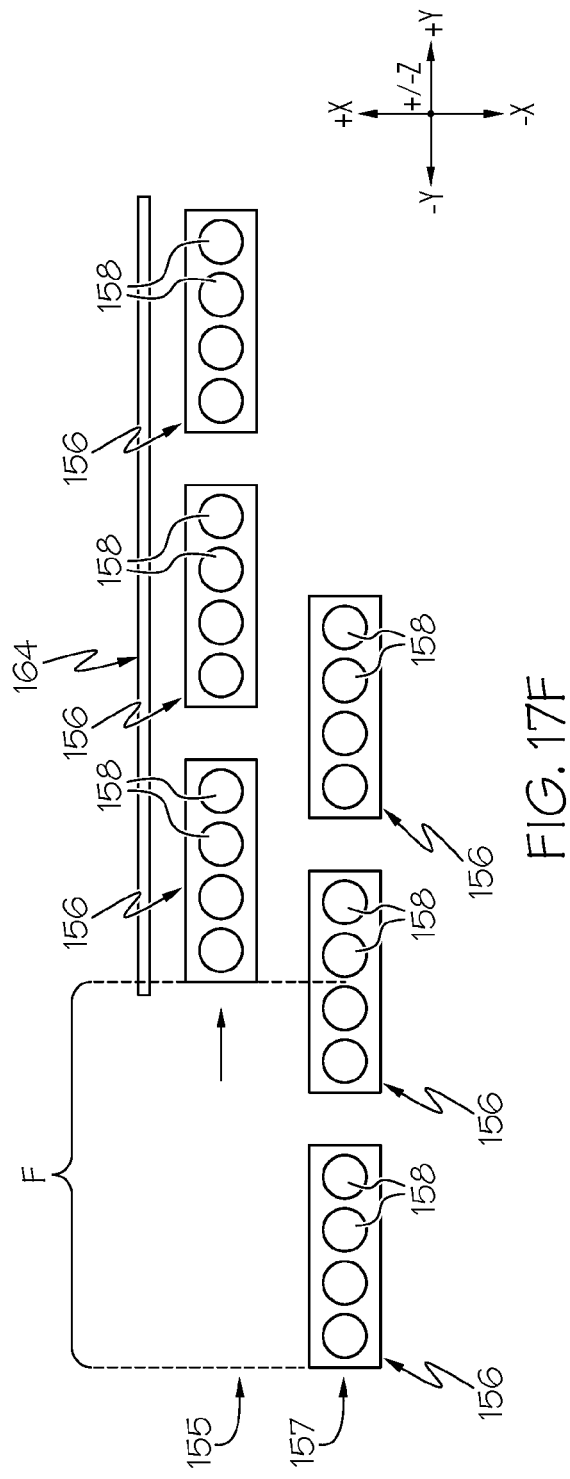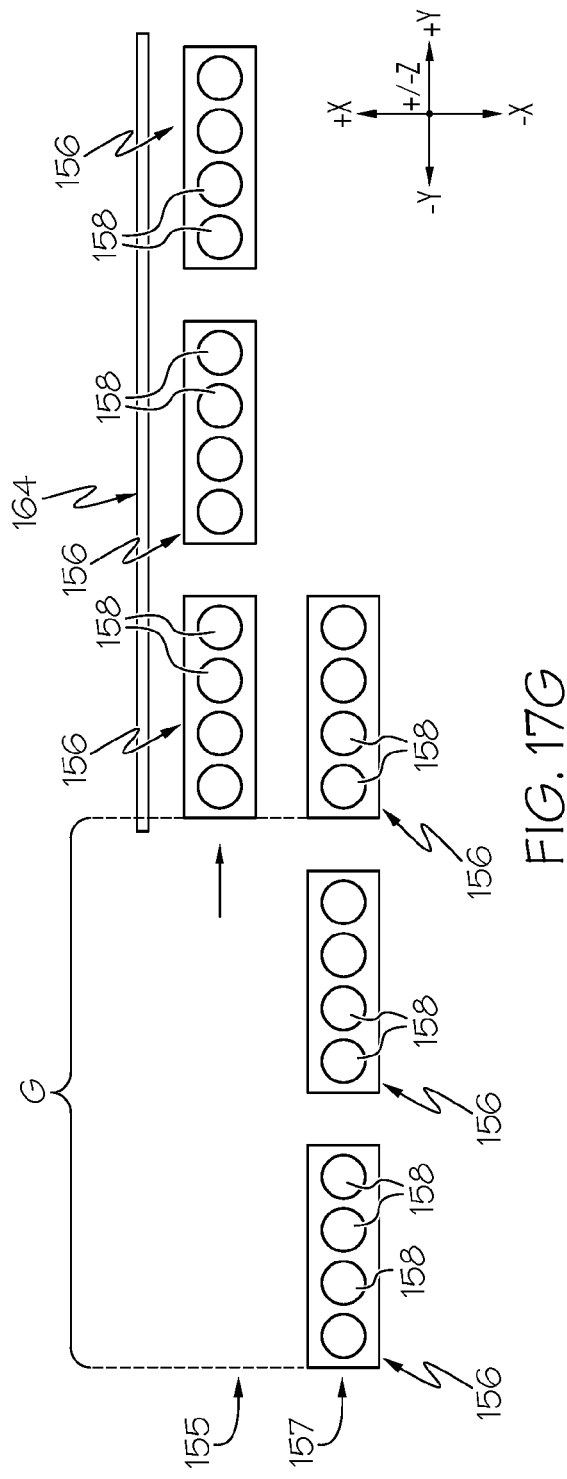

PRINTING ASSEMBLIES AND METHODS FOR USING THE SAME

CROSS-REFERENCE TO RELATED APPLICATIONS

The present application is a National Stage Entry of International Application No. PCT/US2020/034189 filed on May 22, 2020 entitled "Printing Assemblies and Methods for Using the Same" which claims the benefit of U.S. Provisional Application Ser. No. 62/851,957, titled "Printing Assemblies and Methods for Using the Same," filed May 23, 2019, the contents of which are hereby incorporated by reference in their entireties.

BACKGROUND

Field

The present specification generally relates to printing assemblies and, more specifically, to printing assemblies for manufacturing apparatuses and methods for using the same.

Technical Background

Printing assemblies may be utilized to "build" an object from build material, such as three-dimensional objects or parts, in a layer-wise manner. Early iterations of printing assemblies were used for prototyping three-dimensional parts. However, as printing assembly technology has improved, there is an increased interest in utilizing printing assemblies for large-scale commercial production of parts. Issues of scaling printing assemblies to commercial production may include, but are not limited to, improving a through-put of printing assemblies to meet commercial demands, increasing a resolution quality and yield of a print performance of the printing assembly, and providing dynamic adjustment of a resolution or quantity of material(s) disposed from the printing assembly during an active print cycle.

Generally, printing assemblies utilized in various contexts, including, for example, manufacturing applications, inkjet printing applications, and other printing types include parallel issues to those described above. For example, manufacturing apparatuses generally include printing assemblies, also referred to as print head devices, which deposit materials through an array of jet nozzles during a manufacturing process. With each respective image pixel of the printed-part typically receiving a material from a single corresponding jet nozzle, an interruption in the depositing process may result in a defect of the part built by the apparatus. Interruptions to depositing the material may be due to various causes, such as, for example, a misfire or clogging of a jet nozzle.

Accordingly, a need exists for alternative printing assemblies and components thereof, which improve manufacturing throughput.

SUMMARY

A first aspect A1 includes a printing assembly includes a first print head row comprising a first plurality of print heads sequentially spaced apart from one another in a direction transverse to a working axis, with each of the first plurality of print heads comprising a plurality of nozzles. The printing assembly includes a second print head row comprising a second plurality of print heads sequentially spaced apart from one another in the direction transverse to the working axis, with each of the second plurality of print heads comprising a plurality of nozzles, wherein the first print head row and the second print head row are spaced apart along the working axis. The printing assembly further includes an actuator coupled to a first print head of the first plurality of print heads, with the actuator configured to move the first print head relative to at least a second print head of the second plurality of print heads in the direction transverse to the working axis.

A second aspect A2 includes the printing assembly of the first aspect A1, wherein the actuator is coupled to the first plurality of print heads and configured to move the first plurality of print heads in unison relative to the second print head of the second plurality of print heads in the direction transverse to the working axis.

A third aspect A3 includes the printing assembly of any of the foregoing aspects A1-A2, further comprising a second actuator coupled to the second print head of the second plurality of print heads, the second actuator configured to move the second print head relative to the first print head in the direction transverse to the working axis.

A fourth aspect A4 includes the printing assembly of any of the foregoing aspects A1-A3, wherein the actuator is coupled to the first plurality of print heads and configured to move the first plurality of print heads in unison relative to the second plurality of print heads in the direction transverse to the working axis.

A fifth aspect A5 includes the printing assembly of any of the foregoing aspects A1-A4, further comprising a second actuator coupled to the second plurality of print heads and configured to move the second plurality of print heads in unison relative to the first plurality of print heads in the direction transverse to the working axis A sixth aspect A6 includes the printing assembly of any of the foregoing aspects A1-A5, wherein the actuator is configured to move the first print head such that a spacing between the first print head and an adjacent print head in the first print head row of print heads is changed.

A seventh aspect A7 includes the printing assembly of any of the foregoing aspects A1-A6, wherein the actuator is further configured to move the first print head such that a height between the first print head and a platform is changed.

An eight aspect A8 includes the printing assembly of any of the foregoing aspects A1-A7, wherein the actuator is one of a plurality of actuators, wherein each actuator of the plurality of actuators is coupled to a print head of the first plurality of print heads such that each print head of the first plurality of print heads is movable relative to the second print head of the second plurality of print heads.

A ninth aspect A9 includes the printing assembly of any of the foregoing aspects A1-A8, further comprising a third print head row comprising a third plurality of print heads sequentially spaced apart from one another in the direction transverse to the working axis, each of the third plurality of print heads comprising a plurality of nozzles.

A tenth aspect A10 includes the printing assembly of any of the foregoing aspects A1-A9, further comprising a second actuator coupled to the second print head of the second plurality of print heads, the second actuator configured to move the second print head relative to the first print head in the direction transverse to the working axis.

An eleventh aspect A11 includes the printing assembly of any of the foregoing aspects A1-A10, further comprising a third actuator coupled to a third print head of the third plurality of print heads, the third actuator configured to move the third print head relative to at least the second print head row in the direction transverse to the working axis, wherein the second print head row is disposed between the first print head row and the third print head row.

A twelfth aspect A12 includes the printing assembly of any of the foregoing aspects A1-A11, further comprising a third actuator coupled to a third print head of the third plurality of print heads, the third actuator configured to move the third print head relative to the first print head in the direction transverse to the working axis, wherein the second print head row is disposed between the first print head row and the third print head row, and wherein the print heads of the second plurality of print heads are fixed relative to the first plurality of print heads and the third plurality of print heads.

A thirteenth aspect A13 includes the printing assembly of any of the foregoing aspects A1-A12, wherein the first print head row is disposed between the second print head row and the third print head row, and wherein the print heads of the second plurality of print heads and of the third print head row are fixed relative to the first print head row.

A fourteenth aspect A14 includes the printing assembly of any of the foregoing aspects A1-A13, wherein the actuator is a fine actuator configured to move the first print head relative to the second print head in the direction transverse to the working axis at a fine degree of movement resolution.

A fifteenth aspect A15 includes the printing assembly of any of the foregoing aspects A1-A14, wherein the actuator is a coarse actuator configured to move the first print head relative to the second print head in the direction transverse to the working axis at a coarse degree of movement resolution.

A sixteenth aspect A16 includes the printing assembly of any of the foregoing aspects A1-A15, wherein the actuator is further configured to rotate the first print head about a vertical axis transverse to the print direction.

A seventeenth aspect A17 includes the printing assembly of any of the foregoing aspects A1-A16, wherein at least one print head of the first plurality of print heads overlaps with at least one print head of the second plurality of print heads in the direction of the working axis.

An eighteenth aspect A18 includes the printing assembly of any of the foregoing aspects A1-A17, further comprising a control system communicatively coupled to the actuator, the control system comprising a processor and a non-transitory memory storing computer readable and executable instructions that, when executed by the processor, cause the control system to:
  map a pixel of a printed layer to a set of nozzles of the print heads; send a signal to the actuator to move the first print head relative to the second print head in the direction transverse to the working axis; and remap each pixel of the printed layer to a different set of nozzles of the print heads after the first print head is moved.

A nineteenth aspect A19 includes a manufacturing apparatus comprising: a build area; a printing assembly; and an actuator assembly for moving the printing assembly in a direction along a working axis relative to the build area, wherein the printing assembly comprises: a support bracket; a first print head row comprising a first plurality of print heads sequentially spaced apart from one another in a direction transverse to the working axis; a second print head row comprising a second plurality of print heads sequentially spaced apart from one another in the direction transverse to the working axis, wherein the first print head row and the second print head row are spaced apart along a working axis; and an actuator coupled to a first print head of the first plurality of print heads, the actuator configured to move the first print head relative to the support bracket in the direction transverse to the working axis.

A twentieth aspect A20 includes the manufacturing apparatus of the nineteenth aspect A19, further comprising a fluid reservoir, wherein: each of the first plurality of print heads comprising a plurality of nozzles in fluid communication with the fluid reservoir; and each of the second plurality of print heads comprising a plurality of nozzles in fluid communication with the fluid reservoir.

A twenty-first aspect A21 includes the manufacturing apparatus of any of the foregoing aspects A19-A20, further comprising a first fluid reservoir containing a first material and a second fluid reservoir containing a second material different than the first material, wherein: each of the first plurality of print heads comprising a plurality of nozzles in fluid communication with the first fluid reservoir; and each of the second plurality of print heads comprising a plurality of nozzles in fluid communication with the second fluid reservoir.

A twenty-second aspect A22 includes the manufacturing apparatus of any of the foregoing aspects A19-A21, further comprising a first fluid reservoir containing a first material and a second fluid reservoir containing a second material different than the first material, wherein: a plurality of nozzles of a first subset of the first plurality of print heads are in fluid communication with the first fluid reservoir; and a plurality of nozzles of a second subset of the first plurality of print heads are in fluid communication with the second fluid reservoir, wherein the first subset of the first plurality of print heads is different than the second subset of the first plurality of print heads.

A twenty-third aspect A23 includes the manufacturing apparatus of any of the foregoing aspects A19-A22, wherein the actuator is coupled to the first plurality of print heads and configured to move the first plurality of print heads in unison relative to the support bracket in the direction transverse to the working axis.

A twenty-fourth aspect A24 includes the manufacturing apparatus of any of the foregoing aspects A19-A23, further comprising: a second actuator coupled to a second print head of the second plurality of print heads, the second actuator configured to move the second print head relative to the support bracket in the direction transverse to the working axis.

A twenty-fifth aspect A25 includes the manufacturing apparatus of any of the foregoing aspects A19-A24, wherein the actuator is coupled to the first plurality of print heads and configured to move the first plurality of print heads in unison relative to the support bracket in the direction transverse to the working axis, the printing assembly further comprising: a second actuator coupled to the second plurality of print heads and configured to move the second plurality of print heads in unison relative to the support bracket in the direction transverse to the working axis.

A twenty-sixth aspect A26 includes a method comprising: moving a printing assembly in a direction along a working axis relative to a build area with an actuator assembly, the printing assembly comprising: a first print head row comprising a first plurality of print heads sequentially spaced apart from one another in a direction transverse to the working axis, and a second print head row comprising a second plurality of print heads sequentially spaced apart from one another in the direction transverse to the working axis, wherein the first print head row and the second print head row are spaced apart along the working axis; depositing material with the printing assembly as the printing assembly moves in the direction along the working axis; moving the first print head row relative to the support bracket in the direction transverse to the working axis; and after moving the first print head row relative to the support bracket, moving the printing assembly along the working axis and depositing additional material with the printing assembly.

A twenty-seventh aspect A27 includes the method of the twenty-sixth aspect A26, wherein the printing assembly deposits material as the printing assembly moves along the working axis in a forward direction before moving the first print head row relative to the support bracket, and the printing assembly deposits material with the printing assembly as the printing assembly moves along the working axis in a reverse direction opposite the forward direction after moving the first print head row relative to the support bracket.

A twenty-eight aspect A28 includes the method of any of the foregoing aspects A16-A27, wherein the printing assembly deposits material with the printing assembly in a first pass as the printing assembly moves along the working axis in a forward direction before moving the first print head row relative to the support bracket, and the printing assembly deposits material with the printing assembly in a second pass as the printing assembly moves along the working axis in the forward direction after moving the first print head row relative to the support bracket.

A twenty-ninth aspect A29 includes the method of any of the foregoing aspects A16-A28, wherein the first print head row is moved relative to the support bracket such that a spacing between a plurality of nozzles of the first plurality of print heads of the first print head row and a plurality of nozzles of the second plurality of print heads of the print head row is changed in the direction transverse to the working axis.

A thirtieth aspect A30 includes the method of any of the foregoing aspects A16-A29, wherein the first print head row is moved relative to the support bracket such that the spacing between the plurality of nozzles of the first plurality of print heads of the first print head row and the plurality of nozzles of the second plurality of print heads of the second print head row is changed in a random manner in the direction transverse to the working axis.

A thirty-first aspect A31 includes the method of any of the foregoing aspects A16-A30, further comprising monitoring the printing assembly depositing material by a control system as the printing assembly moves in the direction along the working axis, wherein the first print head row is moved relative to the support bracket in response to the control system determining an error by the printing assembly depositing material such that the first print head row remains fixed until the error is determined by the control system.

A thirty-second aspect A32 includes the method of any of the foregoing aspects A16-A31, further comprising transmitting a signal from the control system to the printing assembly upon determining the error to thereby initiate movement of the first print head row relative to the support bracket in the direction transverse to the working axis.

A thirty-third aspect A33 includes the method of any of the foregoing aspects A16-A32, wherein the first print head row is moved relative to the support bracket such that a degree of overlap between the first plurality of print heads of the first print head row and the second plurality of print heads of the second print head row is changed in the direction transverse to the working axis.

A thirty-fourth aspect A34 includes the method of any of the foregoing aspects A16-A33, wherein a first material is deposited on a first set of pixels from a first subset of print heads as the printing assembly moves in the direction along the working axis, before moving the first print head row relative to the support bracket.

A thirty-fifth aspect A35 includes the method of any of the foregoing aspects A16-A34, wherein a second material is deposited on a second set of pixels from a second subset of print heads as the printing assembly moves in the direction along the working axis, before moving the first print head row relative to the support bracket.

A thirty-sixth aspect A36 includes the method of any of the foregoing aspects A16-A35, wherein the first material is deposited on the second set of pixels from the first subset of print heads, after moving the first print head row relative to the support bracket; and the second material is deposited on the first set of pixels from the first subset of print heads, after moving the first print head row relative to the support bracket.

A thirty-seventh aspect A37 includes the method of any of the foregoing aspects A16-A36, wherein the first print head row is moved relative to the support bracket in the direction transverse to the working axis based on a signal output by at least one sensor.

A thirty-eight aspect A38 includes the method of any of the foregoing aspects A16-A37, wherein the first print head row is moved relative to the support bracket in the direction transverse to the working axis based on a geometry of a pattern to be printed.

A thirty-ninth aspect A39 includes a manufacturing apparatus, comprising a printing head comprising a plurality of jet nozzles spaced apart from one another in a direction transverse to a longitudinal axis, wherein a distance from a first jet nozzle to a second jet nozzle positioned adjacent the first jet nozzle of the plurality of jet nozzles defines a jet-spacing; a printing head position control assembly comprising a first actuator assembly configured to move the printing head along the longitudinal axis and a second actuator assembly configured to move the printing head along a latitudinal axis; and an electronic control unit communicatively coupled to the printing head position control assembly, the electronic control unit is configured to: cause select ones of the plurality of jet nozzles to dispense one or more drops of binder while the printing head traverses a first pass trajectory along the longitudinal axis in a first direction, index the printing head to a second pass trajectory along the latitudinal axis by an index distance greater than zero and less than the jet-spacing, and cause select ones of the plurality of jet nozzles to dispense one or more drops of binder while the printing head traverses the second pass trajectory along the longitudinal axis in a second direction opposite the first direction.

A fortieth aspect A40 includes the manufacturing apparatus of the thirty-ninth aspect A39, wherein multiple drops of binder are dispensed within a pixel defining a 2-dimensional spatial portion of a layer of build material traversed by the printing head.

A forty-first aspect A41 includes the manufacturing apparatus of the fortieth aspect A40, wherein the multiple drops of binder dispensed within the pixel vary in drop volume.

A forty-second aspect A42 includes the manufacturing apparatus of the fortieth aspect A40, wherein the multiple drops of binder dispensed within the pixel vary in drop volume and location within the pixel.

A forty-third aspect A43 includes the manufacturing apparatus of any of the foregoing aspects A40-A42, wherein a total amount of binder predefined for dispensing within a pixel is dispensed in fractions of the total amount of binder over at least two passes of the printing head.

A forty-fourth aspect A44 includes the manufacturing apparatus of any of the foregoing aspects A40-A43, wherein the index distance is one-half the jet-spacing.

A forty-fifth aspect A45 includes the manufacturing apparatus of any of the foregoing aspects A40-A44, wherein the index distance is an integer multiple of a fractional value of the jet-spacing.

A forty-sixth aspect A46 includes the manufacturing apparatus of any of the foregoing aspects A40-A45, wherein the printing head comprises a first print head row comprising a plurality of print heads sequentially spaced apart from one another in a direction transverse to a working axis, the manufacturing apparatus further comprising an actuator coupled to a first print head of the plurality of print heads, the actuator configured to move the first print head along a latitudinal axis.

A forty-seventh aspect A47 includes the manufacturing apparatus of the forty-sixth aspect A46, wherein the electronic control unit is further configured to: index one or more of the plurality of print heads to the second pass trajectory along the latitudinal axis by an index distance greater than zero and less than the jet-spacing.

A forty-eighth aspect A48 includes the manufacturing apparatus of the forty-seventh aspect A47, wherein the actuator is one of a plurality of actuators, wherein each actuator of the plurality of actuators is coupled to a print head of the plurality of print heads.

A forty-ninth aspect A49 includes a manufacturing apparatus, comprising at least one printing head comprising a plurality of jet nozzles spaced apart from one another in a direction transverse to a longitudinal axis, wherein a distance from a first jet nozzle to a second jet nozzle positioned adjacent the first jet nozzle of the plurality of jet nozzles defines a jet-spacing; a printing head position control assembly comprising a first actuator configured to move the printing head along the longitudinal axis and a second actuator configured to move the printing head along a latitudinal axis; and an electronic control unit communicatively coupled to the printing head position control assembly, the electronic control unit is configured to: cause select ones of the plurality of jet nozzles to dispense one or more drops of binder to a powder layer in a deposition pattern defined by a slicing engine as the printing head traverses along the longitudinal axis applying binder, wherein the first jet nozzle of the plurality of jet nozzles corresponds to a first trajectory assigned by the slicing engine, index the printing head by an index distance along the latitudinal axis such that the first jet nozzle corresponds to a second pass trajectory and another jet nozzle corresponds to the first trajectory assigned by the slicing engine, and cause the indexed printing head to traverse along the longitudinal axis and apply binder to the powder layer in the deposition pattern defined by the slicing engine.

A fiftieth aspect A50 includes the manufacturing apparatus of the forty-ninth aspect A49, wherein the step of indexing the printing head along the latitudinal axis occurs between a first pass and a second pass over the same layer of powder.

A fifty-first aspect A51 includes the manufacturing apparatus of any of the aspects A49-A50, wherein the step of indexing the printing head along the latitudinal axis occurs between after application of binder to a first layer of powder and before application of binder to a subsequent layer of powder.

A fifty-second aspect A52 includes the manufacturing apparatus of any of the aspects A49-A51, further comprising an in situ monitoring system configured to: determine a malfunction of one or more jet nozzles of the plurality of jet nozzles, and provide a notification signal to the electronic control unit identifying the one or more malfunctioning jet nozzles.

A fifty-third aspect A53 includes the manufacturing apparatus of the aspect A52, wherein the electronic control unit is further configured to: develop one or more indexing commands for indexing the printing head between predefined passes such that a malfunctioning jet nozzle is configured to not traverse the same trajectory during consecutive passes while determined to be in a malfunctioning state.

A fifty-fourth aspect A54 includes the manufacturing apparatus of the aspect A52, wherein the electronic control unit is further configured to: develop a one or more indexing commands for indexing the printing head between predefined passes such that a malfunctioning jet nozzle does not traverse a trajectory defining an edge of the deposition pattern for a printed part.

A fifty-fifth aspect A55 includes the manufacturing apparatus of any of the aspects A49-A54, wherein the slicing engine defines at least the predetermined number of layers and the deposition pattern of binder for printing a part.

A fifty-sixth aspect A56 includes the manufacturing apparatus of any of the aspects A49-A55, further comprising: wherein the printing head comprises a first print head row comprising a plurality of print heads sequentially spaced apart from one another in a direction transverse to a working axis; and an actuator coupled to a first print head of the plurality of print heads, the actuator configured to move the first print head along a latitudinal axis.

A fifty-seventh aspect A57 includes the manufacturing apparatus of aspect A56, wherein the electronic control unit is further configured to: index one or more of the plurality of print heads to the second pass trajectory along the latitudinal axis by an index distance along the latitudinal axis such that the first jet nozzle corresponds to the second pass trajectory and another jet nozzle corresponds to the first trajectory assigned by the slicing engine.

A fifty-eighth aspect A58 includes the manufacturing apparatus of any of the aspect A56, wherein the actuator is one of a plurality of actuators, wherein each actuator of the plurality of actuators is coupled to a print head of the plurality of print heads.

A fifty-ninth aspect A59 includes a manufacturing apparatus, comprising: a printing head comprising a plurality of jet nozzles spaced apart from one another in a direction transverse to a longitudinal axis; a printing head position control assembly comprising a first actuator configured to move the printing head along the longitudinal axis; and an electronic control unit communicatively coupled to the printing head position control assembly, the electronic control unit configured to: cause select ones of the plurality of jet nozzles to dispense a predetermined volume of binder to a powder layer in a deposition pattern defined by a slicing engine as the printing head traverses the longitudinal axis applying binder, wherein an amount of binder dispensed in a first portion of powder in a first layer is less than the amount of binder dispensed in a portion of powder in a second layer located above the first portion of powder in the first layer.

A sixtieth aspect A60 includes the manufacturing apparatus of aspect A59, wherein the amount of binder dispensed in successive vertically aligned portions of powder in subsequent layers of powder progressively increases to a predetermined volume.

A sixty-first aspect A61 includes the manufacturing apparatus of any of the foregoing aspects A59-A60, wherein the amount of binder dispensed in successive vertically aligned portions of powder in subsequent layers of powder progressively increases over an attenuation length defined by a predetermined number of layers of powder.

A sixty-second aspect A62 includes the manufacturing apparatus of any of the foregoing aspects A59-A61, wherein the amount of binder dispensed in successive vertically aligned portions of powder in subsequent layers of powder progressively increases over an attenuation length defined by a predetermined number of layers of powder when the predetermined number of layers is greater than a predetermined thickness threshold.

A sixty-third aspect A63 includes the manufacturing apparatus of any of the foregoing aspects A59-A62, wherein the amount of binder dispensed in successive vertically aligned portions of powder in subsequent layers is based upon one or more properties of a powder material.

A sixty-fourth aspect A64 includes the manufacturing apparatus of any of the foregoing aspects A59-A63, wherein the amount of binder dispensed in successive vertically aligned portions of powder in subsequent layers is based upon a packing density of a powder material.

A sixty-fifth aspect A65 includes the manufacturing apparatus of any of the foregoing aspects A59-A64, wherein the amount of binder dispensed in successive vertically aligned portions of powder in subsequent layers is based upon an amount of time a binder wicks before setting.

According to another embodiment, a manufacturing apparatus includes a build area, a printing assembly, and an actuator assembly for moving the printing assembly in a direction along a working axis relative to the build area. The printing assembly includes a support bracket, a first print head row comprising a first plurality of print heads sequentially spaced apart from one another in a direction transverse to the working axis, and a second print head row comprising a second plurality of print heads sequentially spaced apart from one another in the direction transverse to the working axis. The first print head row and the second print head row are spaced apart along a working axis. The printing assembly further includes an actuator coupled to a first print head of the first plurality of print heads, the actuator configured to move the first print head relative to the support bracket in the direction transverse to the working axis.

According to another embodiment, a method includes moving a printing assembly in a direction along a working axis relative to a build area with an actuator assembly. The printing assembly includes a first print head row comprising a first plurality of print heads sequentially spaced apart from one another in a direction transverse to the working axis, and a second print head row comprising a second plurality of print heads sequentially spaced apart from one another in the direction transverse to the working axis. The first print head row and the second print head row are spaced apart along the working axis. The method includes depositing material with the printing assembly as the printing assembly moves in the direction along the working axis, moving the first print head row relative to the support bracket in the direction transverse to the working axis, and after moving the first print head row relative to the support bracket, moving the printing assembly along the working axis and depositing additional material with the printing assembly.

Additional features and advantages of the manufacturing apparatuses described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 17F schematically depicts an embodiment of a printing assembly for a manufacturing apparatus, with a first print head row of print heads coupled to a coarse actuator for moving the first print head row according to one or more embodiments shown and described herein;

FIG. 17G schematically depicts an embodiment of a printing assembly for a manufacturing apparatus, with a first print head row of print heads coupled to a coarse actuator for moving the first print head row according to one or more embodiments shown and described herein;

DETAILED DESCRIPTION

Figure 1A:
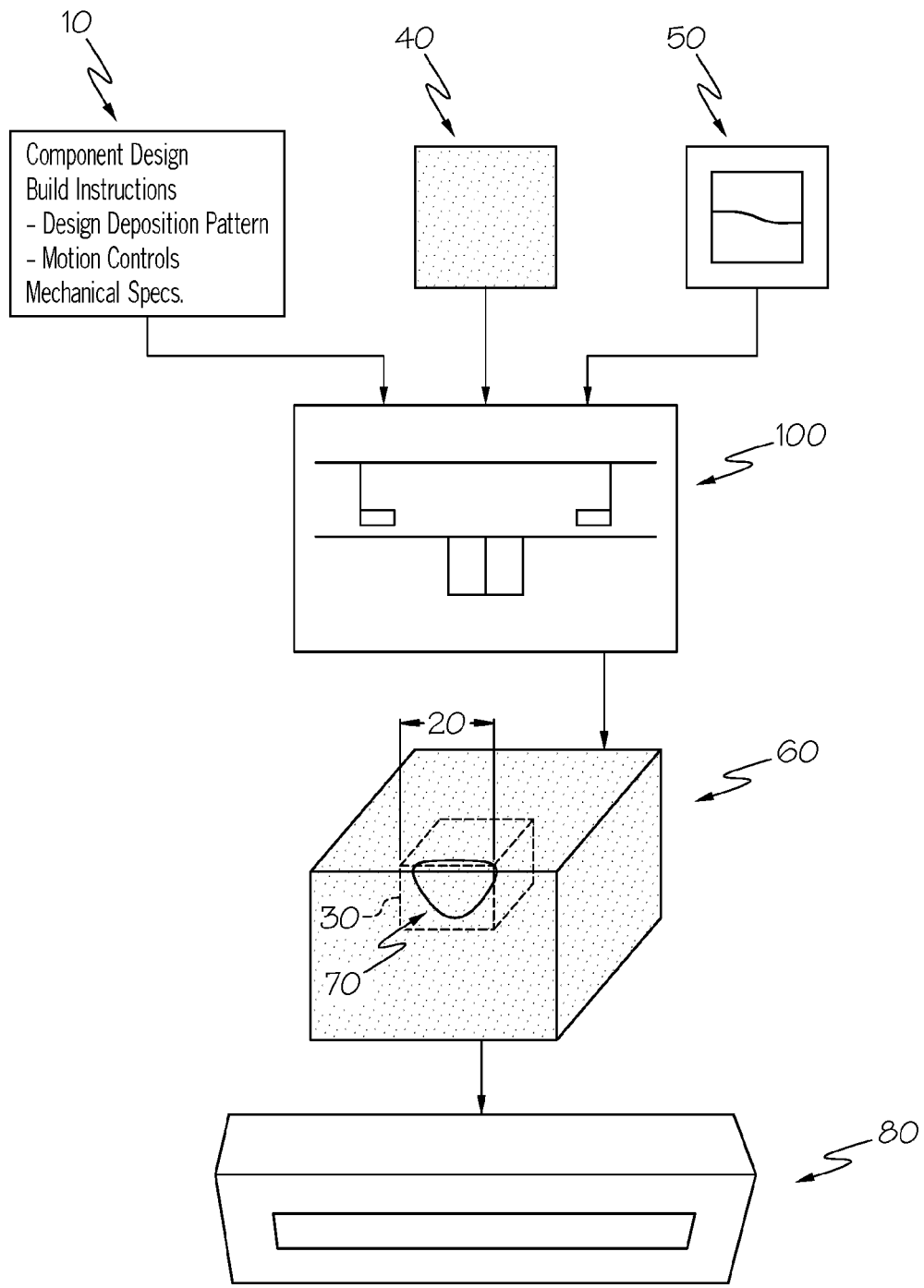
FIG. 1A depicts an illustrative process flow diagram for building a component using manufacturing apparatuses and manufacturing methods according to one or more embodiments shown and described herein.
Figure 1B:
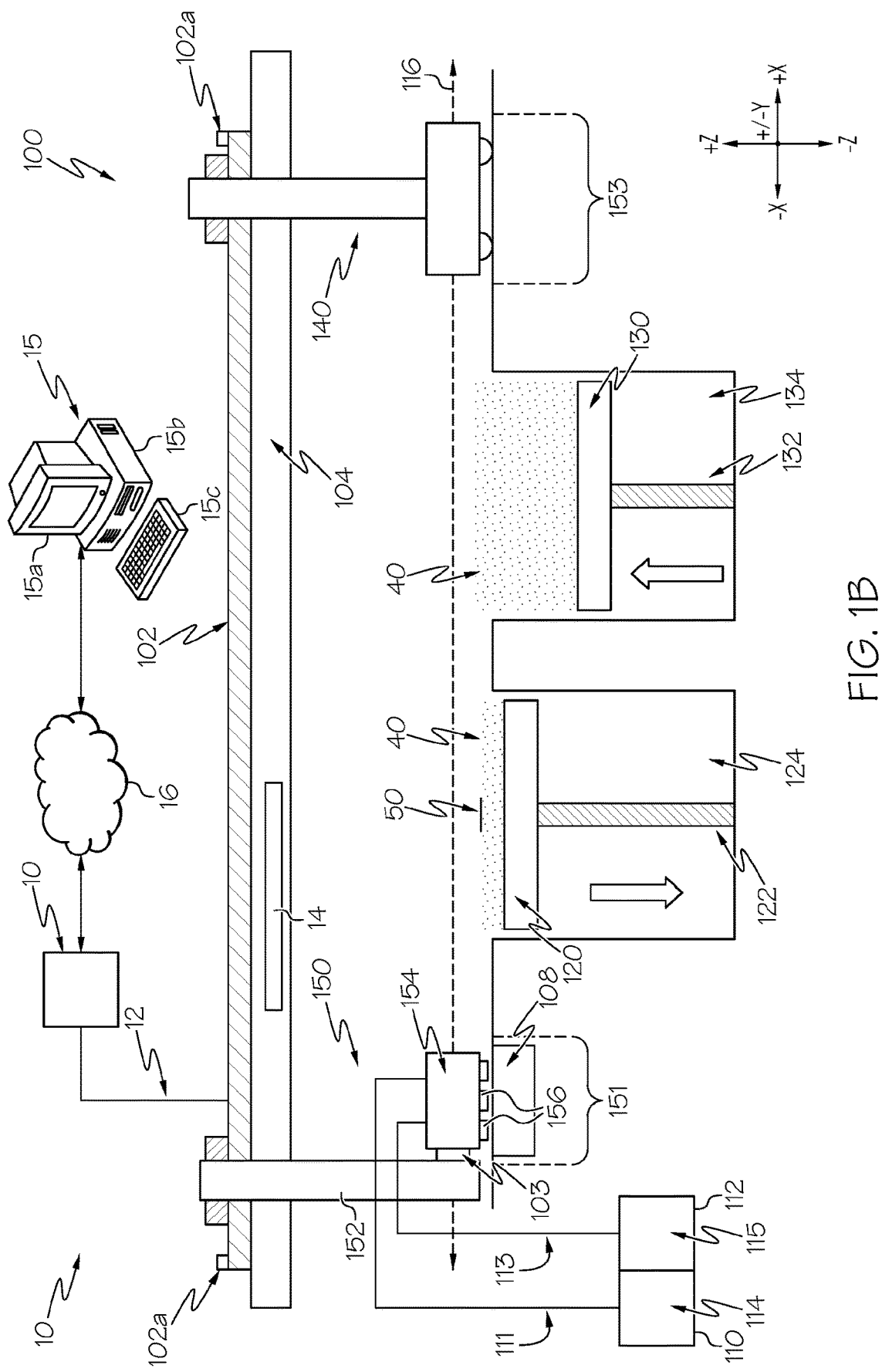
FIG. 1B schematically depicts a manufacturing apparatus according to one or more embodiments shown and described herein.
Figure 1C:
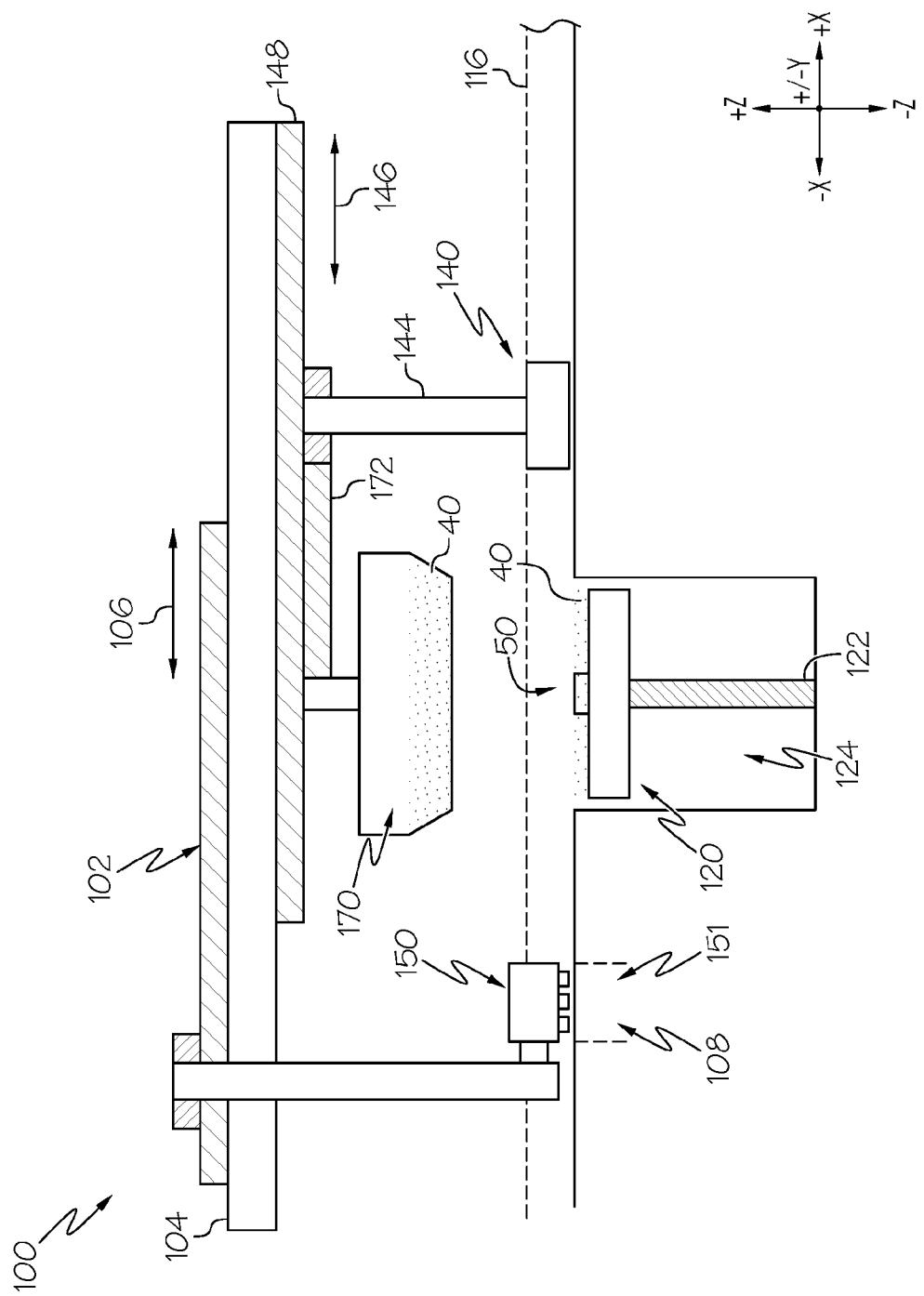
FIG. 1C schematically depicts another manufacturing apparatus according to one or more embodiments shown and described herein.

Reference will now be made in detail to embodiments of manufacturing apparatuses, and components thereof, examples of which are illustrated in the accompanying drawings. Whenever possible, the same reference numerals will be used throughout the drawings to refer to the same or like parts. One embodiment of a manufacturing apparatus comprises a printing assembly for depositing a material is schematically depicted in FIGS. 1A-1C. The printing assembly may generally include a support bracket, a first print head row comprising a plurality of print heads that are sequentially arranged and spaced apart from one another in a direction that is transverse to a working axis of the apparatus. Each of the first plurality of print heads comprises a plurality of jet nozzles for depositing the material.

The printing assembly may further include a second print head row comprising a second plurality of print heads sequentially arranged and spaced apart from one another in a direction that is transverse to a working axis of the apparatus. Each of the second plurality of print heads comprises a plurality of jet nozzles for further depositing the material. The first print head row and the second print head row are spaced apart along the working axis. The printing assembly may further include an actuator that is coupled to a first print head of the first plurality of print heads, the actuator being configured to move the first print head relative to the support bracket in a direction that is transverse to the working axis of the apparatus.

Various embodiments of printing assemblies for manufacturing apparatuses, manufacturing apparatuses comprising the printing assemblies, and methods for using the same are described in further detail herein with specific reference to the appended drawings. It should be understood that the embodiments of the manufacturing apparatuses shown and described herein may be configured and operable to build three-dimensional and/or non-three dimensional objects or parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein, for example up, down, right, left, front, back, top, above, bottom, forward, reverse, and return are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The embodiments described herein are directed to manufacturing apparatuses (e.g., additive manufacturing apparatuses) and components for manufacturing apparatuses, specifically printing assemblies for depositing binder, build material (e.g., organic or inorganic powder) and/other jettable composition materials in manufacturing apparatuses. The embodiments described herein may be implemented to provide, for example, a redundancy of material deposits, improved printing resolution, dynamic material resolution adjustments, dynamic build size adjustments, and multi-material depositions by the manufacturing apparatus to promote jetting reliability and resolution by increasing a probability that each image pixel (e.g., DPI grid point) of a three-dimensional object built by the additive manufacturing process receives a proper amount of said material thereon. It should be understood that redundancy in an image transfer process relates to the number of dedicated jet nozzles available to deposit material for each image pixel. Furthermore, it is understood that technology developed and described herein relates to manufacturing, however, aspects of the technology may have application in related industries such as 2-D printing or the like.

Referring to FIG. 1A, an illustrative process flow diagram for building a component 80 using manufacturing apparatuses 100 and manufacturing methods is depicted. FIG. 1A is intended to provide a non-limiting overview of the manufacturing apparatuses 100 and manufacturing methods depicted and described in detail herein. The apparatus 100 is configured to perform one or more predefined operations as prescribed by build instructions that are executed by a control system 10.

As used herein, "build instructions" refer to the control commands for manipulating the operation of the apparatus 100 to build a component 80. The build instructions are defined by, for example, design deposition patterns for each layer of the component 80 to be built and a plurality of motion controls defining commands setting forth an ordered operation of motors, actuators, printing assemblies, jet nozzles, and various other components of the apparatus to build the component 80. The build instructions are defined based on a component design or model and mechanical specifications of the apparatus 100. For example, an apparatus 100 may include predefined and fixed distance between jet nozzles within a print head, referred to herein as "jet-spacing." Embodiments described herein provide techniques for printing a component 80 using sub jet-spacing indexing to deliver a high degree of distribution of binder that is otherwise not achievable unless the jet-spacing is reduced thus increasing the complexity and cost of a print head. In other words, for example, jet nozzles of a print head having a jet-spacing of 400 DPI (dots per inch) may achieve greater than 400 DPI deposition of binder through sub jet-spacing indexing as described herein.

The apparatus 100 further receives build material 40 and binder 50 that may be deposited layer-by-layer and drop-by-drop, respectively, according to the build instructions for building the component 80. For example, the apparatus 100 may form a layer of powder 60 (also referred to herein as a layer of build material) in a build area 120 (FIG. 1B) and then deposit one or more drops of binder 70 within a pixel 20 thereby forming a voxel 30. "Build material" may include one or more organic and/or inorganic materials that when combined with a binder, and optionally a source of energy, cures to form a portion of a component 80.

As used herein, a "pixel" refers to a 2-dimensional spatial portion of the object or part to-be-printed by the apparatus 100, and in particular, a current slice or layer of the three-dimensional part relative to its positioning along the build area. Each pixel corresponds to an image pixel defined in the design deposition pattern of the build instructions. The image pixel is the digital representation of a pixel. The image pixel includes a width defined by the jet-spacing of the jet nozzles of the apparatus 100. As used herein, a "voxel" refers to a 3-dimensional spatial portion of the powder in the build area defined by the one or more drops of binder deposited within the pixel forming the current slice or layer of the three-dimensional part (e.g., the component 80). It is understood that a voxel may not be cubic as the shape of the shape of the voxel depends on the wicking and curing behavior of the binder with the build material (e.g., the layer of powder that binder is deposited in).

Binder 50 may be deposited in various amounts at various locations within the layer of powder 60 (e.g. build material) in the form of droplets. The locations and amounts of the droplets are defined in the "design deposition pattern," which refers to a collection of image pixels forming the pattern of the desired slice of the build file, and when applied to by the apparatus 100 to the layer of powder 60 defines an "applied deposition pattern." While the design deposition pattern defines the amount (e.g., the "drop volume") and location (e.g., the location of the center of the droplet of binder on the layer of powder 60), the applied deposition pattern refers to the distribution of the binder through the layer or layers of powder, which may include overlap into adjacent pixels or lower layers of powder. (See FIG. 21D). As used herein, "drop volume" refers to the volume of the binder droplet that is released from a jet at one time. Multiple drops can be released for a single pixel, and the drops may vary in drop volume. After the formation of one or more layers of powder 60 and deposition of one or more droplets of binder 50, the apparatus 100 forms a component 80. More specific methods for forming the component 80 and embodiments of the apparatus 100 will now be described in detail.

Referring now to FIG. 1B, an embodiment of a manufacturing apparatus 100 is schematically depicted. The apparatus 100 includes a cleaning station 108, a build area 120, a supply platform 130, a recoat assembly 140, and a printing assembly 150. The recoat assembly 140 and the printing assembly 150 are coupled to a rail 104 of the apparatus 100 and are configured to translate along the rail 104 in response to an actuation of a first actuator assembly 102. In some embodiments, the rail 104 may be rectangular or square in vertical cross section (i.e., a cross section in the Y-Z plane of the coordinate axes depicted in the figures) while in other embodiments the rail 104 may have an "I" configuration in vertical cross section (i.e., a cross section in the Y-Z plane of the coordinate axes depicted in the figures). The first actuator assembly 102 may be constructed to facilitate independent control of the recoat assembly 140 and the printing assembly 150 along a working axis 116 of the apparatus 100. The working axis 116 is also referred to herein as the "longitudinal axis" (i.e., extending along the +/−X-axis as depicted in the figures). This allows for the recoat assembly 140 and the printing assembly 150 to traverse the working axis 116 of the apparatus 100 in the same direction and/or in opposite directions and for the recoat assembly 140 and the printing assembly 150 to traverse the working axis 116 of the apparatus 100 at different speeds and/or the same speed. Independent actuation and control of the recoat assembly 140 and the printing assembly 150, in turn, allows for at least some steps of a manufacturing process (e.g., additive manufacturing process) to be performed simultaneously thereby reducing the overall cycle time of the manufacturing process to less than the sum of the cycle time for each individual step. In other embodiments, the apparatus 100 may include additional actuator assemblies coupled to the recoat assembly 140, the printing assembly 150, and/or the like.

In some embodiments, a second actuator assembly 103 may be constructed to facilitate independent control of the printing assembly 150 along a latitudinal axis (i.e., extending along the +/−Y-axis as depicted in the figures), which is generally perpendicular to the longitudinal axis (i.e., the working axis 116). As described in more detail herein, the second actuator assembly 103 may provide fine movement of the printing assembly 150 along the longitudinal axis, herein referred to as indexing. The first actuator assembly 102 and the second actuator assembly 103 are generally referred to as printing head position control assembly. That is, the printing head position control assembly includes the first actuator assembly 102 configured to move the printing head along the longitudinal axis and a second actuator assembly 103 configured to move the printing head along a latitudinal axis. The printing head position control assembly may be controlled via signals generated by a control system 10 such as an electronic control unit. The electronic control unit may include a processor and a non-transitory computer readable memory.

In some embodiments, the first actuator assembly 102 includes a position sensor 102a that provides the electronic control unit with position information of the recoat assembly 140 and/or the printing assembly 150 in a feedback control signal such that the electronic control unit may track the position of the recoat assembly 140 and/or the printing assembly 150 in response to the provided control signals. In some instances, the electronic control unit may make adjustments to the control signal provided to the first actuator assembly 102 based on the position information provided by the position sensor. In embodiments, the position sensor may be an encoder, an ultrasonic sensor, a light-based sensor, a magnetic sensor, or the like embedded in or coupled to the first actuator assembly 102.

As noted above, in the embodiments described herein the recoat assembly 140 and the printing assembly 150 are both located on the working axis 116 of the apparatus 100. As such, the movements of the recoat assembly 140 and the printing assembly 150 on the working axis 116 occur along the same axis and are thus co-linear. With this configuration, the recoat assembly 140 and the printing assembly 150 may occupy the same space (or portions of the same space) along the working axis 116 of the apparatus 100 at different times during a single build cycle. In other embodiments, the components of the manufacturing apparatus 100 traversing the working axis 116, such as the recoat assembly 140, the printing assembly 150, or the like, need not be centered on the working axis 116. In this instance, at least two of the components of the manufacturing apparatus 100 are arranged with respect to the working axis 116 such that, as the components traverse the working axis 116, the components could occupy the same or an overlapping volume along the working axis 116.

The recoat assembly 140 is constructed to facilitate a distribution of a build material 40 over the build area 120 and the supply platform 130. As will be described in greater detail herein, the printing assembly 150 is constructed to facilitate a deposition of a binder material 50 and/or other jettable composition materials (e.g., ink, fluid medium, nanoparticles, fluorescing particles, sintering aids, anti-sintering aids, things, etc.) over the build area 120 as the printing assembly 150 traverses the build area 120 along a working axis 116 of the apparatus 100. In the embodiments of the apparatus 100 described herein, the working axis 116 of the apparatus 100 is parallel to the +/−X axis of the coordinate axes depicted in the figures. In the embodiments described herein the cleaning station 108, the build area 120, the supply platform 130, the recoat assembly 140, and the printing assembly 150 are positioned in series along the working axis 116 of the apparatus 100 between a home position 151 of the printing assembly 150, located proximate an end of the working axis 116 in the −X direction, and a home position 153 of the recoat assembly 140, located proximate an end of the working axis 116 in the +X direction. That is, the home position 151 of the printing assembly 150 and the home position 153 of the recoat assembly 140 are spaced apart from one another in a horizontal direction that is parallel to the +/−X axis of the coordinate axes depicted in the figures and at least the build area 120 and the supply platform 130 are positioned therebetween. In the embodiments, the build area 120 is positioned between the cleaning station 108 and the supply platform 130 along the working axis 116 of the apparatus 100.

Still referring to FIG. 1B, the cleaning station 108 is positioned proximate one end of the working axis 116 of the apparatus 100 and is co-located with the home position 151 where the printing assembly 150 is located or "parked" before and after depositing a binder material 50 on a layer of build material 40 positioned on the build area 120. The cleaning station 108 may include one or more cleaning sections to facilitate cleaning the printing assembly 150, and in particular, a plurality of print heads 156 of the printing assembly 150 between depositing operations. The cleaning sections may include, for example and without limitation, a soaking station containing a cleaning solution for dissolving excess binder material 50 from the plurality of print heads 156, a wiping station for removing excess binder material 50 from the plurality of print heads 156, a jetting station for purging binder material 50 and/or cleaning solution from the plurality of print heads 156, a capping station for maintaining moisture in a plurality of jet nozzles 158 of the plurality of print heads 156, or various combinations thereof. The printing assembly 150 may be transitioned between the cleaning sections by the first actuator assembly 102. In some embodiments, the apparatus 100 may include a jetting test area positioned proximate to one end of the working axis 116 adjacent to the cleaning station 108 and/or the home position 151. Although not shown, it should be understood that the jetting test area of the apparatus 100 may be configured to facilitate a material deposition by the printing assembly 150 prior to performing a deposition along the build area 120.

The build area 120 is coupled to a build platform actuator 122 to facilitate raising and lowering the build area 120 relative to the working axis 116 of the apparatus 100 in a vertical direction (i.e., a direction parallel to the +/−Z directions of the coordinate axes depicted in the figures). The build platform actuator 122 may be, for example and without limitation, a mechanical actuator, an electro-mechanical actuator, a pneumatic actuator, a hydraulic actuator, or any other actuator suitable for imparting linear motion to the build area 120 in a vertical direction. Suitable actuators may include, without limitation, a worm drive actuator, a ball screw actuator, a pneumatic piston, a hydraulic piston, an electro-mechanical linear actuator, or the like. The build area 120 and build platform actuator 122 are positioned in a build receptacle 124 located below the working axis 116 (i.e., in the −Z direction of the coordinate axes depicted in the figures) of the apparatus 100. During operation of the apparatus 100, the build area 120 is retracted into the build receptacle 124 by action of the build platform actuator 122 after each layer of binder material 50 is deposited on the build material 40 located on the build area 120.

Still referring to FIG. 1B, the supply platform 130 is coupled to a supply platform actuator 132 to facilitate raising and lowering the supply platform 130 relative to the working axis 116 of the apparatus 100 in a vertical direction (i.e., a direction parallel to the +/−Z directions of the coordinate axes depicted in the figures). The supply platform actuator 132 may be, for example and without limitation, a mechanical actuator, an electro-mechanical actuator, a pneumatic actuator, a hydraulic actuator, or any other actuator suitable for imparting linear motion to the supply platform 130 in a vertical direction. Suitable actuators may include, without limitation, a worm drive actuator, a ball screw actuator, a pneumatic piston, a hydraulic piston, an electro-mechanical linear actuator, or the like. The supply platform 130 and supply platform actuator 132 are positioned in a supply receptacle 134 located below the working axis 116 (i.e., in the −Z direction of the coordinate axes depicted in the figures) of the apparatus 100. During operation of the apparatus 100, the supply platform 130 is raised relative to the supply receptacle 134 and towards the working axis 116 of the apparatus 100 by action of the supply platform actuator 132 after a layer of build material 40 is distributed from the supply platform 130 to the build area 120, as will be described in further detail herein. However, it should be understood that, in other embodiments, the apparatus 100 does not include a supply platform 130, such as in embodiments where build material is supplied to the build area 120 with, for example and without limitation, a build material hopper (see FIG. 1C).

The printing assembly 150 comprises, among other features, a support bracket 152, a printing head 154, and a plurality of print heads 156. The support bracket 152 is movably coupled to the rail 104 and the first actuator assembly 102 of the apparatus 100 while the printing head 154 is positioned along an opposite end of the support bracket 152 and movably coupled thereto via a second actuator assembly 103 configured to operably index the printing head along a latitudinal axis. As described in greater detail herein, the printing head 154 of the printing assembly 150 may include two or more rows of a plurality of print heads 156 and in some embodiments, at least one of which is movable relative to another row of a plurality of print heads 156. This allows for at least the material deposit steps of the manufacturing process to be performed with enhanced jetting reliability and jetting resolution by varying a relative location of the at least one movable row of print heads 156.

However, in some embodiments the printing assembly 150 includes a plurality of print heads 156, which may optionally comprise a plurality of jet nozzles 158. The plurality of jet nozzles 158 are spaced apart from one another in a direction transverse to a longitudinal axis, where a distance from a first jet nozzle to a second jet nozzle positioned adjacent the first jet of the plurality of jets defines a jet-spacing, as described in more detail herein.

Still referring to FIG. 1B, the manufacturing apparatus 100 may further include a control system 10 communicatively coupled to the first actuator assembly 102, the second actuator assembly 103 (collectively referred to herein as the printing head position control assembly), the recoat assembly 140, and/or the printing assembly 150. As described in greater detail herein, in some embodiments the control system 10 may be particularly coupled to one or more actuators (e.g. 160, FIG. 4) of the printing assembly 150. In the present example the control system 10 is coupled to the apparatus 100 via a communication conduit 12, however, it should be understood that in other embodiments the control system 10 may be communicatively coupled to the apparatus 100 via various other means or systems, such as, for example, through a wireless connection. The control system 10, which may also be referred to as an electronic control unit, comprises a processor and a non-transitory memory that includes computer readable and executable instructions stored thereon. Any action of the apparatus 100, including the actions described herein, may be caused to be performed by the computer readable and executable instructions (e.g., build instructions defining the sliced files and/or deposition patterns for layers of the component to be built, as described in more detail herein) stored in the non-transitory memory of the control system 10 when executed by the processor of the control system 10. For example, one or more actuators of the first actuator assembly 102 (e.g., mechanical actuators, electro-mechanical actuators, pneumatic actuators, hydraulic actuators, worm drive actuators, ball screw actuators, pneumatic pistons, hydraulic pistons, electro-mechanical linear actuators, etc.) may be actuated by the computer readable and executable instructions stored in the non-transitory memory of the control system 10 when executed by the processor of the control system 10 to cause the printing assembly 150 and/or the recoat assembly 140 to move in the manner described herein.

Furthermore, as described in greater detail below, the computer readable and executable instructions stored in the non-transitory memory may cause the control system 10 to, when executed by the processor, perform various processes for moving the printing assembly 150, actuating the one or more actuators 160 of the printing assembly 150 to move the rows of print heads 156, depositing materials onto the build material 40 (e.g., powder or other material) in the build area 120, and the like.

In some embodiments, the control system 10 may be further communicatively coupled to a computing device 15, optionally via a network 16, or directly via a communication link such as a wired or wireless connection. The computing device 15 may include a display 15*a*, a processing unit 15*b* (e.g., having at least a processor and memory) and an input device 15*c*, each of which may be communicatively coupled together and/or to the network 16. The computing device 15 may be configured to carry out processes such as generating executable instruction for building a component with the apparatus 100. The process may implement CAD or other related three-dimensional drafting and rendering systems as well as a slicing engine or the like. A slicing engine may be logic configured to receive a model or drawing of a component for building and process the model or drawing into build instructions defining a plurality of motion control operations, powder layer placements, deposition patterns for binder, and the like to be performed by the apparatus 100 to build the component. The slicing engine may determine the number of layers of powder a build should include as well as locations within the layers of powder that binder should be dispensed. The deposition patterns of binder may also include defining the amount (volume) of binder that is to be dispensed at particular locations within the layer of powder.

In some embodiments, the network 16 is a personal area network that utilizes Bluetooth technology to communicatively couple the control system 10. In other embodiments, the network 16 may include one or more computer networks (e.g., a personal area network, a local area network, or a wide area network), cellular networks, satellite networks, and/or a global positioning system and combinations thereof. Accordingly, the control system 10 and/or the apparatus 100 can be communicatively coupled to the network 16 via wires, via a wide area network, via a local area network, via a personal area network, via a cellular network, via a satellite network, or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The apparatus 100 further includes one or more fluid reservoirs fluidly coupled to the printing assembly 150 via one or more conduit lines. In some embodiments, the printing assembly 150 may also include one or more local fluid manifolds for locally storing fluid. In particular, the one or more fluid reservoirs may be fluidly coupled to the plurality of print heads 156 disposed within the printing head 154 of the printing assembly 150. In this instance, a plurality of jet nozzles 158 of each of the plurality of print heads 156 (see FIGS. 2-20) are in fluid communication with a material stored within the one or more fluid reservoirs. FIG. 1B depicts the one or more fluid reservoirs as including a first fluid reservoir 110 containing a first material 114 stored therein and a second fluid reservoir 112 containing a second material 115 stored therein, where the first material 114 is different than the second material 115. The first fluid reservoir 110 is in fluid communication with the plurality of print heads 156 in the printing head 154 via a first conduit 111 and the second fluid reservoir 112 is in fluid communication with the plurality of print heads 156 in the printing head 154 via a second conduit 113. In some embodiments, the first fluid reservoir 110 and the second fluid reservoir 112 may contain the same material. In some embodiments, the plurality of print heads 156 of the printing head 154 may be coupled to a single fluid reservoir containing the same material such that the plurality of print heads 156 is configured to deposit the same material.

As will be described in greater detail herein, in some embodiments, the first fluid reservoir 110 is coupled to a different subset (i.e., a first subset) of the plurality of print heads 156 than the second fluid reservoir 112 (i.e., a second subset) such that the plurality of print heads 156 collectively receive and dispense each of the first material 114 and the second material 115, but each of the plurality of print heads 156 of the printing assembly 150 receive and dispense one of the first material 114 or the second material 115. In other embodiments, the first conduit line 111 and the second conduit line 113 may be coupled to one another at a coupling mechanism, such as, for example, a manifold, a valve, and/or the like. In this instance, the fluid reservoirs 110, 112 are in fluid communication with the coupling mechanism via the conduits lines 111, 113, where the coupling mechanism includes a third conduit line coupled thereto and extending to the printing head 154. The coupling mechanism may be configured to selectively transition fluid communication between the fluid reservoirs 110, 112 and the printing head 154 such that the plurality of print heads 156 receive one of the first material 114 or the second material 115 in response to an actuation of the coupling mechanism. It should be understood that the coupling mechanism may be further configured to facilitate simultaneous fluid communication of the first fluid reservoir 110 and the second fluid reservoir 112 with the printing head 154 such that the plurality of print heads 156 receive both materials 114, 115 concurrently.

Referring to FIG. 1C, in some embodiments, the manufacturing apparatus 100 comprises a cleaning station 108, and a build area 120, as described herein with respect to FIG. 1B. However, in the embodiment depicted in FIG. 1C, the manufacturing apparatus 100 does not include a supply receptacle and/or platform. Instead, the apparatus 100 comprises a build material hopper 170 that is used to supply build material 40 to the build area 120. In this embodiment, the build material hopper 170 is coupled to a recoat assembly transverse actuator 148 such that the build material hopper 170 traverses along a recoat motion axis 146 with the recoat assembly 140. In the embodiment depicted in FIG. 1C, the build material hopper 170 is coupled to a support bracket 144 of the recoat assembly 140 with, for example, a bracket 172. However, it should be understood that the build material hopper 170 may be directly coupled to the support bracket 144 of the recoat assembly 140 without an intermediate bracket. Alternatively, the build material hopper 170 may be coupled to the recoat assembly 140 either directly or with an intermediate bracket.

The build material hopper 170 may include an electrically actuated valve (not depicted) to release build material 40 onto the build area 120 as the build material hopper 170 traverses over the build area 120. In embodiments, the valve may be communicatively coupled to the control system 10 (i.e. electronic control unit) which executes computer readable and executable instructions to open and close the valve based on the location of the build material hopper 170 with respect to the build area 120. The build material 40 released onto the build area 120 is then distributed over the build area 120 with the recoat assembly 140 as the recoat assembly 140 traverses over the build area 120.

Figure 1D:
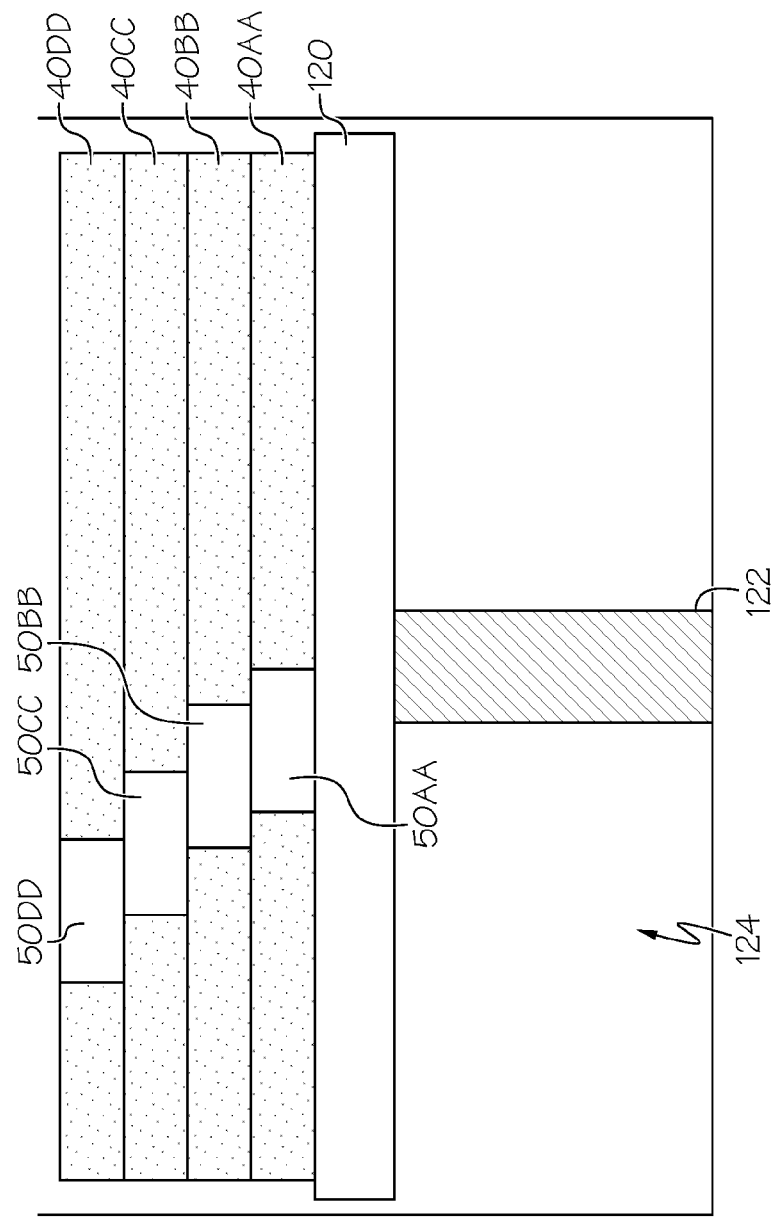
FIG. 1D schematically depicts an enlarged view of build material of a manufacturing apparatus according to one or more embodiments shown and described herein.

Referring to FIG. 1D, object layers of build material 40AA-40DD may be sequentially positioned on top of one another when deposited on the build area 120. In the example provided in FIG. 1D, sequential layers of binder 50AA-50CC are positioned on the layers of build material 40AA-40DD. By curing the layers of binder 50AA-50CC, a finished product may be formed.

Referring now to FIGS. 2-9, the printing head 154 of the printing assembly 150 is schematically depicted with the plurality of print heads 156 positioned therein. In particular, FIGS. 2-9 schematically depict a bottom end 159 of the printing head 154 thereby illustrating the plurality of print heads 156 disposed therein. It should be understood that the plurality of print heads 156 are exposed from within the printing head 154 of the printing assembly 150 along the bottom end 159 of the printing head 154. As further seen in FIGS. 2-9, and as briefly described above, each of the plurality of print heads 156 disposed within the printing head 154 include a plurality of jet nozzles 158 for depositing the binder material 50, the first material 114, the second material 115, and/or other materials therefrom.

In some embodiments depicted herein, the printing head 154 of the printing assembly 150 includes multiple rows of print heads 156, and in particular, at least a first print head row 155 of print heads 156 and a second print head row 157 of print heads 156. As will be described in greater detail herein, in other embodiments the printing head 154 of the printing assembly 150 may include additional or fewer rows of print heads 156 (See, FIGS. 12-16). For example, in some embodiments the printing head 154 of the printing assembly 150 may include one row of print heads 156. Although the first print head row 155 and the second print head row 157 of the printing head 154 is shown herein as including three print heads 156 each, respectively, it should be understood that such depiction is for illustrative purposes, and that in embodiments, the first print head row 155 and/or the second print head row 157 include greater or fewer print heads 156.

Figure 21A:
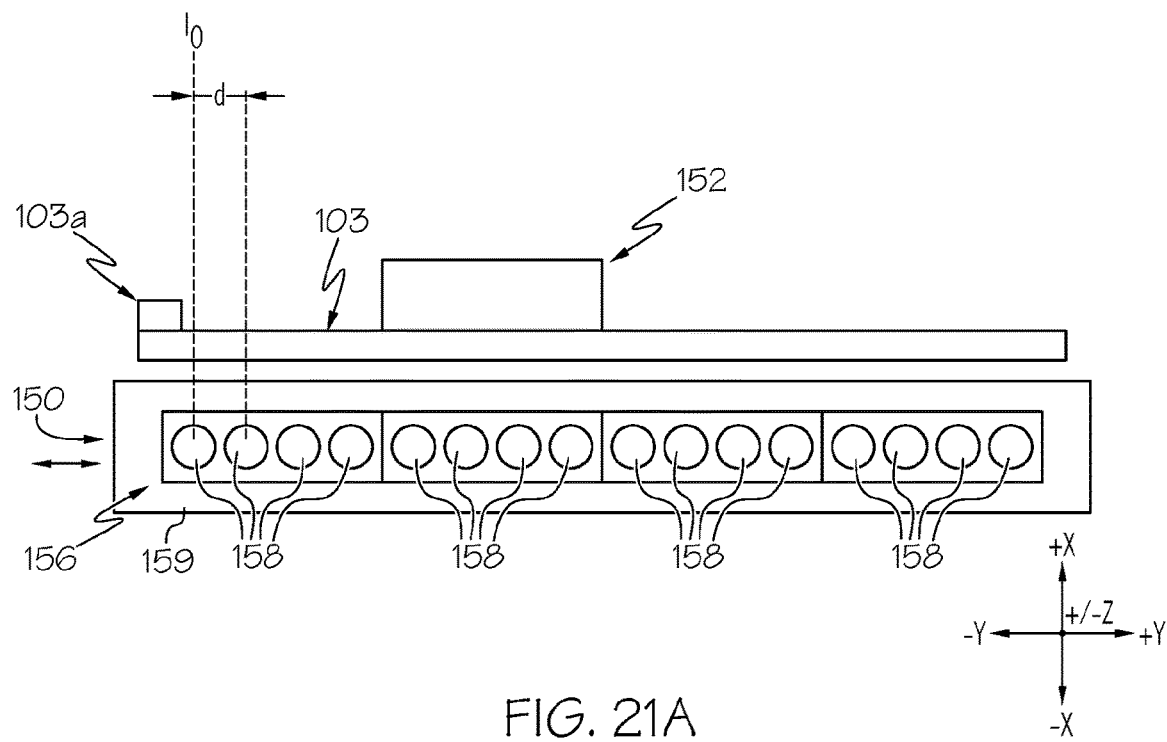
FIG. 21A schematically depicts a printing assembly implementing a second actuator assembly for latitudinal axis indexing of the printing assembly according to one or more embodiments shown and described herein.

It should further be understood that each of the plurality of print heads 156 include a plurality of jet nozzles 158. Despite the present example depicting each print head 156 having four jet nozzles 158 therein, it should be understood that this is merely for illustrative purposes and that each print head 156 of the plurality of print heads 156 in the first print head row 155 and the second print head row 157 include a plurality of jet nozzles 158, which in many instances include many more than four jet nozzles. Accordingly, embodiments are contemplated and possible wherein each of the print heads 156 of the plurality of print heads 156 disposed within the printing head 154 include greater or fewer jet nozzles 158. By way of example only, each of the print heads 156 may include a plurality of jet nozzles 158 from about 5 nozzles to 50 nozzles, from about 50 nozzles to about 100 nozzles, from about 100 nozzles to about 500 nozzles, from about 500 nozzles to about 1000 nozzles, from about 1000 nozzles to about 2000 nozzles, from about 2000 nozzles to about 3000 nozzles, from about 3000 nozzles to about 4000 nozzles, from about 4000 nozzles to about 5000 nozzles, from about 5,000 nozzles to about 6,000 nozzles, with each jet nozzle 158 spaced apart from another. The nozzles may be spaced apart from each other by $1/10$ inch to about $1/1200$ inch, or any value therebetween, for example $1/100$ inch, $1/200$ inch, $1/300$ inch, $1/400$ inch, $1/500$ inch, $1/600$ inch, $1/700$ inch, $1/800$ inch, $1/900$ inch, $1/1000$ inch, $1/1100$ inch, or $1/1200$ inch from one another. The distance "d" from a first jet to a second jet positioned adjacent the first jet of the plurality of jets corresponds to a jet-spacing (d) (FIG. 21A).

Figure 2:
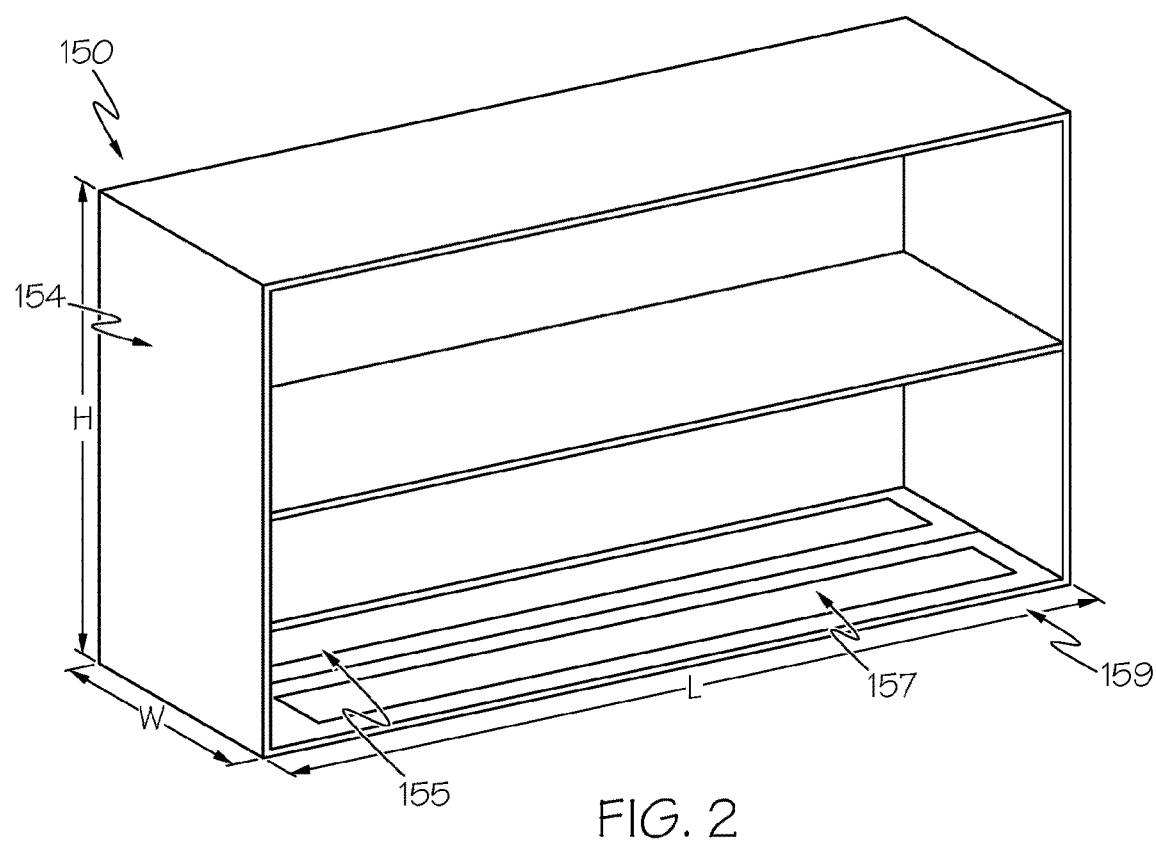
FIG. 2 schematically depicts an embodiment of a printing assembly for a manufacturing apparatus, with a pair of print head rows according to one or more embodiments shown and described herein.

Referring in more detail to FIG. 2, the printing assembly 150 includes the first print head row 155 and the second print head row 157 positioned along the bottom end 159 of the printing head 154. More particularly, the print head rows 155, 157 extend along a length "L" of the printing head 154 such that the print head rows 155, 157 have a length that is similar to a length "L" of the printing head 154. In the present example, the print head rows 155, 157 include an identical length relative to one another, however, it should be understood that in other embodiments the print head rows 155, 157 may have varying lengths relative to one another and from that shown and described herein. The print head rows 155, 157 are sized and shaped to slidably receive at least one print head 156 therein, respectively, and in particular a plurality of print heads 156. The print head rows 155, 157 are positioned parallel to one another along the bottom end 159 of the printing head 154 and are sequentially aligned relative to each other in a collinear arrangement.

Figure 3:
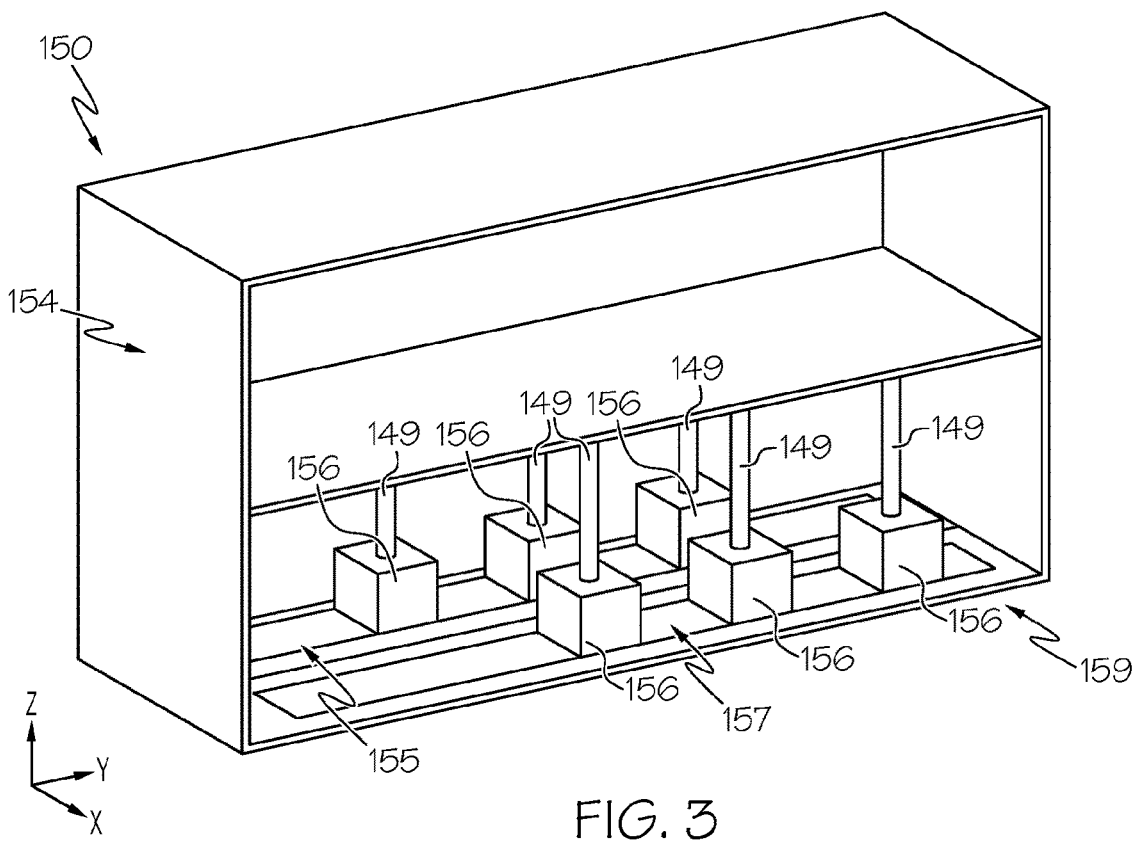
FIG. 3 schematically depicts an embodiment of a printing assembly for a manufacturing apparatus, with a pair of print head rows including a plurality of print heads therein according to one or more embodiments shown and described herein.

Referring now to FIG. 3, the printing assembly 150 is schematically depicted including a plurality of print heads 156 defining the first print head row 155 and a plurality of print heads 156 defining the second print head row 157. The plurality of print heads 156 of the first print head row 155 are in coaxial alignment relative to one another, and the plurality of print heads 156 of the second print head row 157 are in coaxial alignment relative to one another. In some embodiments, the plurality of print heads 156 of the first print head row 155 and the second print head row 157 are aligned with the bottom end 159 of the printing head 154 such that a faceplate of the plurality of print heads 156 may be flush with the bottom end 159 of the printing head 154. As described in greater detail herein, in some embodiments the faceplates of the plurality of print heads 156 may be moved relative to the bottom end 159 of the printing head 154 to thereby offset the faceplates relative to one another and relative to the bottom end 159.

As briefly described above, the plurality of print heads 156 may be configured to slidably translate within the print head rows 155, 157, respectively, in a transverse direction relative to the working axis 116 of the apparatus 100 (i.e., in the +/−Y direction as shown in the figures). In the present example, the printing head 154 of the printing assembly 150 includes a pair of print head rows 155, 157 defined by three print heads 156, respectively, in each row. It should be understood that the printing head 154 of the printing assembly 150 is configured to be modular such that in other embodiments additional print head rows and/or print heads 156 may be included without departing from the scope of the present disclosure. Each of the print heads 156 include a coupling feature 149 attached thereto. Although not shown in FIG. 3, the coupling features 149 of each of the print heads 156 in the print head rows 155, 157 are further attached to an actuator 160 (see FIGS. 4-20) at an end opposite of the print head 156. As will be described in greater detail herein, the actuator(s) 160 are configured to move the plurality of print heads 156 of the first print head row 155 and/or the second print head row 157 upon an actuation of the actuator(s) 160, which may be caused by execution of computer readable and executable instructions stored in the non-transitory memory of the control system 10 by the processor of the control system 10. In some embodiments, for example, those depicted and described with reference to FIGS. 21A-21B, the printing assembly 150 may be indexable along a latitudinal axis via a second actuator assembly 103 (FIG. 21A). This may be in addition to the independent movement of the plurality of print heads 156 described with reference to FIGS. 4-20 or the plurality of print heads 156 may be fixed to a location within the printing assembly 150 (i.e., absent actuator(s) 160.

Figure 4:
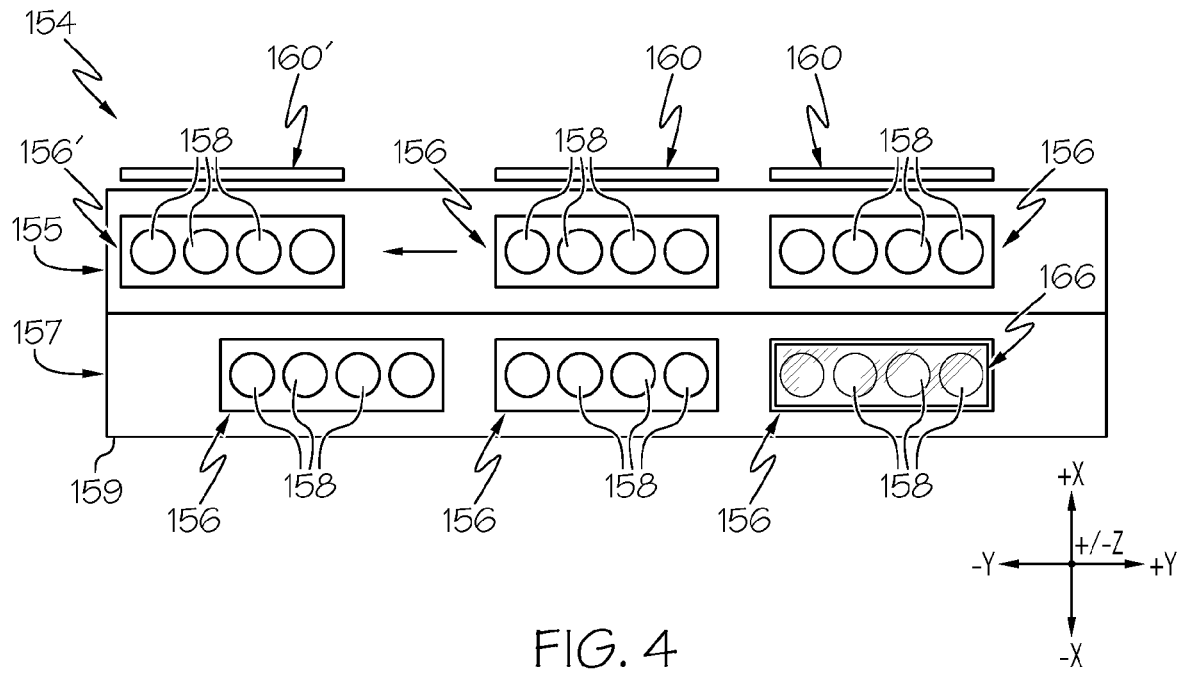
FIG. 4 schematically depicts an embodiment of a printing assembly for a manufacturing apparatus, with a first print head that is laterally movable according to one or more embodiments shown and described herein.

Referring specifically to FIG. 4, the first print head row 155 of the plurality of print heads 156 is positioned relative to the second print head row 157 of the plurality of print heads 156 such that the first print head row 155 is spaced apart from the second print head row 157 along the working axis 116 of the apparatus 100 (i.e., in the +/−X direction of the coordinate axes depicted in the figures). Each of the plurality of print heads 156 of the first print head row 155 are sequentially spaced apart from one another in a direction transverse to the working axis 116 of the apparatus 100 (in the +/−Y direction of the coordinate axes depicted in the figures). Similarly, each of the plurality of print heads 156 of the second print head row 157 is sequentially spaced apart from one another in a direction transverse to the working axis 116 of the apparatus 100 (in the +/−Y direction of the coordinate axes depicted in the figures).

In a default position, the plurality of print heads 156 of the first print head row 155 may be positioned such that they at least partially overlap with the plurality of print heads 156 of the second print head row 157 in the +/−X direction of the coordinate axes (i.e. along the working axis 116). It should be understood that in some embodiments the plurality of print heads 156 of the first print head row 155 are at least laterally offset (in the +/−Y direction of the coordinate axes of the figures) from the plurality of print heads 156 of the second print head row 157 by at least about one-half a width and/or diameter of a jet nozzle 158 when the print head rows 155, 157 are in a default position. As will be described in greater detail herein, the plurality of print heads 156 of the first print head row 155 and the second print head row 157 may be laterally offset relative to one another, in a direction transverse to the working axis 116 (in the +/−Y direction of the coordinate axes depicted in the figures), such that the at least one print head 156 of the first print head row 155 and/or the second print head row 157 is shifted in the +/−Y direction of the coordinate axes depicted in the figures relative to another print head 156 of the adjacent row when the printing head 154 is in an actuated position. However, it should be understood that in some embodiments at least one print head 156 of the first print head row 155 and/or the second print head row 157 may continue to overlap with at least one opposing print head 156 of the adjacent row when the printing head 154 is in an actuated position (see FIGS. 5-9). It should further be understood that a default position of the plurality of print heads 156 of either print head row 155, 157 may vary from that depicted and described herein, such that the default position of each row of print heads 156 may be distinct from a default position of an adjacent row of print heads 156. As described in greater detail herein, moving one or more of the plurality of print heads 156 of the first print head row 155 and/or the second print head row 157 provides for a printing redundancy over the plurality of pixels along the build area 120, thereby forming a final deposited geometry where each of the plurality of pixels received material deposits thereon from more than one jet nozzle 158 of the plurality of jet nozzles 158.

Still referring to FIG. 4, the printing head 154 of the printing assembly 150 further includes at least one actuator 160 coupled to at least one of the plurality of print heads 156 positioned within the first print head row 155 of print heads 156. The actuator 160 is configured to move the at least one print head 156 of the plurality of print heads 156 in the first print head row 155 (e.g., a first print head 156') in response to an actuation of the actuator 160 (e.g., a first actuator 160'). The first print head 156' moves relative to the support bracket 152 of the printing assembly 150. In particular, the first actuator 160' translates the first print head 156' in a direction transverse to the working axis 116 (in the +/−Y direction of the coordinate axes depicted in the figures) such that the first print head 156' moves relative to the support bracket 152 (See FIG. 1B) in the direction transverse to the working axis (in the +/−Y direction of the coordinate axes shown in FIG. 4). In some embodiments, and as will be described in greater detail herein, a relative distance between the first print head 156' and the adjacent print heads 156 of the second print head row 157 may also be adjusted in response to a translation of the first print head 156' within the first print head row 155.

In the embodiments described herein, the actuator 160 of the at least one print head 156 may be, for example and without limitation, mechanical actuators, electro-mechanical actuators, pneumatic actuators, hydraulic actuators, motorized actuators, non-motorized actuators, or any other actuator suitable for providing at least a linear motion. Suitable actuators may include, without limitation, linear stages, worm drive actuators, ball screw actuators, pneumatic pistons, hydraulic pistons, electro-mechanical linear actuators, or the like. By way of example, the actuator 160 may comprise a linear stage actuator such as a 150 MM linear motor stage with at least a 4 um accuracy.

Still referring to FIG. 4, in some embodiments, the printing head 154 of the printing assembly 150 includes a plurality of actuators 160, and in particular at least one actuator 160 for each of the plurality of print heads 156 of the first print head row 155. In this instance, and as described in greater detail herein, each of the plurality of print heads 156 of the first print head row 155 may move relative to one another and relative to the support bracket 152 (See FIG. 1B) in the direction transverse to the working axis (in the +/−Y direction of the coordinate axes shown in the figures) in response to an actuation of the respective actuator 160 coupled thereto. In other words, each of the plurality of print heads 156 of the first print head row 155 are movable independent of one another such that adjacent print heads 156 of the first print head row 155 may translate in opposite directions and/or at varying degrees (i.e., distances) relative to one another along the +/−Y direction of the coordinate axes.

In some embodiments, the printing head 154 may include at least one spacer positioned between adjacent print heads 156 of the first print head row 155 such that a spacing between the adjacent and independently movable print heads 156 increases and/or decreases uniformly relative to one another. In other embodiments, a limited number of the print heads 156 within the first print head row 155 may include one of the plurality of actuators 160 coupled thereto (e.g., every other print head 156 of the first print head row 155; outer print heads 156 of the first print head row; inner print heads 156 of the first print head row; and the like) such that not every print head 156 of the first print head row 155 is independently movable.

In some embodiments, more than one of the plurality of print heads 156 of the first print head row 155 may be coupled to a single actuator 160 such that the print heads 156 coupled thereto may move in unison in the direction transverse to the working axis 116 (the +/−Y direction in the coordinate axes shown in the figures). In some embodiments, all of the print heads 156 in a single row may be coupled to a single actuator 160 (e.g., all of the plurality of print heads 156 in the first print head row 155 may be coupled to a single actuator 160 such that all print heads 156 in the first print head row 155 move in unison in the direction transverse to the working axis 116 (the +/−Y direction in the coordinate axes shown in the figures). Alternatively, all of the print heads 156 in multiple rows may be coupled to a single actuator 160 (e.g., all of the plurality of print heads 156 in the first print head row 155 and the second print head row 157 may be coupled to a single actuator 160 such that all the print heads 156 in the printing head 154 move in unison in the direction transverse to the working axis 116 (the +/−Y direction in the coordinate axes shown in the figures).

Still referring to FIG. 4, in some embodiments when one or more of the print heads 156 in a single row 155, 157 are not currently required for performing an additive manufacturing process, the one or more print heads 156 may be capped to protect the plurality of jet nozzles 158 of the respective print head 156 from the printing process. In particular, a print head cap 166 may be positioned along a faceplate of one or more print heads 156 such that the plurality of jet nozzles 158 are effectively covered with and/or receive the print head cap 166 therein. In this instance, the plurality of jet nozzles 158 of the capped print head 156 may be shielded from dirt during use of the printing assembly 150. When necessary, the capped print heads 156 may be uncapped to thereby expose the plurality of jet nozzles 158 therein for performing an additive manufacturing process.

In other embodiments, the printing head 154 may include at least one actuator 160 coupled to the plurality of print heads 156 defining the first print head row 155 for moving the plurality of print heads 156 and another actuator 160 coupled to the plurality of print heads 156 defining the first print head row 155 for changing a distance (e.g., spacing)

between the plurality of print heads 156 of the first print head row 155. In this instance, despite the plurality of print heads 156 of the first print head row 155 moving in unison with one another in response to an actuation of a single actuator 160, a spacing between each of the plurality of print heads 156 may be selectively controlled (e.g., increased or decreased) by another actuator 160 coupled to the print heads 156 of the first print head row 155. In the present example, the plurality of print heads 156 of the second print head row 157 do not include an actuator coupled thereto such that the second print head row 157 of the plurality of print heads 156 are securely fixed relative to one another, relative to the support bracket 152 (See FIG. 1B), and relative to the plurality of print heads 156 of the first print head row 155. However, as described below, one or more of the print heads 156 of the second print head row 157 may also be movable relative to the support bracket 152 in the +/−Y direction of the coordinate axes.

Figure 5:
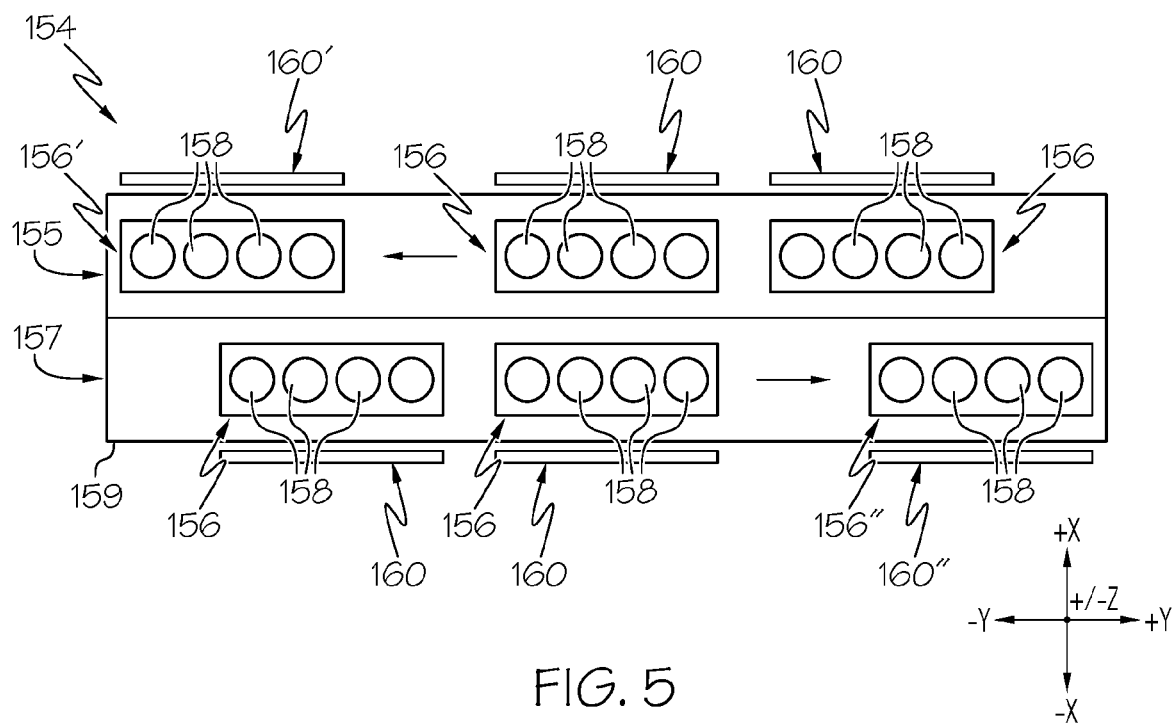
FIG. 5 schematically depicts an embodiment of a printing assembly for a manufacturing apparatus, with a pair of print heads that are laterally movable according to one or more embodiments shown and described herein.

Referring now to FIG. 5, in some embodiments the printing head 154 of the printing assembly 150 includes at least one actuator 160 coupled to at least one of the plurality of print heads 156 positioned within the second print head row 157. The actuator 160 is configured to move the at least one print head 156 of the plurality of print heads 156 in the second print head row 157 (e.g., a second print head 156") in response to an actuation of the actuator 160 (e.g., a second actuator 160"). The second print head 156" moves relative to the support bracket 152 of the printing assembly 150 (See FIG. 1B). In particular, the second actuator 160" translates the second print head 156" in a direction transverse to the working axis 116 (i.e., in the +/−Y direction of the coordinate axes depicted in the figures) such that the second print head 156" moves relative to the support bracket 152 (See FIG. 1B) in the direction transverse to the working axis 116 (in the +/−Y direction of the coordinate axes shown in FIG. 4). In some embodiments, and as will be described in greater detail herein, a relative distance between the second print head 156" and the adjacent print heads 156 of the first print head row 155 may also be adjusted in response to a translation of the second print head 156" within the second print head row 157.

In other embodiments, the printing head 154 of the printing assembly 150 includes a plurality of actuators 160, and in particular at least one actuator 160 for each of the plurality of print heads 156 of the second print head row 157. In this instance, and as described in greater detail herein, each of the plurality of print heads 156 of the second print head row 157 may move relative to one another in response to an actuation of the respective actuator 160 coupled thereto. In other words, each of the plurality of print heads 156 of the second print head row 157 are movable independent of one another such that adjacent print heads 156 of the second print head row 157 may translate in opposite directions and/or at varying degrees (i.e., distances) relative to one another along the +/−Y direction of the coordinate axes. With one or more of the print head 156 in each of the print head rows 155, 157 coupled to at least one actuator 160, the printing head 154 of the printing assembly 150 may generate a variable printing width that is configured to expand or contract as necessary.

Figure 6:
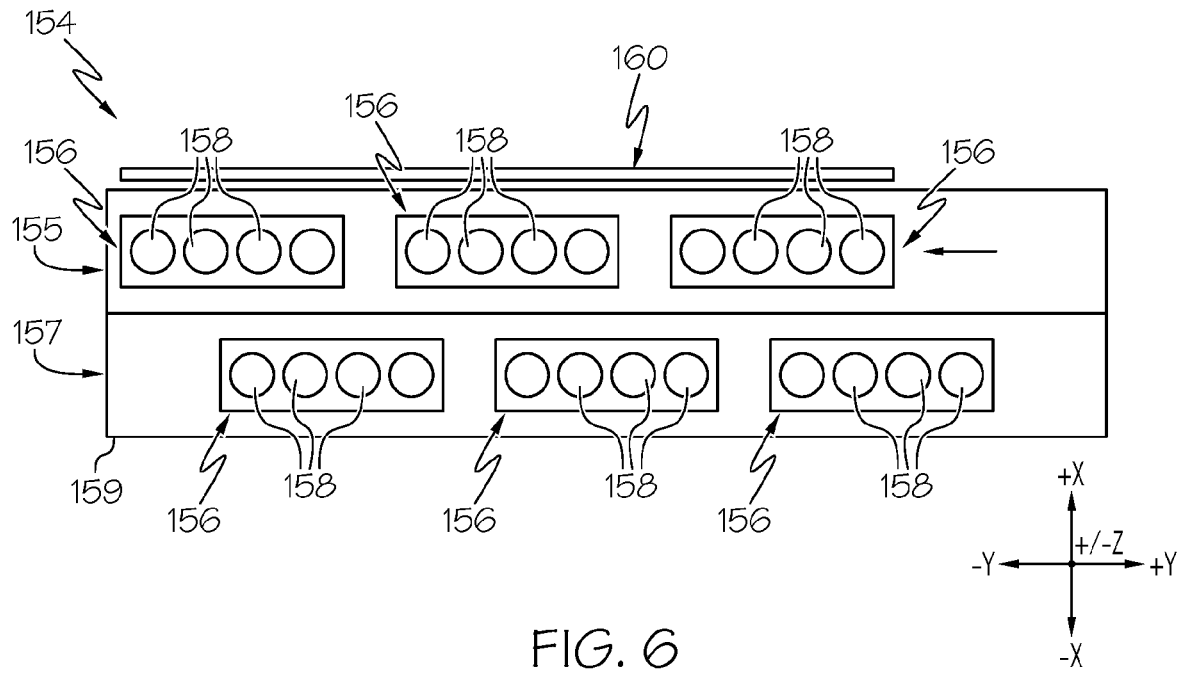
FIG. 6 schematically depicts an embodiment of a printing assembly for a manufacturing apparatus, with a first print head row of print heads that are laterally movable according to one or more embodiments shown and described herein.

Referring now to FIG. 6, in other embodiments the printing head 154 of the printing assembly 150 includes a single actuator 160 that is coupled to the plurality of print heads 156 of the first print head row 155. The actuator 160 is configured to move the plurality of print heads 156 of the first print head row 155 in unison relative to the support bracket 152 of the printing assembly 150 (See FIG. 1B) in a direction transverse to the working axis 116 of the apparatus 100 (i.e., in the +/−Y direction of the coordinate axes depicted in the figures). In other words, actuation of the actuator 160 provides a simultaneous translation of the plurality of print heads 156 of the first print head row 155 relative to the plurality of print heads 156 of the second print head row 157. In this instance, a relative distance (e.g., spacing) between each of the plurality of print heads 156 of the first print head row 155 is maintained such that the offset between adjacent print heads 156 within the first print head row 155 is not changed as the first print head row 155 of print heads 156 translates.

In the present example, the plurality of print heads 156 of the second print head row 157 do not include an actuator coupled thereto such that the second print head row 157 of the plurality of print heads 156 is securely fixed relative to the plurality of print heads 156 of the first print head row 155. In other embodiments, the single actuator 160 may be coupled to both the first print head row 155 and the second print head row 157 such that actuation of the actuator 160 provides translation of both rows 155, 157 in unison relative to the support bracket 152 (See FIG. 1B) in a direction transverse to the working axis 116 of the apparatus 100 (i.e., in the +/−Y direction of the coordinate axes depicted in the figures).

Figure 7:
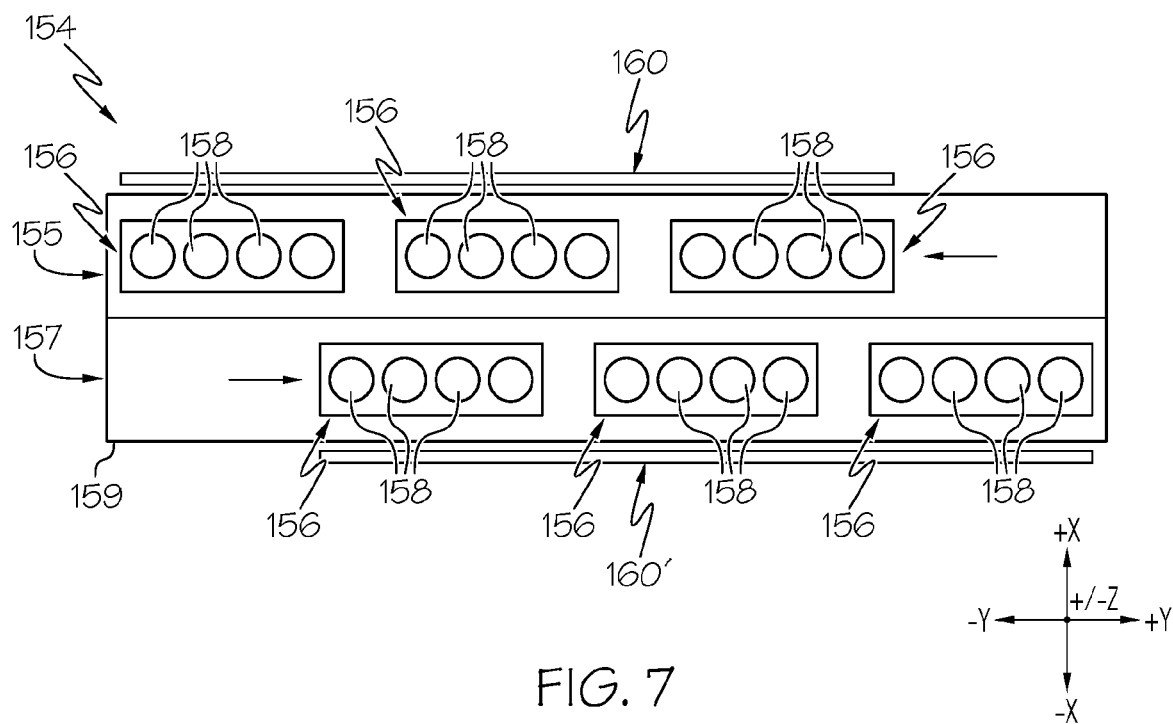
FIG. 7 schematically depicts an embodiment of a printing assembly for a manufacturing apparatus, with a pair of rows of print heads that are laterally movable according to one or more embodiments shown and described herein.

Referring to FIG. 7, in some embodiments the printing head 154 of the printing assembly 150 includes a second actuator 160' coupled to the plurality of print heads 156 positioned within the second print head row 157 of print heads 156. The second actuator 160' is configured to move the plurality of print heads 156 of the second print head row 157 in response to an actuation of the second actuator 160'. The plurality of print heads 156 of the second print head row 157 move relative to the support bracket 152 of the printing assembly 150 (see FIG. 1B). In particular, the second actuator 160' translates the plurality of print heads 156 of the second print head row 157 in a direction transverse to the working axis 116 (i.e., in the +/−Y direction of the coordinate axes depicted in the figures). In other words, actuation of the second actuator 160' provides a simultaneous translation of the plurality of print heads 156 of the second print head row 157 relative to the plurality of print heads 156 of the first print head row 155. The plurality of print heads 156 of the first print head row 155 are translated in an opposite direction (−Y direction of the coordinate axes of FIG. 7) than the plurality of print heads 156 of the second print head row 157 (+Y direction of the coordinate axes of FIG. 7). It should be understood that the plurality of print heads 156 of the first print head row 155 may trade positions with the plurality of print heads 156 of the second print head row 157. In this instance, a relative distance between each of the plurality of print heads 156 of the second print head row 157 is maintained such that the offset between adjacent print heads 156 within the second print head row 157 is not changed as the second print head row 157 of print heads 156 translates.

In some embodiments, the actuator 160 of the printing head 154 is configured to move one or more of the plurality of print heads 156 of the first print head row 155 and/or the second print head row 157 in various other directions other than those shown and described above (i.e., directions other than in the +/−Y direction of the coordinate axes depicted in the figures). For example, the actuator 160 of the printing head 154 may be configured to move one or more of the plurality of print heads 156 of the first print head row 155 and/or the second print head row 157 in a direction parallel to the working axis 116 of the apparatus 100 (i.e., in the +/−X direction of the coordinate axes depicted in the figures), in another direction that is transverse to the working axis 116 (i.e., in the +/−Z direction of the coordinate axes depicted in the figures), and the like.

Figure 8:
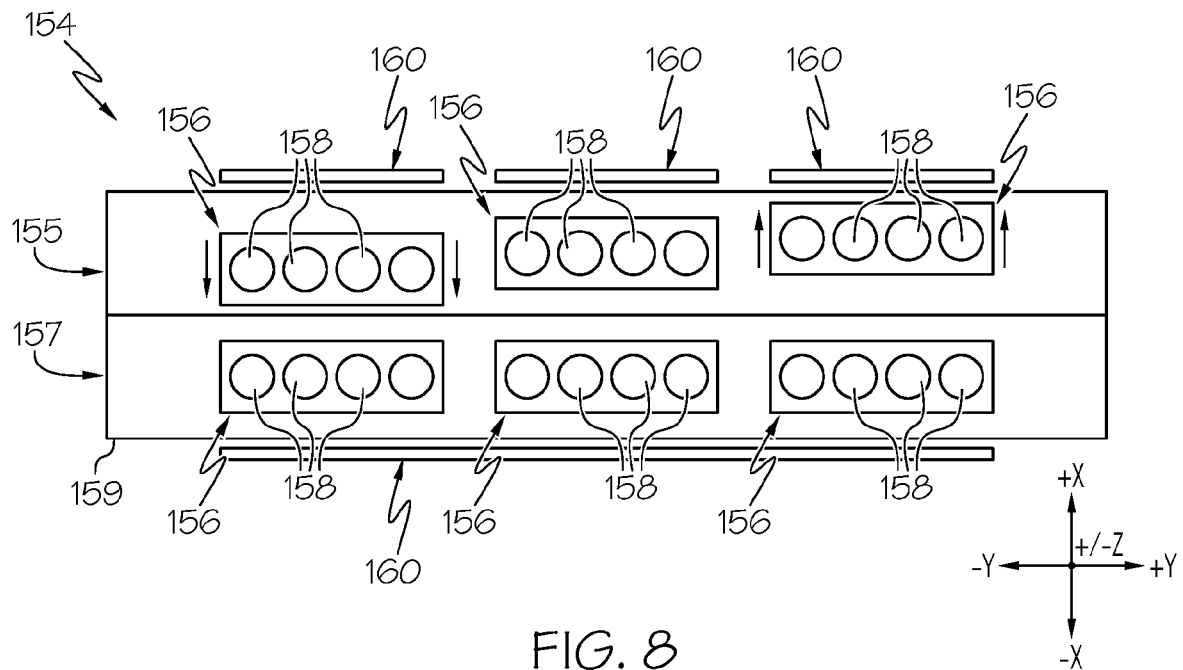
FIG. 8 schematically depicts an embodiment of a printing assembly for a manufacturing apparatus, with a pair of print heads that are movable according to one or more embodiments shown and described herein.

Specifically referring to FIG. 8, in some embodiments the printing head 154 of the printing assembly 150 includes a plurality of actuators 160, and in particular each of the plurality of print heads 156 of the first print head row 155 are coupled to at least one actuator 160, respectively. Further, the plurality of print heads 156 of the second print head row 157 is collectively coupled to a single actuator 160. In this instance, the plurality of actuators 160 coupled to the plurality of print heads 156 of the first print head row 155 are configured to selectively and individually move each of the print heads 156 in a direction that is parallel to the working axis 116 of the apparatus 100 (i.e., in the +/−X direction of the coordinate axes depicted in the figures).

In this instance, each of the plurality of print heads 156 of the first print head row 155 are movable independent of one another such that adjacent print heads 156 of the first print head row 155 may translate in opposite directions and/or at varying degrees (i.e., distances) relative to one another and the support bracket 152 (see FIG. 1B) along the +/−X direction of the coordinate axes. Although not shown, it should be understood that in other embodiments the plurality of print heads 156 of the second print head row 157 may be coupled to a plurality of actuators 160, rather than a single actuator 160 as shown and depicted herein, such that the plurality of print heads 156 of the second print head row 157 are individually movable simultaneous to the plurality of print heads 156 of the first print head row 155. In other embodiments where the printing head 154 of the printing assembly 150 includes a plurality of actuators 160 coupled to the plurality of print heads 156 of the first print head row 155 and the plurality of print heads 156 of the second print head row 157 is collectively coupled to a single actuator 160, the plurality of actuators 160 may be configured to selectively and individually rotate each of the print heads 156 of the first print head row 155.

Figure 9:
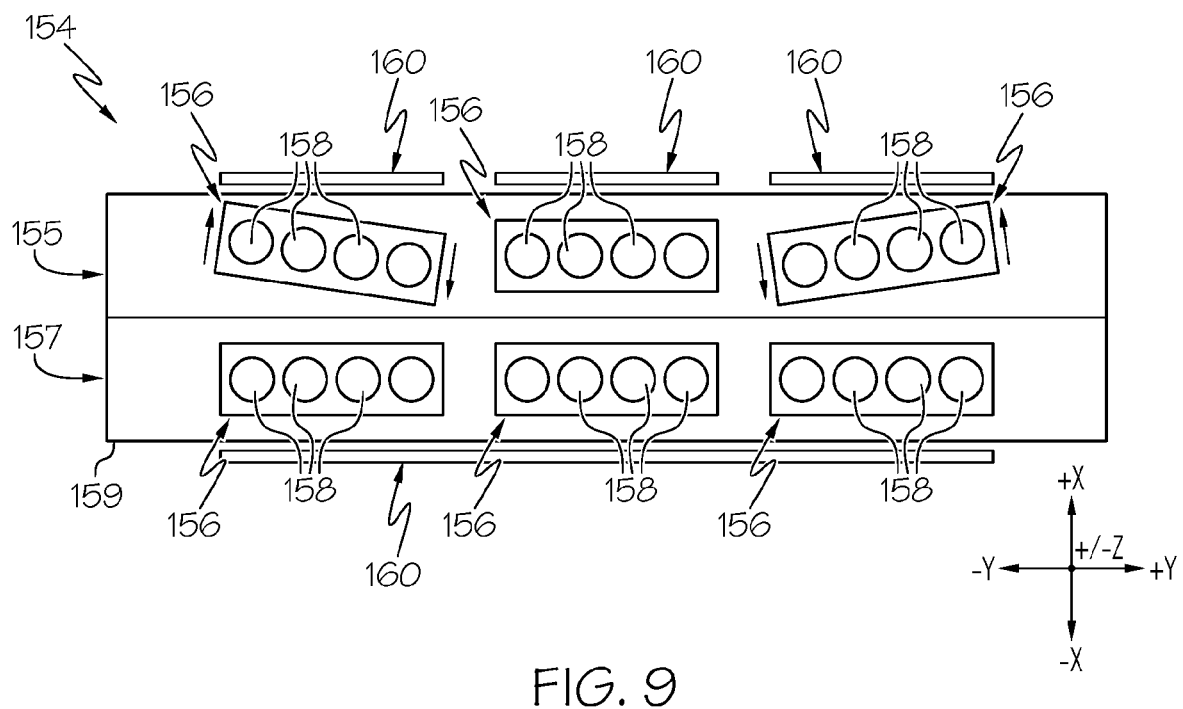
FIG. 9 schematically depicts an embodiment of a printing assembly for a manufacturing apparatus, with a pair of print heads that are rotatable according to one or more embodiments shown and described herein.

Specifically referring to FIG. 9, the plurality of actuators 160 coupled to the plurality of print heads 156 of the first print head row 155 are configured to rotate and/or pivot each of the print heads 156, independent of an adjacent print head 156 of the first print head row 155, about a rotation axis that is transverse to the working axis 116 of the apparatus 100 (i.e., a rotation axis parallel to the +/−Z direction of the coordinate axes depicted in the figures). In other words, each of the plurality of print heads 156 of the first print head row 155 is rotatable relative to one another and the support bracket 152 (see FIG. 1B) such that adjacent print heads 156 of the first print head row 155 may rotate in opposite directions and/or at varying degrees relative to one another about the rotation axis. Although not shown, it should be understood that in other embodiments the plurality of print heads 156 of the second print head row 157 may similarly be coupled to a plurality of actuators 160, rather than a single actuator 160 as shown and depicted herein, such that the plurality of print heads 156 of the second print head row 157 are individually rotatable simultaneous to the plurality of print heads 156 of the first print head row 155.

Figure 10:
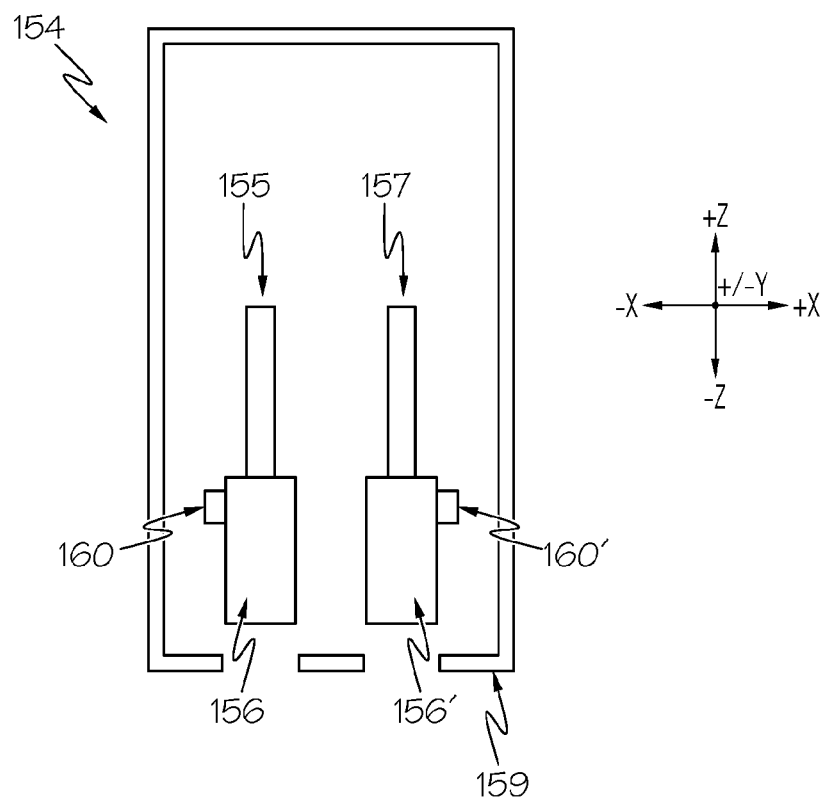
FIG. 10 schematically depicts an embodiment of a printing assembly for a manufacturing apparatus, with a pair of print heads that are positioned at a default elevation according to one or more embodiments shown and described herein.
Figure 11:
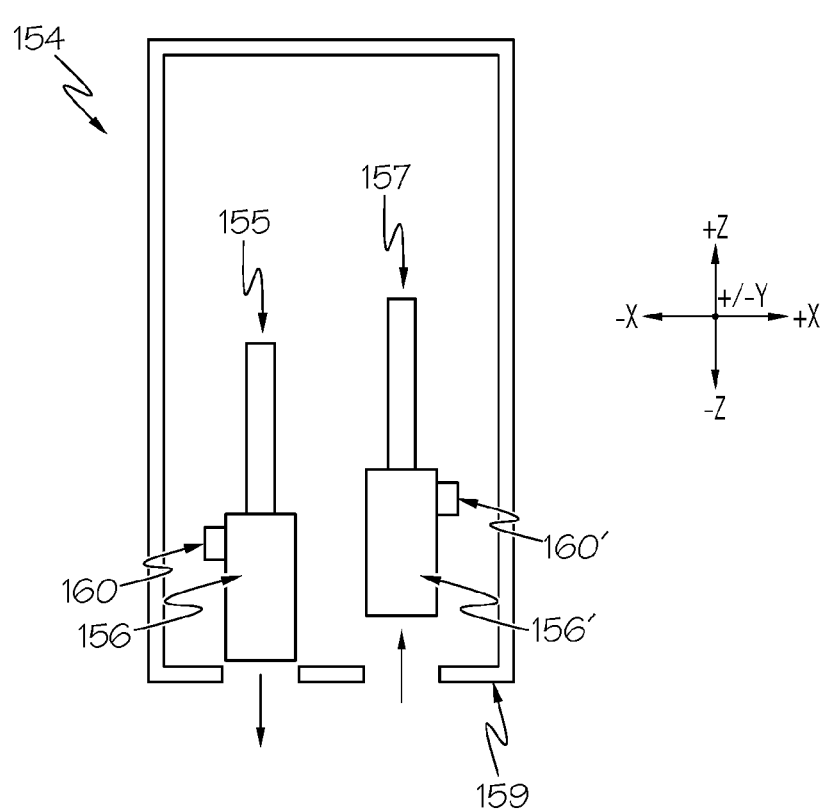
FIG. 11 schematically depicts an embodiment of a printing assembly for a manufacturing apparatus, with a pair of print heads that are longitudinally movable relative to the default elevation according to one or more embodiments shown and described herein.

Referring now to FIGS. 10-11, the printing head 154 of the printing assembly 150 is schematically depicted with at least one of the print heads 156 of the plurality of print heads 156 of the first print head row 155 (i.e., the first print head 156) and at least one of the print heads 156 of the plurality of print heads 156 of the second print head row 157 (i.e., the second print head 156') disposed therein.

Specifically referring to FIG. 10, the first print head row 155 and the second print head row 157 of print heads 156 are positioned within the printing head 154 at a predetermined elevation (i.e., height) relative to the bottom end 159 of the printing head 154 when in a default position. In some embodiments the printing head 154 of the printing assembly 150 includes a plurality of actuators 160, and in particular each of the plurality of print heads 156 of the first print head row 155 and/or the second print head row 157 are coupled to at least one actuator 160, respectively. In this instance, the plurality of actuators 160 coupled to the plurality of print heads 156 of the first print head row 155 and/or the second print head row 157 are configured to selectively and independently move each of the print heads 156 in a direction that is transverse to the working axis 116 of the apparatus 100 (i.e., in the +/−Z direction of the coordinate axes depicted in the figures).

Accordingly, each of the plurality of print heads 156 of the first print head row 155 and/or the second print head row 157 are movable independent of one another such that adjacent print heads 156 of the first print head row 155 and/or the second print head row 157 may translate in opposite directions and/or at varying degrees (i.e., distances) relative to one another along the +/−Z direction of the coordinate axes. In other words, the plurality of actuators 160 are configured to adjust a height between the plurality of print heads 156 of the first print head row 155 and/or the second print head row 157 relative to one another, the bottom end 159 of the printing head 154, and the build area 120 over which the printing assembly 150 is positioned over when depositing the binder material 50, the first material 114, the second material 115, and the like. In other embodiments, a height of the plurality of print heads 156 of the first print head row 155 and/or the second print head row 157 may be adjusted in instances where the plurality of print heads 156 are to be inactive during a current print cycle. In this instance, the first print head row 155 or the second print head row 157 is movable in the +Z direction of the coordinate axes to vertically offset the inactive plurality of print heads 156 positioned therein.

Referring now to FIG. 11, the first print head 156 of the first print head row 155 is moved along the −Z direction of the coordinate axes toward the bottom end 159 of the printing head 154 in response to an actuation of the actuator 160 coupled thereto. The second print head 156' of the second print head row 157 is moved along the +Z direction of the coordinate axes away from the bottom end 159 of the printing head 154 in response to an actuation of the second actuator 160' coupled thereto. Although the first print head 156 and the second print head 156' are depicted as being translated in opposite directions relative to one another along the +/−Z direction of the coordinate axes, it should be understood that in other embodiments the first print head 156 and the second print head 156' may trade positions and/or be moved in similar directions and/or distances.

Although not shown, it should further be understood that in other embodiments the plurality of print heads 156 of the first print head row 155 and/or the second print head row 157 may collectively be coupled to a single actuator 160, respectively, rather than a plurality of actuators 160 as shown and depicted herein. In this instance, the plurality of print heads 156 of the first print head row 155 and/or the second print head row 157 are simultaneously movable in unison relative adjacent print heads 156 within the same print head row 155, 157. However, the plurality of print heads 156 of the first print head row 155 remains independently movable relative to the plurality of print heads 156 of the second print head row 157. In other embodiments, the plurality of print heads 156 defining the first print head row 155 and the second print head row 157 may collectively be coupled to a single actuator 160 such that both rows 155, 157 of print heads 156 move in unison with one another relative to the support bracket 152 (see FIG. 1B). It should be understood that other directions, configurations, and orientations of movement of the plurality of print heads 156 relative to one another and/or of the first print head row 155 relative the second print head row 157, and vice versa, may be incorporated with the printing assembly 150 herein without departing from the scope of the present disclosure.

FIGS. 12-16 schematically depict another embodiment of a three-row printing assembly that includes multiple rows of print heads 156 disposed within a printing head 254. It should be understood that the three-row printing assembly of the present example may be readily incorporated into the manufacturing apparatus 100 described above. It should also be understood that, in many respects, the three-row printing assembly functions substantially similar to the printing assembly 150 described above. Thus, a version of the apparatus 100 that is equipped with the three-row printing assembly of the present example may be configured and operable similar to the printing assembly 150 described above, except for the differences described below. Since the three-row printing assembly is substantially similar to the printing assembly 150, like reference numerals are used to identify like components. However, the three-row printing assembly is different than the printing assembly 150 in that the three-row printing assembly includes a printing head 254 having a third print head row 256 of a plurality of print heads 156 disposed therein.

Figure 12:
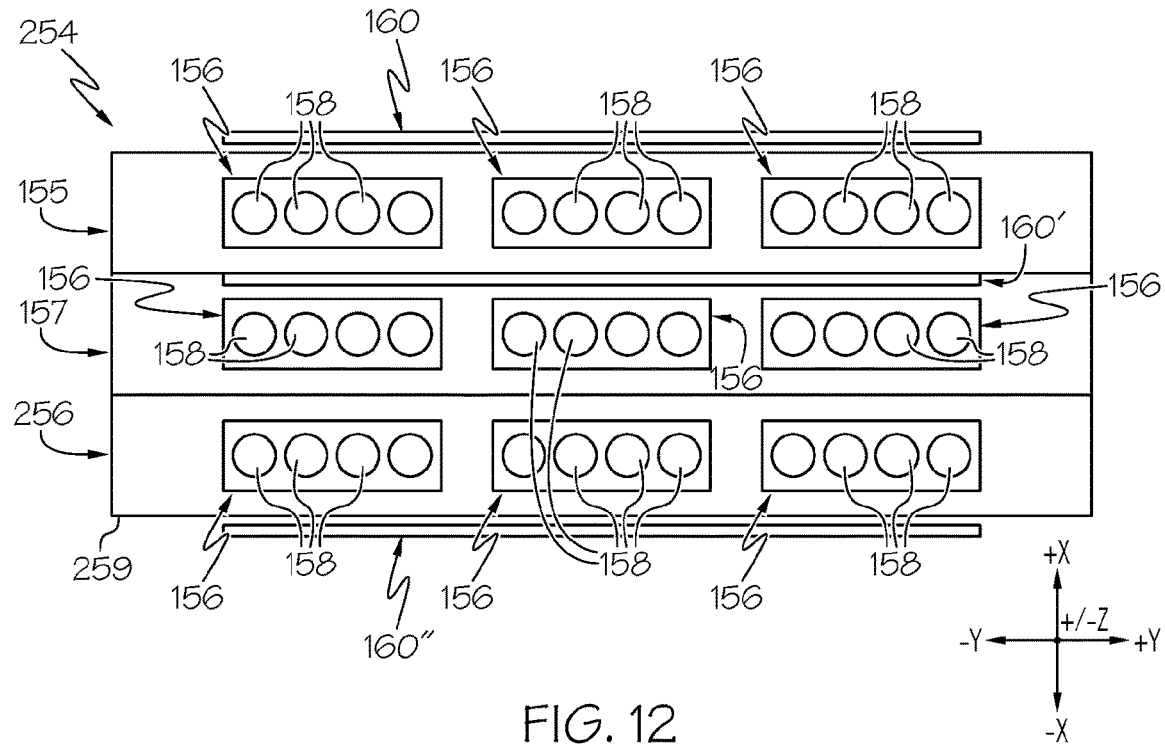
FIG. 12 schematically depicts an embodiment of a printing assembly for a manufacturing apparatus, with three rows of print heads according to one or more embodiments shown and described herein.

Specifically referring to FIG. 12, the plurality of print heads 156 of the third print head row 256 are sequentially spaced apart from one another in a direction that is transverse to the working axis 116 of the apparatus 100 (i.e., in the +/−Y direction of the coordinate axes of the figures). The plurality of print heads 156 of the third print head row 256 is disposed proximate to the second print head row 157 and relatively distal to the first print head row 155 in a direction that is parallel to the working axis 116 of the apparatus 100 (i.e., in the +/−X direction of the coordinate axes of the figures). In this instance, the second print head row 157 is disposed between the first print head row 155 and the third print head row 256. Each of the plurality of print heads 156 of the third print head row 256 comprises a plurality of jet nozzles 158, respectively, positioned adjacent to a bottom end 259 of the printing head 254.

Figure 13:
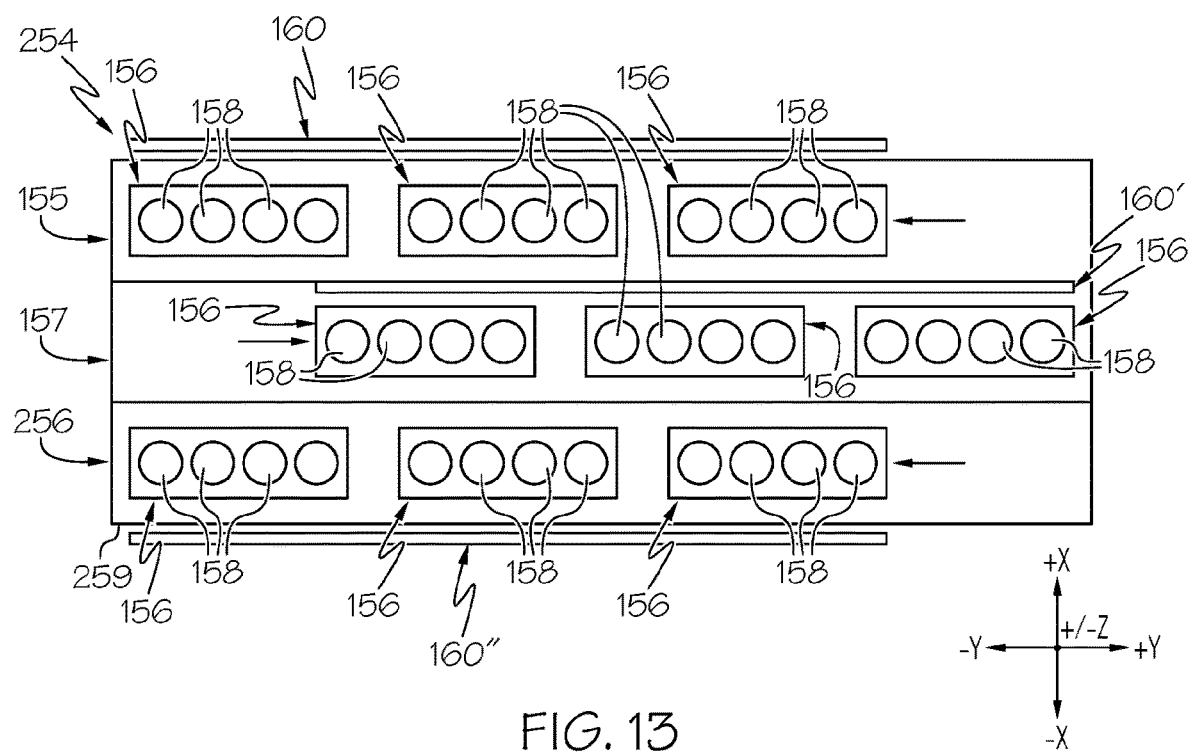
FIG. 13 schematically depicts an embodiment of a printing assembly for a manufacturing apparatus, with three rows of print heads that are movable according to one or more embodiments shown and described herein.

Referring now to FIG. 13, in some embodiments the printing head 254 of the printing assembly includes a first actuator 160 coupled to the plurality of print heads 156 positioned within the first print head row 155 of print heads 156, a second actuator 160' coupled to the plurality of print heads 156 positioned within the second print head row 157 of print heads 156, and a third actuator 160" coupled to the plurality of print heads 156 positioned within the third print head row 256 of print heads 156. In this instance, the third actuator 160" is configured to move the plurality of print heads 156 of the third print head row 256 in response to an actuation of the third actuator 160". The plurality of print heads 156 of the third print head row 256 move relative to the support bracket 152 of the printing assembly (See FIG. 1B). In particular, the third actuator 160" translates the plurality of print heads 156 of the third print head row 256 in a direction transverse to the working axis 116 (i.e., in the +/−Y direction of the coordinate axes depicted in the figures).

Accordingly, actuation of the third actuator 160" provides a simultaneous translation of the plurality of print heads 156 defining the third print head row 256 relative to the plurality of print heads 156 defining the first print head row 155 and the second print head row 157. In this instance, a relative distance between each of the plurality of print heads 156 of the third print head row 256 is maintained such that the offset (i.e. spacing) between adjacent print heads 156 defining the third print head row 256 is not changed as the third print head row 256 of print heads 156 translates. In the present example, the plurality of print heads 156 of the first print head row 155 and the plurality of print heads 156 of the third print head row 256 are depicted as being moved in the −Y direction of the coordinate axes while the plurality of print heads 156 of the second print head row 157 disposed therebetween is depicted as being moved in the +Y direction of the coordinate axes.

It should be understood that the print heads 156 of the rows may interchangeably trade positions and/or translate to various other lateral degrees than that shown and described herein. In some embodiments, the three rows of print heads 156 may be collectively coupled to a single actuator 160 such that the first print head row 155, the second print head row 157, and the third print head row 256 of print heads 156 are configured to move in unison relative to the support bracket 152 (See FIG. 1B). In other embodiments, the plurality of print heads 156 of the first print head row 155 and/or the second print head row 157 may not include an actuator coupled thereto such that the first print head row 155 and/or the second print head row 157 of the plurality of print heads 156 are securely fixed relative to the plurality of print heads 156 of the third print head row 256.

Figure 14:
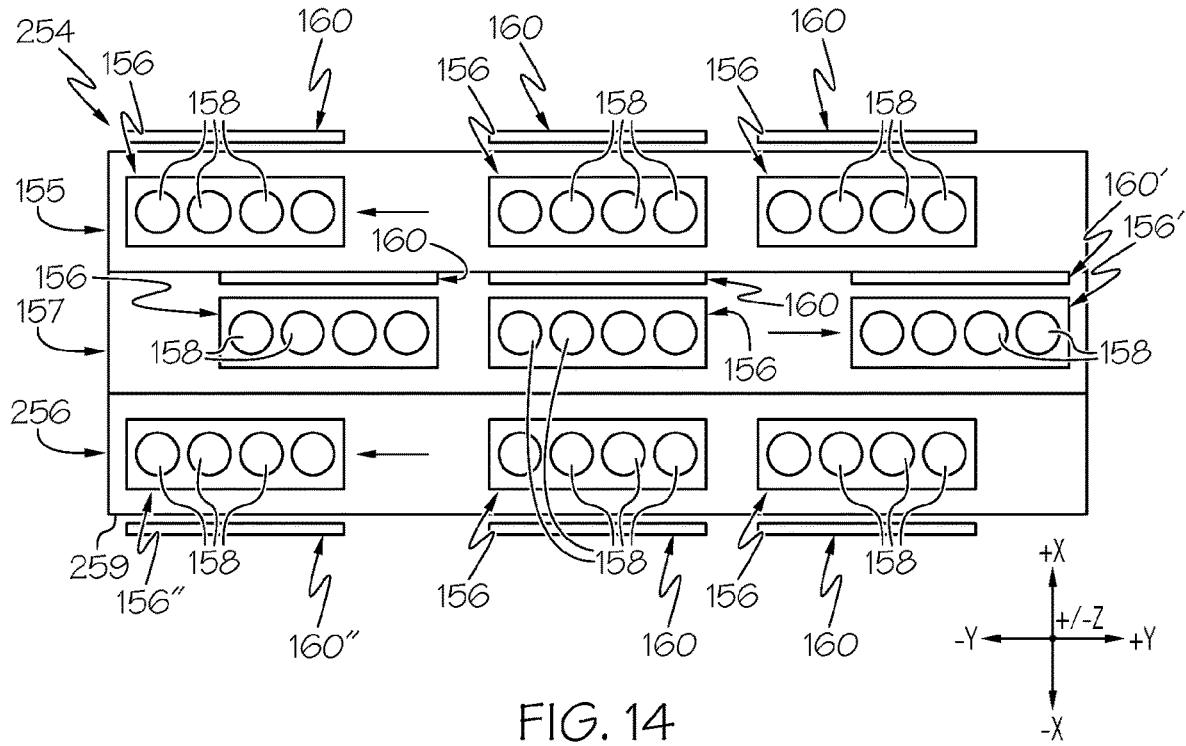
FIG. 14 schematically depicts an embodiment of a printing assembly for a manufacturing apparatus, with three print heads in respective rows that are movable according to one or more embodiments shown and described herein.

Referring now to FIG. 14, in some embodiments the printing head 254 of the printing assembly includes at least one actuator 160 coupled to at least one of the plurality of print heads 156 positioned within the first print head row 155 of print heads 156, at least one actuator 160 coupled to at least one of the plurality of print heads 156 positioned within the second print head row 157 of print heads 156, and at least one actuator 160 coupled to at least one of the plurality of print heads 156 positioned within the third print head row 256 of print heads 156. In this instance, the actuator (i.e., the first actuator 160) coupled to the at least one print head 156 of the first print head row 155 (i.e., the first print head 156) is configured to move the first print head 156 within the first print head row 155 independent of the plurality of print heads 156 of the first print head row 155 and the plurality of print heads 156 of the second print head row 157 and the third print head row 256.

Further, the actuator (i.e., the second actuator 160') coupled to the at least one print head 156 of the second print head row 157 (i.e., the second print head 156') is configured to move the second print head 156' within the second print head row 157 independent of the plurality of print heads 156 of the second print head row 157 and the plurality of print heads 156 of the first print head row 155 and the third print head row 256. Similarly, the actuator (i.e., the third actuator 160") coupled to the at least one print head 156 of the third print head row 256 (i.e., the third print head 156") is configured to move the third print head 156" within the third print head row 256 independent of the plurality of print heads 156 of the third print head row 256 and the plurality of print heads 156 of the first print head row 155 and the second print head row 157.

Still referring to FIG. 14, the first print head 156, the second print head 156', and the third print head 156" move relative to the support bracket 152 of the printing assembly (See FIG. 1B). In particular, the actuators 160, 160', 160" translate the print heads 156, 156', 156" in a direction transverse to the working axis 116 of the apparatus 100 (i.e., in the +/−Y direction of the coordinate axes depicted in the figures) such that a relative position in the +/−Y direction between the print heads 156, 156', 156" and the support bracket 152 changes. As will be described in greater detail herein, in some embodiments, a relative distance between the print heads 156, 156', 156" and the adjacent print heads 156 of another print head row 155, 157, 256 may also be adjusted in response to a translation of the print head 156, 156', 156" within its respective print head row 155, 157, 256.

In the present example, the first print head 156 of the first print head row 155 and the third print head 156" of the third print head row 256 are depicted as being moved in the −Y direction of the coordinate axes while the second print head 156' of the second print head row 157 disposed therebetween is depicted as being moved in the +Y direction of the coordinate axes. In other embodiments, the first print head 156 of the first print head row 155 and/or the second print head 156' of the second print head row 157, and the other plurality of print heads 156 within the print head rows 155, 157, respectively, may not include an actuator coupled thereto such that the first print head row 155 and/or the second print head row 157 of the plurality of print heads 156 are securely fixed relative to at least the third print head 156" of the third print head row 256.

Still referring to FIG. 14, in some embodiments the printing head 254 of the printing assembly includes a plurality of actuators 160, and in particular at least one actuator 160 for each of the plurality of print heads 156 of the first print head row 155, the second print head row 157, and the third print head row 256. In this instance, and as described in greater detail herein, each of the plurality of print heads 156 of the first print head row 155, the second print head row 157, and the third print head row 256 may move relative to one another in response to an actuation of the respective actuator 160 coupled thereto. In other words, each of the plurality of print heads 156 of the first print head row 155, the second print head row 157, and the third print head row 256 are movable independent of one another such that adjacent print heads 156 may translate in opposite directions and/or at varying degrees (i.e., distances) relative to one another and the support bracket 152 (See FIG. 1B) along the +/−Y direction of the coordinate axes. As described in greater detail herein, in other embodiments the plurality of print heads 156 of the first print head row 155, the second print head row 157, and/or the third print head row 256 may not include an actuator coupled thereto, respectively, such that the print head row of the plurality of print heads 156 is securely fixed relative to one another and relative to the plurality of print heads 156 of the other rows.

Figure 15:
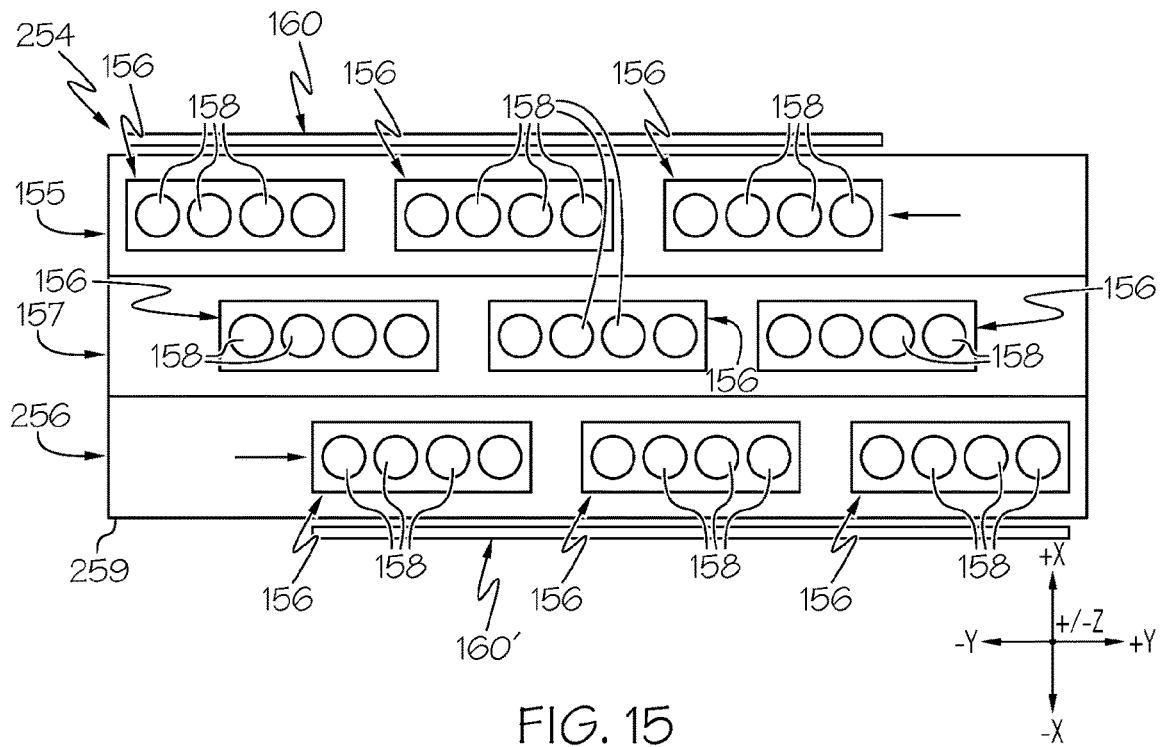
FIG. 15 schematically depicts an embodiment of a printing assembly for a manufacturing apparatus, with a pair of outer rows of print heads that are movable relative to a fixed center row according to one or more embodiments shown and described herein.

Referring now to FIG. 15, in some embodiments at least one of the rows of the plurality of print heads 156 may not include an actuator 160 coupled thereto such that the print head row of print heads 156 is securely fixed relative to the remaining rows. In the present example, the plurality of print heads 156 of the first print head row 155 and the plurality of print heads 156 of the third print head row 256 include a single actuator 160 coupled thereto, respectively, while the plurality of print heads 156 of the second print head row 157 do not include an actuator 160. In this instance, the plurality of print heads 156 of the first print head row 155 and the plurality of print heads 156 of the third print head row 256 are movable relative to the plurality of print heads 156 of the second print head row 157. In particular, the actuators 160 coupled to the first print head row 155 and the third print head row 256, respectively, translate the plurality of print heads 156 of the first print head row 155 and the third print head row 256 in a direction transverse to the working axis 116 of the apparatus 100 (i.e., in the +/−Y direction of the coordinate axes depicted in the figures).

Specifically, actuation of the actuators 160 provides a simultaneous translation of the plurality of print heads 156 included in each of the first print head row 155 and the third print head row 256, respectively, relative to the fixed configuration of the plurality of print heads 156 of the second print head row 157. In this instance, a relative distance between each of the plurality of print heads 156 of the first print head row 155 and the third print head row 256 are maintained such that the offset (i.e. spacing) between adjacent print heads 156 within the respective rows are not changed as the print head rows 155, 256 of print heads 156 translate. In the present example, the plurality of print heads 156 of the first print head row 155 are depicted as being moved in the −Y direction of the coordinate axes and the plurality of print heads 156 of the third print head row 256 are depicted as being moved in the +Y direction, while the plurality of print heads 156 of the second print head row 157 disposed therebetween is depicted as being fixed.

With the first print head row 155 translated in the −Y direction and the third print head row 256 translated in the +Y direction, and the second print head row 157 maintained in a fixed orientation therebetween, an effective printing width of the printing head 254 may be increased. In other words, with one or more of the print head rows 155, 157, 256 coupled to at least one actuator 160, the printing head 154 of the printing assembly may generate a variable printing width that is configured to expand or contract the print head rows 155, 157, 256 as necessary. It should be understood that a direction of translation and/or positions of the first print head row 155 and the third print head row 256 may be interchangeable and/or at varying other degrees than that shown and described herein.

Figure 16:
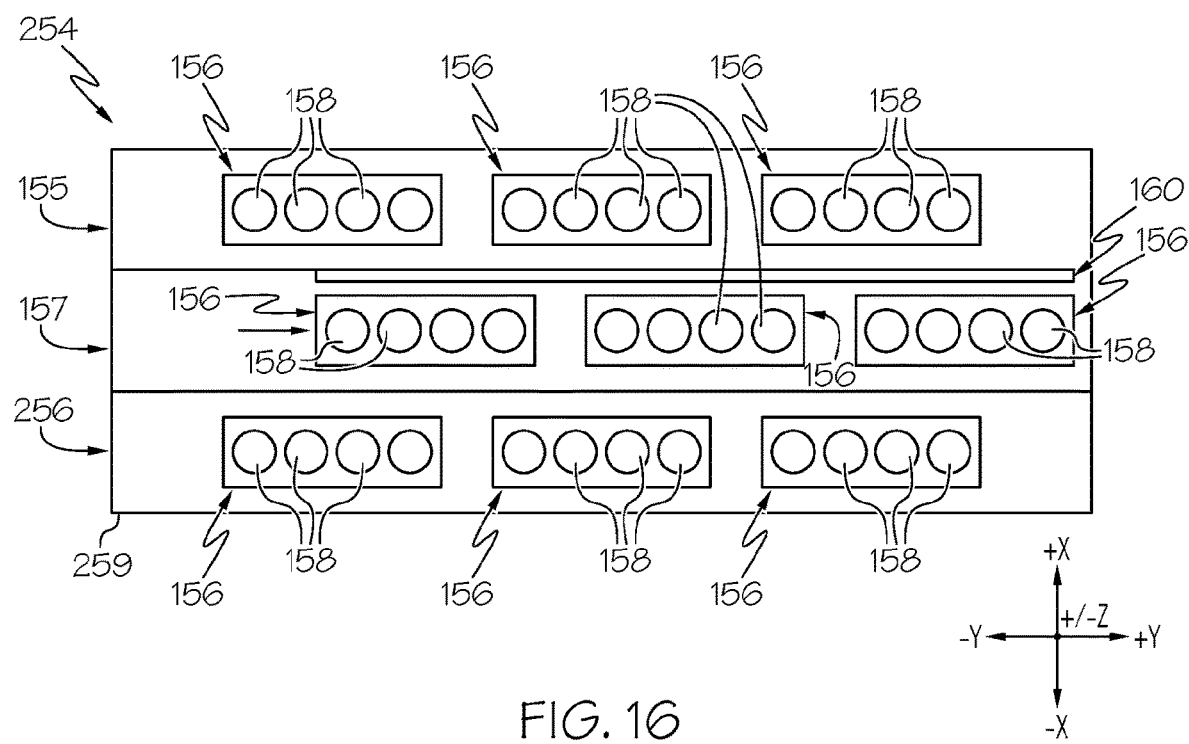
FIG. 16 schematically depicts an embodiment of a printing assembly for a manufacturing apparatus, with a pair of outer rows of print heads that are fixed relative to a movable center row according to one or more embodiments shown and described herein.

Referring now to FIG. 16, in other embodiments the second print head row 157 of the plurality of print heads 156 may include the actuator 160 coupled thereto while the plurality of print heads 156 of the first print head row 155 and the third print head row 256 do not include an actuator 160, respectively. In this instance, the actuator 160 is configured to move the plurality of print heads 156 of the second print head row 157 simultaneously and independent of the immovable print heads 156 of the first print head row 155 and the third print head row 256. It should be understood that other arrangements and combinations of actuators 160 coupled to the one or more rows of the printing assembly may be incorporated herein without departing from the scope of the present disclosure. For example, a single actuator 160 may be coupled to the plurality of print heads 156 defining all three rows (i.e., the first print head row 155, the second print head row 157 and the third print head row 256) such that actuation of the actuator 160 provides for a simultaneous translation of all the plurality of print heads 156 of the printing head 254 relative to the support bracket 152 of the printing assembly (See FIG. 1B). It should further be understood that additional rows of print heads 156 along the printing heads 154, 254 may be included in the printing assemblies in other embodiments. Although the multiple rows of the printing assemblies shown and described herein are identified as a first, second, and third row positioned in sequential order relative to one another, it should be understood that a location of the rows of the printing assemblies are interchangeable with one another such that various other arrangements and orientations of the rows may be included within the printing heads 154, 254 without departing from the scope of the present disclosure.

In some embodiments, the actuators 160 of the printing head 254 are configured to move one or more of the plurality of print heads 156 of the first print head row 155, the second print head row 157, and/or the third print head row 256 in various other directions other than those shown and described above. For example, the actuators 160 of the printing head 254 may be configured to move one or more of the plurality of print heads 156 of the first print head row 155, the second print head row 157, and/or the third print head row 256 in a direction parallel to the working axis 116 of the apparatus 100 (i.e., in the +/−X direction of the coordinate axes depicted in the figures), in another direction transverse to the working axis 116 (i.e., in the +/−Z direction of the coordinate axes depicted in the figures), and the like. It should be understood that other combinations of printing assemblies including one or more rows of movable and fixed print heads 156 may be included in the printing head 254 without departing from the scope of the present disclosure.

Referring now to FIGS. 17A-17G, in some embodiments the actuator 160 of the printing assembly may comprise a fine actuator, a coarse actuator, and/or both. The fine actuator and the coarse actuator are each configured to move at least one print head 156, and/or the plurality of print heads 156, of a particular row (e.g., the first print head row 155) relative to the support bracket 152 of the printing assembly in a direction that is transverse to the working axis 116 of the apparatus 100 (i.e., in the +/−Y direction of the coordinate axes depicted in the figures). In particular, the fine actuator is operable to move the print head(s) 156 of the first print head row 155 at a degree of movement resolution that is greater than a relative degree of movement resolution of the coarse actuator. In other words, the fine actuator is configured to move the plurality of print heads 156 at a fine movement degree of resolution that provides for precise movement tracking ability with high precision. The coarse actuator is configured to move the plurality of print heads 156 at a coarse movement degree of resolution that provides for large stroke movement tracking ability with lower precision relative to the fine actuator. It should be understood that in some embodiments a single actuator 160 may comprise both a fine actuator and a coarse actuator such that the actuator 160 is operable to move the print heads 156 of the first print head row 155 at both a fine movement degree of resolution and coarse movement degree of resolution such that the actuator 160 provides precise and large stroke movement tracking capabilities.

The fine actuator may comprise various devices, such as, for example, a piezoelectric linear positioner, a mechanical actuator, an electro-mechanical actuator, a pneumatic actuator, a hydraulic actuator, linear stages, a belt-driven actuator, or any other actuator suitable for providing linear motion. The coarse actuator 164 may comprise various devices, such as, for example, a magnetic linear drive, a mechanical actuator, an electro-mechanical actuator, a pneumatic actuator, a hydraulic actuator, linear stages, a belt-driven actuator, or any other actuator suitable for providing linear motion. It should be understood that although the present examples shown and described herein illustrate the fine actuator and the coarse actuator utilized with the printing assembly 150, the actuators may similarly be incorporated other printing assemblies that include additional and/or fewer rows of print heads 156 without departing from the scope of the present disclosure.

The following figures and description provide illustrative examples of printing assemblies including at least one of a fine actuator or coarse actuator and a corresponding movement degree of resolution of a plurality of print heads 156 defining a print head row 155 provided by the actuator.

Figure 17A:
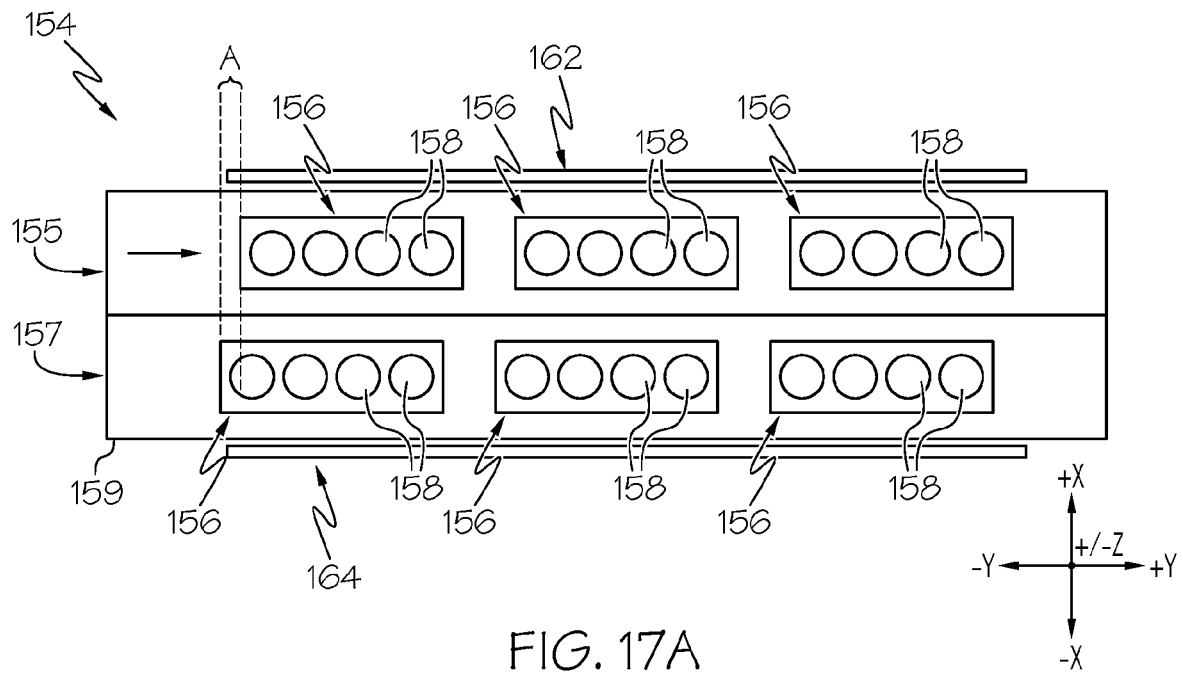
FIG. 17A schematically depicts an embodiment of a printing assembly for a manufacturing apparatus, with a first print head row of print heads coupled to a fine actuator for moving the first print head row according to one or more embodiments shown and described herein.

Specifically referring to FIG. 17A, as a first example, the printing assembly 150 includes a fine actuator 162 coupled to the first print head row 155 of the plurality of print heads 156 and a coarse actuator 164 coupled to the second print head row 157 of the plurality of print heads 156. In this instance, the fine actuator 162 is configured to move the plurality of print heads 156 of the first print head row 155 in a direction that is transverse to the working axis 116 of the apparatus 100 at a fine movement degree of resolution. In particular, actuation of the fine actuator 162 provides for a translation of the plurality of print heads 156 of the first print head row 155 in the +Y direction of the coordinate axes of the figures by an incremental distance "A" that is equivalent to approximately one-third of a diameter of a jet nozzle 158. In other words, the plurality of print heads 156 of the first print head row 155 are laterally offset relative to the plurality of print heads 156 of the second print head row 157 from a default position to an actuated position, where the lateral offset is approximately one-third a width of a jet nozzle 158. It should be understood that the fine actuator 162 may be configured to translate the plurality of print heads 156 from the default position to an actuated position at various other incremental distances that are greater than or less than the one-third distance "A" and in various other directions than the +Y direction shown and described herein.

Figure 17B:
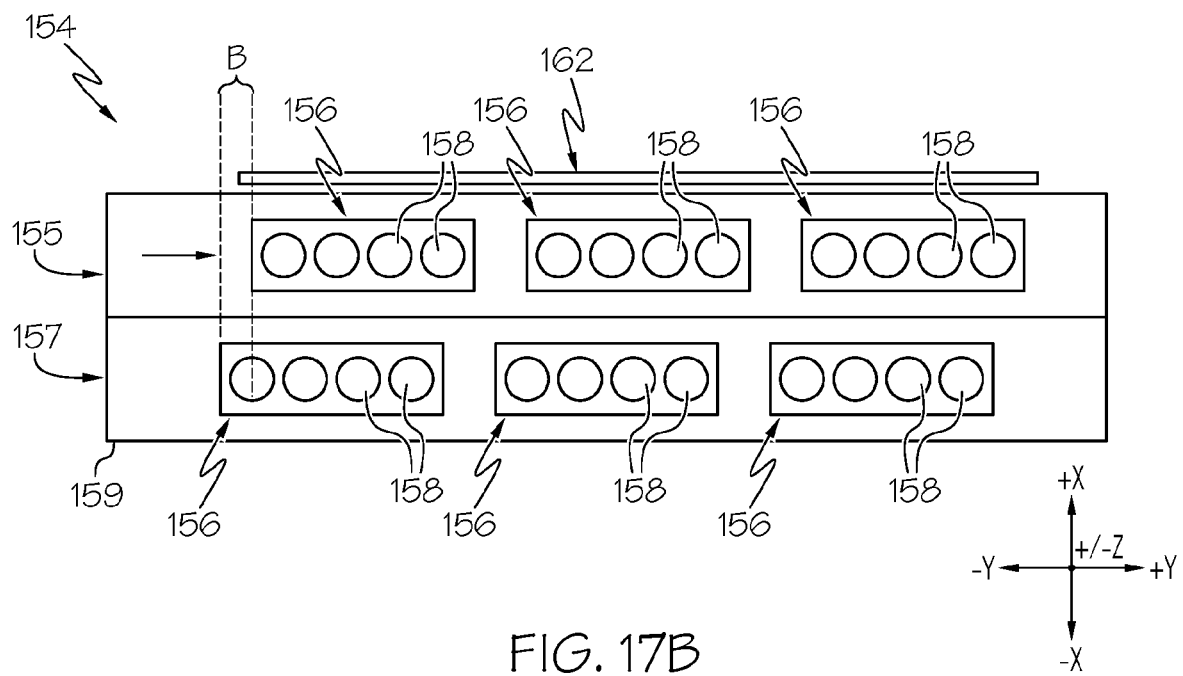
FIG. 17B schematically depicts an embodiment of a printing assembly for a manufacturing apparatus, with a first print head row of print heads coupled to a fine actuator for moving the first print head row according to one or more embodiments shown and described herein.

Referring to FIG. 17B, as another example, a fine actuator 162 is coupled to the first print head row 155 of the plurality of print heads 156 and is configured to move the plurality of print heads 156 of the first print head row 155 in a direction that is transverse to the working axis 116 at a fine movement degree resolution that is equivalent to an incremental distance "B" that is approximately one-half a diameter of a jet nozzle 158. In other words, the plurality of print heads 156 of the first print head row 155 are laterally offset relative to the plurality of print heads 156 of the second print head row 157 by the fine actuator 162 from a default position to an actuated position, where the lateral offset is approximately one-half a width of a jet nozzle 158. Although not shown, it should be understood that additional actuators may be included, such as, for example, the coarse actuator 164 coupled to the first print head row 155 and/or the second print head row 157 of the plurality of print heads 156.

Figure 17C:
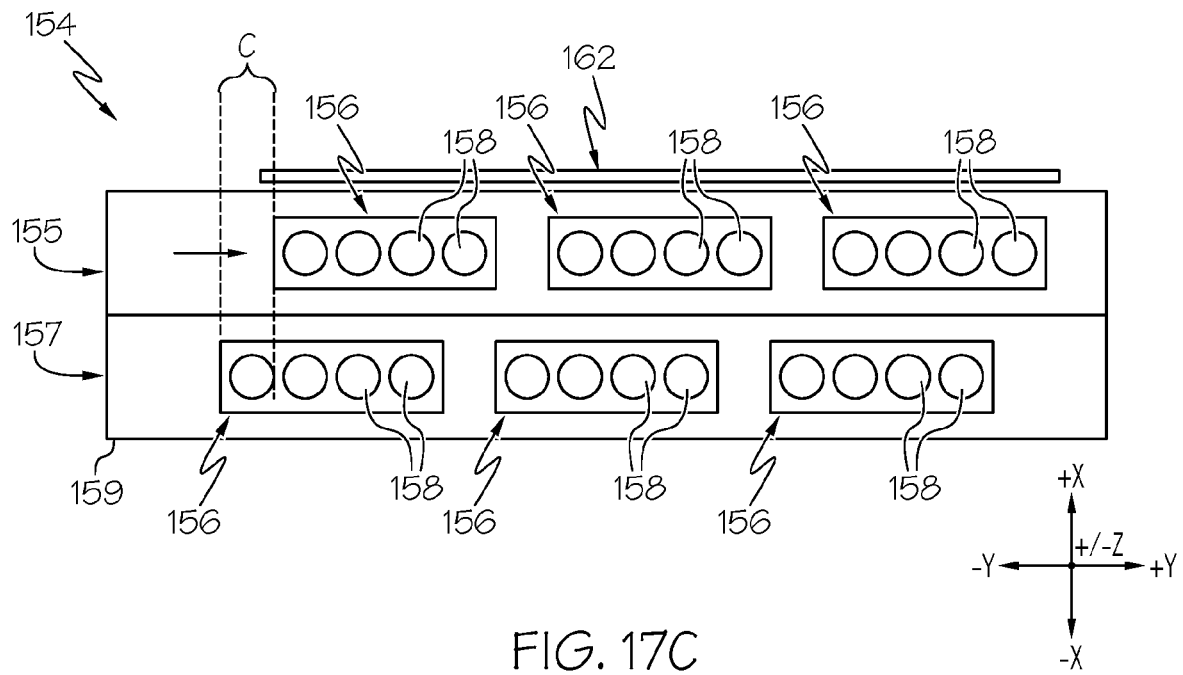
FIG. 17C schematically depicts an embodiment of a printing assembly for a manufacturing apparatus, with a first print head row of print heads coupled to a fine actuator for moving the first print head row according to one or more embodiments shown and described herein.

Referring to FIG. 17C, as a further example, a fine actuator 162 is coupled to the first print head row 155 of the plurality of print heads 156 and is configured to move the plurality of print heads 156 of the first print head row 155 in a direction that is transverse to the working axis 116 at a fine movement degree resolution that is equivalent to an incremental distance "C" that is approximately one full diameter of a jet nozzle 158. In other words, the plurality of print heads 156 of the first print head row 155 are laterally offset relative to the plurality of print heads 156 of the second print head row 157 by the fine actuator 162 from a default position to an actuated position, where the lateral offset is approximately a full width of a jet nozzle 158. It should be understood that the fine actuator 162 is configured to translate the plurality of print heads 156 from the default position to an actuated position at various other incremental distances that may be greater than or less than those shown and described herein and/or in various other directions. Although not shown, it should be understood that additional actuators may be included, such as, for example, the coarse actuator 164 coupled to the first print head row 155 and/or the second print head row 157 of the plurality of print heads 156.

Figure 17D:
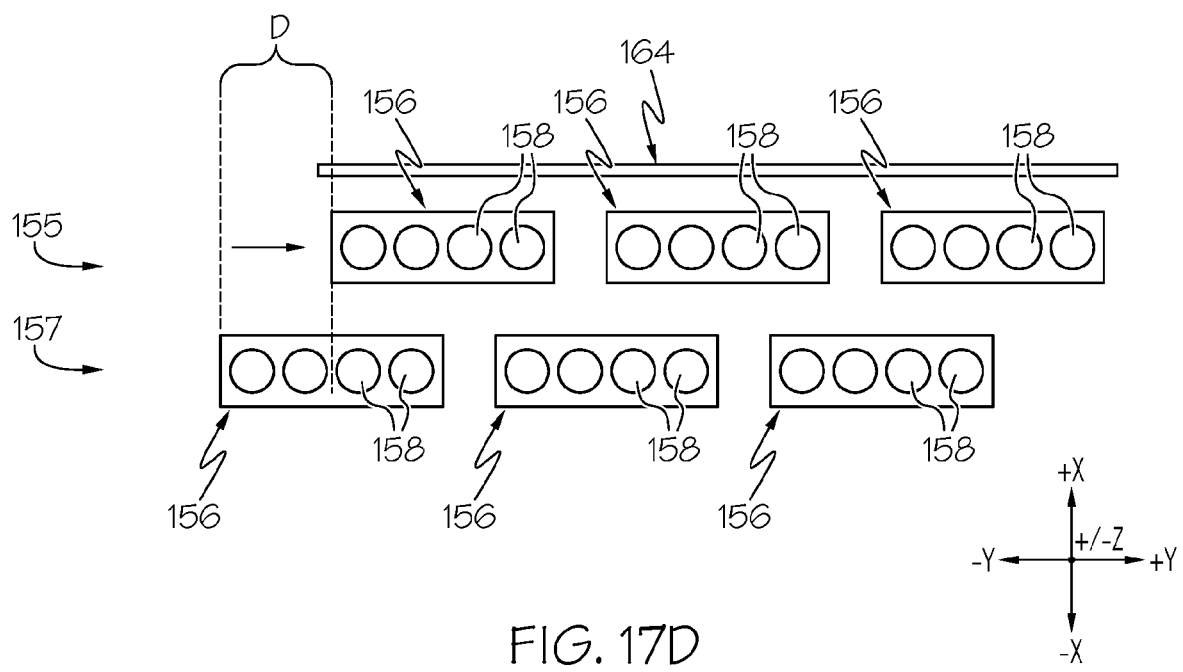
FIG. 17D schematically depicts an embodiment of a printing assembly for a manufacturing apparatus, with a first print head row of print heads coupled to a coarse actuator for moving the first print head row according to one or more embodiments shown and described herein.

Referring now to FIG. 17D, the printing assembly 150 includes a coarse actuator 164 coupled to the first print head row 155 of the plurality of print heads 156. In this instance, the coarse actuator 164 is configured to move the plurality of print heads 156 of the first print head row 155 in a direction that is transverse to the working axis 116 of the apparatus 100 at a coarse movement degree of resolution. In particular, actuation of the coarse actuator 164 provides for a translation of the plurality of print heads 156 of the first print head row 155 in the +Y direction of the coordinate axes of the figures by an incremental distance "D" that is equivalent to approximately one-half a width of a print head 156. In other words, the plurality of print heads 156 of the first print head row 155 are laterally offset relative to the plurality of print heads 156 of the second print head row 157 from a default position to an actuated position, where the lateral offset is approximately half a width of a print head 156. It should be understood that the coarse actuator 164 is configured to translate the plurality of print heads 156 from the default position to an actuated position at various other incremental distances that are greater than or less than the one-half distance "D" and/or in various other directions other than the +Y direction shown and described herein. Although not shown, it should be understood that additional actuators may be included, such as, for example, the fine actuator 162 coupled to the first print head row 155 and/or the second print head row 157 of the plurality of print heads 156.

Figure 17E:
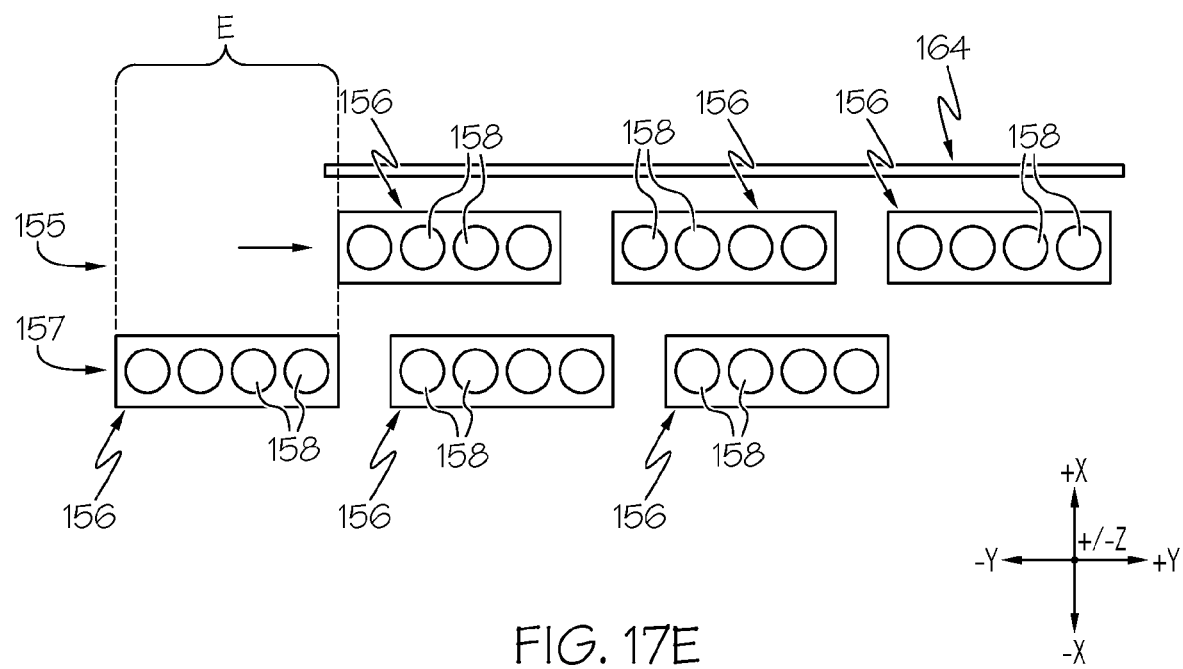
FIG. 17E schematically depicts an embodiment of a printing assembly for a manufacturing apparatus, with a first print head row of print heads coupled to a coarse actuator for moving the first print head row according to one or more embodiments shown and described herein.

Referring to FIG. 17E, as another example, a coarse actuator 164 is coupled to the first print head row 155 of the plurality of print heads 156 and is configured to move the plurality of print heads 156 of the first print head row 155 in a direction that is transverse to the working axis 116 at a coarse movement degree resolution. In the present example, the coarse movement degree resolution is equivalent to an incremental distance "E" that is approximately a full width of a print head 156. In other words, the plurality of print heads 156 of the first print head row 155 are laterally offset relative to the plurality of print heads 156 of the second print head row 157 by the coarse actuator 164 from a default position to an actuated position, where the lateral offset is approximately one width of a print head 156. Although not shown, it should be understood that additional actuators may be included, such as, for example, the fine actuator 162 coupled to the first print head row 155 and/or the second print head row 157 of the plurality of print heads 156.

Referring to FIG. 17F, as a further example, a coarse actuator 164 is coupled to the first print head row 155 of the plurality of print heads 156 and is configured to move the plurality of print heads 156 of the first print head row 155 in a direction that is transverse to the working axis 116 at a coarse movement degree resolution. In the present example, the coarse movement degree resolution is equivalent to an incremental distance "F" that is approximately 1.5× a width of a print head 156. In other words, the plurality of print heads 156 of the first print head row 155 are laterally offset relative to the plurality of print heads 156 of the second print head row 157 by the coarse actuator 164 from a default position to an actuated position, where the lateral offset is approximately 150% a width of a print head 156. Although not shown, it should be understood that additional actuators may be included, such as, for example, the fine actuator 162 coupled to the first print head row 155 and/or the second print head row 157 of the plurality of print heads 156.

Referring to FIG. 17G, as another example, a coarse actuator 164 is coupled to the first print head row 155 of the plurality of print heads 156 and is configured to move the plurality of print heads 156 of the first print head row 155 in a direction that is transverse to the working axis 116 at a coarse movement degree resolution. In the present example, the coarse movement degree resolution is equivalent to an incremental distance "G" that is approximately a width of two print heads 156. In other words, the plurality of print heads 156 of the first print head row 155 are laterally offset relative to the plurality of print heads 156 of the second print head row 157 by the coarse actuator 164 from a default position to an actuated position, where the lateral offset is approximately 200% a width of a print head 156. It should be understood that the coarse actuator 164 is configured to translate the plurality of print heads 156 from the default position to an actuated position at various other incremental distances that may be greater than or less than those shown and described herein and/or at various other directions. Although not shown, it should be understood that additional actuators may be included, such as, for example, the fine actuator 162 coupled to the first print head row 155 and/or the second print head row 157 of the plurality of print heads 156.

Figure 18A:
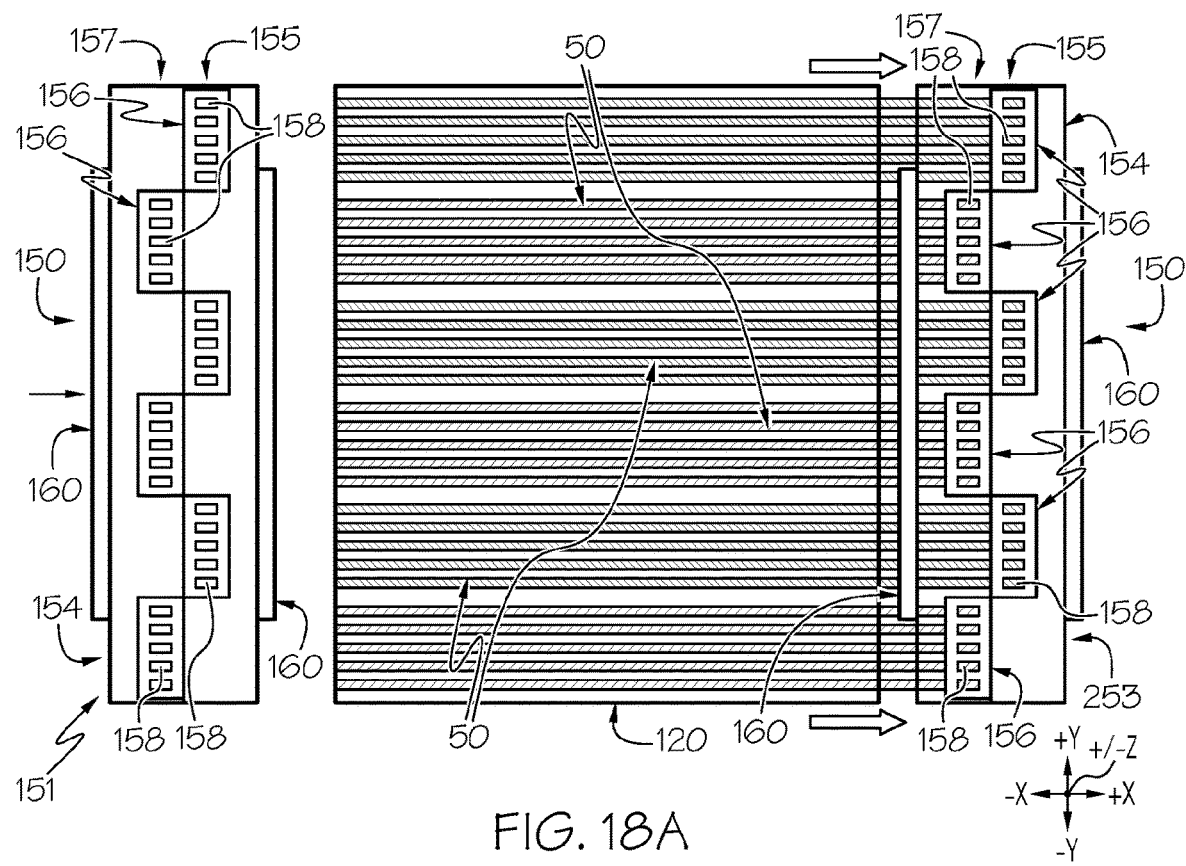
FIG. 18A schematically depicts an embodiment of a printing assembly for a manufacturing apparatus with a first material deposited from the pair of rows of print heads along a first pass according to one or more embodiments shown and described herein.
Figure 18B:
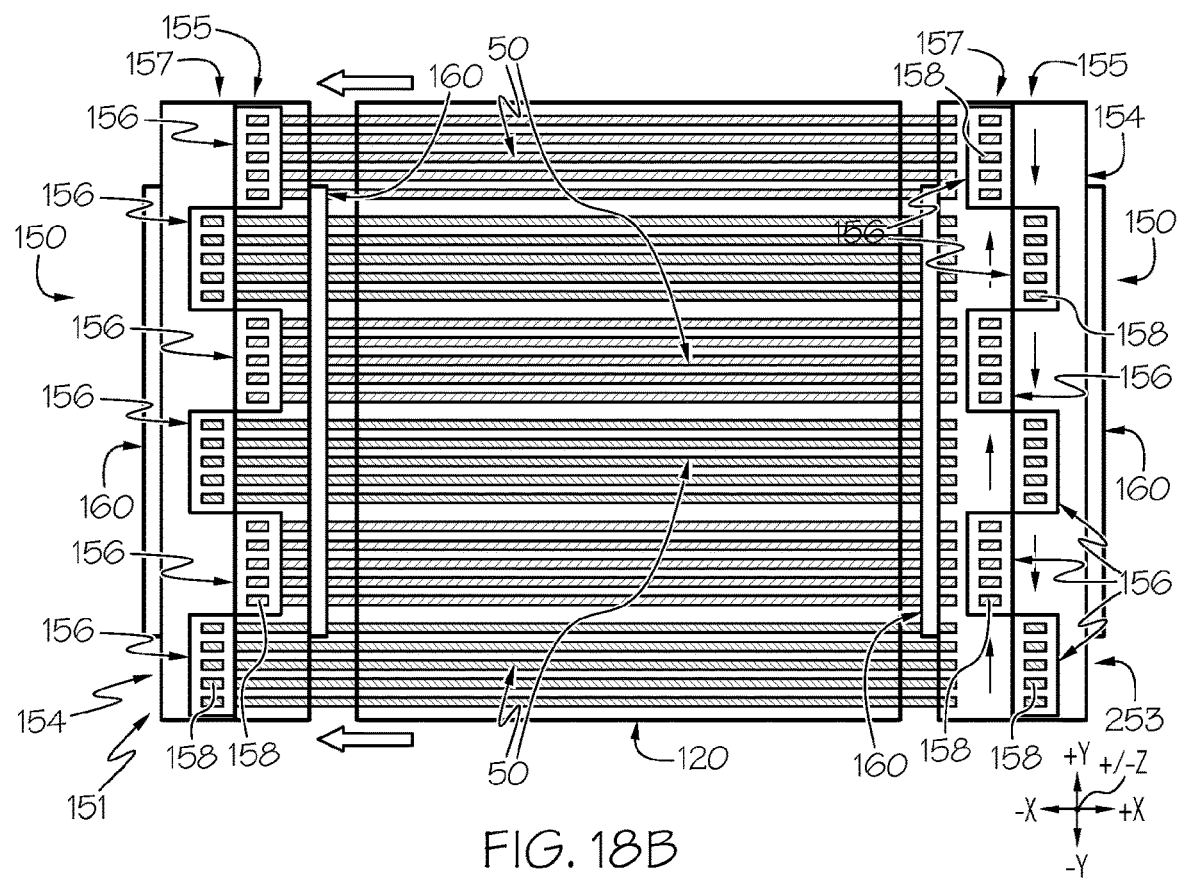
FIG. 18B schematically depicts the printing assembly of FIG. 18A with the first material deposited from the pair of rows of print heads along a second pass according to one or more embodiments shown and described herein.
Figure 24:
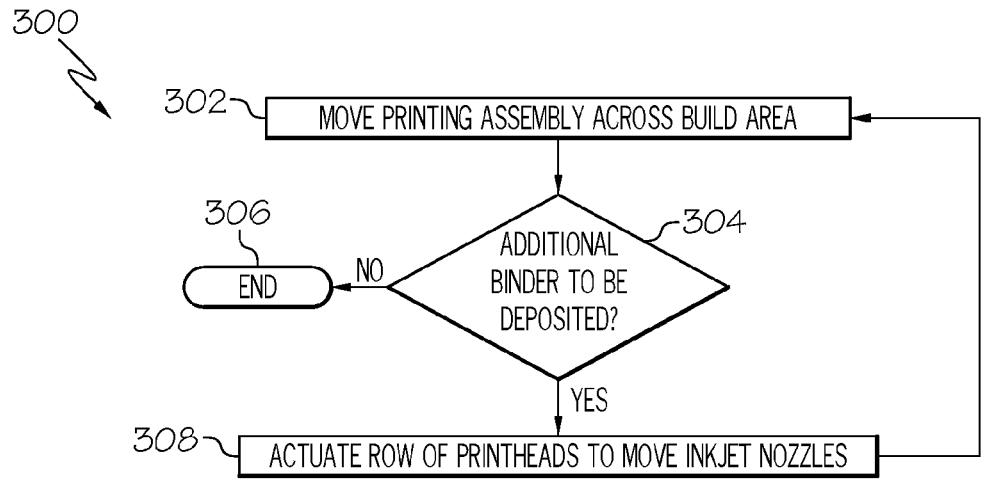
FIG. 24 depicts a flow diagram of an illustrative method of depositing material with a printing assembly with movable rows of print heads according to one or more embodiments shown and described herein.

Referring now to FIGS. 18A-18B in conjunction with the flow diagram of FIG. 24, an exemplary method 300 of actuating the multiple print head rows 155, 157 of the printing assembly 150 as the manufacturing apparatus 100 builds an object is schematically depicted. More specifically, movement of the multiple print head rows 155, 157 of the plurality of print heads 156 for depositing binder material 50 and/or other materials 114, 115 along the build area 120 serves to reduce an occurrence of a resolution defect on the printed object or part during the image transfer process due to lack of jetting redundancy. The depiction of FIGS. 18A-18B and 24, and the accompanying description below, is not meant to limit the subject matter described herein or represent an exact description of how materials may be deposited from the printing assembly 150, but instead is meant to provide a simple schematic overview to illustrate the general movement of multiple print head rows 155, 157 of print heads 156 of the printing assembly 150 to improve jetting redundancy as described herein.

Referring to FIG. 18A and at step 302, the computer readable and executable instructions stored within the non-transitory memory of the control system 10, when executed by the processor of the control system 10, transmits a signal to the first actuator assembly 102 to initiate movement of the printing assembly 150 across the build area 120 in a first pass. In particular, the printing assembly 150 translates across the rail 104 of the apparatus 100 and along the working axis 116 (see FIG. 1A) thereby moving the printing head 154 over the build area 120 in the +X direction of the coordinate axes of the figures. The control system 10 transmits a signal to the plurality of print heads 156 of the first print head row 155 and the second print head row 157 to release a material from the plurality of jet nozzles 158 as the printing head 154 of the printing assembly 150 moves over the build area 120. The material (e.g., the binder material 50, the first material 114 from the first fluid reservoir 110, the second material 115 from the second fluid reservoir 112, and the like) is transferred to the printing head 154 and deposited onto the build area 120 through the plurality of jet nozzles 158 of the plurality of print heads 156 in both the first print head row 155 and the second print head row 157.

In the present example, the plurality of print heads 156 of the first print head row 155 and the plurality of print heads 156 of the second print head row 157 deposit material along the build area 120. Accordingly, each of the plurality of jet nozzles 158 of the plurality of print heads 156 from the first print head row 155 and the second print head row 157 may be mapped to trajectory across the build area 120. The trajectory defines a plurality of pixels that may or may not receive binder deposited from one or more of the plurality of jet nozzles 158 as the printing assembly 150 traverses the build area 120. It should be understood that a "pixel" refers to a 2-dimensional spatial portion of the object or part to-be-printed by the apparatus 100, and in particular a current slice or layer of the three-dimensional part relative to its positioning along the build area 120. Similarly, it is understood that a "voxel" refers to a 3-dimensional spatial portion of the build material that is combined with binder forming a physical portion of the component printed by the apparatus 100. In some embodiments, a plurality of pixels and/or voxels defining spatial portions of the build material 40 within the build area 120 may be defined based on a digital build file (e.g., defining deposition patterns and/or apparatus control instructions stored and/or uploaded to the control system 10) of the component to be built by the apparatus 100. The pixels per layer of a build may be defined along to a trajectory the printing assembly 150 is configured to traverse over the build area 120. Accordingly, the control system 10 may map one or more jet nozzles to a trajectory and the corresponding design deposition pattern for the current layer of the build such that the jet nozzles deposit prescribed drop volumes of binder at prescribed locations on the build material 40 in the build area 120. When the printing assembly 150 and/or print heads 156 are shifted, to achieve sub-pixel printing and/or jetting redundancy, the control system 10 remaps trajectory-to-jet nozzle relationships so that the design deposition pattern defining the binder to be applied to the build material is associated with the new jet nozzles aligned with their new trajectories across the build area 120 in response to indexing operations.

Still referring to FIG. 18A, the computer readable and executable instructions, when executed by the processor of the control system 10 determines whether the printing assembly 150 has reached a translated position 253 located in the +/−X direction at or past an edge of the build area 120 where material is to be deposited by the printing assembly 150 in the first pass. The control system 10 determines whether the printing assembly 150 has reached the translated position 253 by, for example, monitoring a relative position of the printing assembly 150 along the rail 104 as the printing assembly 150 translates along the working axis 116 of the apparatus 100 (i.e., +X direction of the coordinate axes of the figures) to the translated position 253. In response to determining that the printing assembly 150 is not positioned at the translated position 253, the control system 10 transmits a signal to the first actuator assembly 102 to continue translating the printing assembly 150 across the build area 120 at step 302. The control system 10 further transmits a signal to the printing assembly 150 to continue releasing material from the plurality of jet nozzles 158 of the print heads 156 of the first print head row 155 and the second print head row 157.

Alternatively, in response to determining that the printing assembly 150 is positioned at the translated position 253, the computer readable and executable instructions, when executed by the processor of the control system 10 transmits a signal to the printing assembly 150 to terminate release of material from the plurality of jet nozzles 158 of the print heads 156 of the first print head row 155 and the second print head row 157. Additionally and/or simultaneously, the control system 10 transmits a signal to the first actuator assembly 102 to terminate movement of the printing assembly 150 along the working axis 116 by ceasing actuation of the first actuator assembly 102. With the printing assembly 150 positioned at the translated position 253, the plurality of pixels along the build area 120 have received material thereon from at least the first print head row 155 or the second print head row 157 during the first pass of the printing assembly 150 over the build area 120 in the +X direction of the coordinate axes.

Referring now to FIG. 18B and at step 304, the control system 10 determines whether an additional layer of material (e.g., binder) is to be deposited and/or released from the printing assembly 150. This determination by the control system 10 may be performed via various means and/or systems, such as, for example, by referring to a part to be built with the apparatus 100, by user input, image sensors, weight sensors, and the like. In response to determining that an additional layer of material (e.g., binder) is not to be released from the printing assembly 150 at step 304, the control system 10 transmits a signal to the apparatus 100 to end the additive manufacturing process of method 300 at step 306.

Alternatively, in response to determining that an additional layer of material (e.g., binder) is to be deposited from the printing assembly 150 at step 304, the computer readable and executable instructions, when executed by the processor of the control system 10 transmits a signal to the actuator(s) 160 of the printing assembly 150 to actuate at least one of the plurality of print heads 156 of the first print head row 155 and/or the second print head row 157 relative to the support bracket 152 of the printing assembly 150 (See FIG. 1B) at step 308. In particular, actuation of at least one actuator 160 that is coupled to at least one of the first print head row 155 and/or the second print head row 157 of the plurality of print heads 156 provides for a translation of the print heads 156 of said row relative to at least the other row of print heads 156 in a direction that is transverse to the working axis 116 of the apparatus 100 (i.e., +/−Y direction of the coordinate axes of the figures). In the present example, the printing assembly 150 includes one actuator 160 coupled to the first print head row 155 of print heads 156 and one actuator 160 coupled to the second print head row 157 of print heads 156, such that both print head rows 155, 157 are movable relative to one another and relative the support bracket 152 of the printing assembly 150.

Still referring to FIG. 18B, the plurality of jet nozzles 158 of each of the plurality of print heads 156 included in the first print head row 155 and the second print head row 157 is repositioned from a default position to an actuated position (e.g., to an indexed position) that differs from the default position by at least some incremental distance (e.g., incremental distances "A"-"G" of FIGS. 17A-17G). Accordingly, during a second pass (i.e., either a return pass over a current layer of powder or a pass over a new layer of powder applied on top of the previous layer) of the printing assembly 150 over the build area 120, at least some of the pixels positioned along the build area 120 will receive material from at least one jet nozzle 158 that is different from the jet nozzle 158 that was mapped to deposited material to said pixel during the first pass.

In some embodiments, during a first pass a first pixel receives binder from a first jet nozzle 158, while during a second pass the first pixel receives binder from a second jet nozzle 158 as a result of a repositioning of one or more of the print heads 156 between the passes. In some instances, the first pass may be configured to deposit a first amount of binder, which is a portion of a total amount prescribed for a portion of powder within a current layer to receive, and the second pass may be configured to deposit a second amount of binder that is the remainder amount of binder prescribed for a portion of powder within the current layer to receive. As described above, delivery of the first amount of binder may be accomplished by a first jet nozzle 158, while the delivery of the second amount of binder may be accomplished by a second jet nozzle 158.

It should be understood that lateral movement of the print heads 156 of the first print head row 155 and/or the second print head row 157 relative to one another, and relative to a prior position of said print head rows 155, 157 from the default position, provides an enhanced jetting redundancy in the manufacturing process by increasing a reliability that a complete resolution of each of the plurality of pixels on the build area 120 receives an adequate deposition of material thereon.

It should be understood that in some embodiments movement of the print head rows 155, 157 of print heads 156 at step 308 may be at an arbitrary fraction, where the control system 10 transmit a signal to the actuators 160 to move the first print head row 155 and/or the second print head row 157 of print heads 156 to a randomly generated position relative to one another. In this embodiment, a jetting redundancy by the printing assembly 150 is passively provided through the repositioning of the plurality of print heads 156 of each print head row 155, 157 in an uncalculated manner such that the plurality of pixels along the build area 120 are effectively aligned with a randomly aligned jet nozzle 158 during a second pass of the printing assembly 150.

In other embodiments, movement of the print head rows 155, 157 relative to one another, and relative to a prior position of said print head rows 155, 157 during a first pass of the printing assembly 150, may be predetermined to predefined locations by the control system 10. In this instance, the compute readable and executable instructions, when executed by the processor of the control system 10, transmits a signal to the actuators 160 to move the first print head row 155 and/or the second print head row 157 of print heads 156 to a measured position that varies relative to a prior position of the print head rows 155, 157 during the first pass. In this embodiment, a jetting redundancy by the printing assembly 150 is actively provided through the repositioning of the plurality of print heads 156 of each print head row 155, 157 in a calculated manner such that the plurality of pixels along the build area 120 are specifically aligned with a jet nozzles 158 during a second pass of the printing assembly 150 that is intentionally varied from the first pass. For example, the control system 10 may transmit a signal to the actuators 160 coupled to the print head rows 155, 157, respectively, to translate the print heads 156 of the print head rows 155, 157 in a manner such that the print head rows 155, 157 trade positions relative to one another.

The control system 10 may determine the calculated positions of the plurality of print heads 156 of the print head rows 155, 157 through various systems, such as, for example, a camera image, a sensor output, a calibration pattern, and the like. In either instance, movement of the print head rows 155, 157 of print heads 156 for a second pass (i.e., either a return pass over a current layer of powder or a pass over a new layer of powder applied on top of the previous layer) of the printing assembly 150 provides an enhanced, material jetting redundancy of the manufacturing process by increasing a reliability that a complete resolution of each of the plurality of pixels on the build area 120 receives an adequate deposition of material thereon from more than one jet nozzle 158. It should be understood that in other embodiments movement of the plurality of print heads 156 of the first print head row 155 and/or the second print head row 157 may occur prior to a first pass of the printing assembly 150 over the build area 120 at step 302.

Turning now to FIGS. 21A-22B, further embodiments and functionality of the apparatus 100 are depicted and described. For example, FIGS. 21A to 21E depict and describe a technique implementing sub jet-spacing indexing of the printing assembly to enable a low resolution print head to operate and deliver material such as binder to powder layers with an increased resolution that further improves green strength uniformity and more refined geometries of a built component. Binderjet printing generally applies binder in discrete increments due to the discretely fixed geometry of the inkjet head configured to dispense binder. However, embodiments described herein provide systems and methods that remove the limitation of the inkjet head geometry by enabling longitudinal and latitudinal motion control and grayscaling-based sub-pixel deposition of binder onto the build material 40 (FIG. 1B) (e.g., powder).

In one instance, an apparatus may be equipped with print heads 156 configured to deliver a drop of binder material in 400 DPI (dots per inch) intervals along a latitudinal axis. However, by enabling the printing assembly 150 with a second actuator assembly 103, the printing assembly may be configured to deliver drops of binder material in much finer increments over subsequent passes along the longitudinal axis by implementing sub-pixel index distances of the printing assembly 150. For example, a 400 DPI print head may be configured to dispense drops of binder between two passes along the longitudinal axis by implementing a sub jet-spacing index of the printing assembly 150 of about one-half a jet-spacing achieving the equivalence of an 800 DPI print head.

In other words, the space between adjacent jet nozzles 158 is fixed therefore there is a fixed spacing between placement of binder across a layer of powder in a single pass. However, by implementing a mechanical shift (e.g., referred to herein as an "index" along the latitudinal axis) of the printing assembly 150, a corresponding index of the jet nozzles 158 is achieved and a second deposition of binder on the same layer or a subsequent layer of powder may be performed thereby increasing the resolution in which binder may be deposited. Correspondingly, build instructions generated for building the component may define pixels having sub-pixels with a higher resolution than the mechanical resolution defined by the jet-spacing (d). Jet-spacing (d) is the center-to-center lateral distance between adjacent jets in the same row of the same print head.

To achieve printing of a higher resolution design deposition pattern (e.g., 125 FIG. 21C) as compared to the mechanical resolution defined by the jet-spacing (d) of the printing assembly, latitudinal indexing of the printing assembly 150 between passes over the build area 120 are implemented as shown and described herein.

In further embodiments, the implementation of a second actuator assembly 103 configured to index the printing assembly 150 along a latitudinal axis enables methods of random redundancy within a build to reduce or remove a compounding effect of a malfunctioning jet. Such embodiments, will be described in more detail with reference to FIGS. 22A-22B.

Suitable actuators may include, without limitation, linear stages, worm drive actuators, ball screw actuators, pneumatic pistons, hydraulic pistons, electro-mechanical linear actuators, or the like. By way of example, the second actuator assembly 103 may comprise a linear stage actuator such as a 150 MM linear motor stage with at least a 4 um accuracy. In some instances, the first actuator assembly 102 and/or the second actuator assembly 103 may include a position sensor 102*a* and/or 103*a*, respectively, that provides the electronic control unit with position information in a feedback control signal such that the electronic control unit may track the position of the printing assembly 150 in response to the provided control signals. In some instances, the electronic control unit may make adjustments to the control signal provided to the first actuator assembly 102 and/or the second actuator assembly 103 based on the position information provided by the position sensor 102*a* and/or 103*a*. In embodiments, the position sensor 102*a* and/or 103*a* may be an encoder, an ultrasonic sensor, a light-based sensor, a magnetic sensor, or the like embedded in or coupled to the first actuator assembly 102 and/or the second actuator assembly 103.

Turning now to FIGS. 21A-21E, a printing assembly 150 is depicted as implemented with a second actuator assembly 103 for latitudinal axis indexing. Similar to the functionality described with reference to FIGS. 17A-17G the printing assembly 150 may be configured to be indexed (e.g., moved laterally with respect to the latitudinal axis) along with offsetting one or more of the plurality of print heads 156 using actuator(s) or independently from the whether or not the plurality of print heads 156 are moveable or moved. That is, in some embodiments, the printing assembly 150 is moveably coupled to the support bracket 152 via a second actuator assembly 103. The second actuator assembly 103, when instructed, for example, by the electronic control unit, moves the printing assembly 150 along a latitudinal axis by an index distance. As described in more detail herein, the term "index distance" may refer to a fractional amount of a jet-spacing (d), an integer multiple of a fractional jet-spacing (d), or a multiple of the jet-spacing (d) (e.g., 1.1×, 1.2×, 1.3×, 1.4×, 1.5×, 1.6×, 1.7×, 1.8×, 1.9×, 2×, 3×, 4×, 5×, 6×, 7×, 8×, 9×, 10×, 50×, 75×, 100×, 200×, 500×, or more jet-spacing (d) units). In some embodiments, the index distance may be, for example, 1 mm, 2 mm, 3 mm, 4 mm, 5 mm, 6, mm, 7 mm, 8 mm, 9 mm, 10 mm, 11 mm, 12 mm, 13 mm, 14 mm, 15 mm, 16 mm, 17 mm, 18 mm, 19 mm, 20 mm, or more or an value between 1.1× and 500× or more. In some embodiments, the index distance may be 5 mm to 20 mm or any value therebetween.

As referenced above the space from one jet nozzle 158 to an adjacent jet nozzle 158 defines a jet-spacing (d) which correlates to the an image pixel. To increase the resolution of a deposition pattern (e.g., 125, 126, or 127, FIGS. 21C-21E, respectively) of binder across the build material (e.g., powder) on the build area 120 having a layer of powder, the second actuator assembly 103 may index the printing assembly 150 comprising a plurality of print heads 156 and plurality of jets by a sub jet-spacing index distance between subsequent passes to and fro along the longitudinal axis.

Figure 21B:
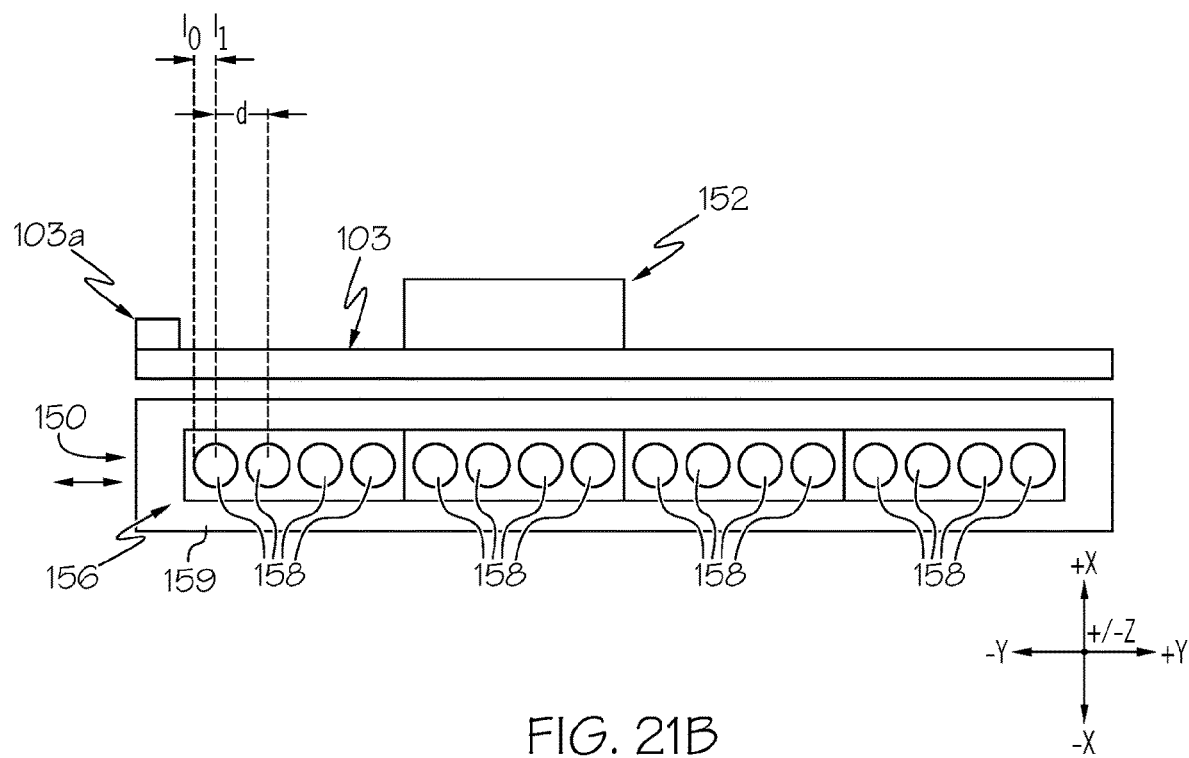
FIG. 21B schematically depicts a printing assembly of FIG. 21A indexed by a fraction of the jet-spacing according to one or more embodiments shown and described herein.

For example, for a first pass along the working axis (i.e., longitudinal axis) the printing assembly 150 may be indexed at a position $I_0$ and a second pass, for example, in the opposite direction to the first pass may be indexed to a position $I_1$ as depicted in FIGS. 21A and 21B. The index distance (i.e., the distance from position $I_0$ to position $I_1$ may be a non-integer multiple of the jet-spacing (d), for example, 1/10×, 1/5×, 1/4×, 1/3×, 1/2×, or any distance greater than zero and less than the jet-spacing (d).

Figure 21C:
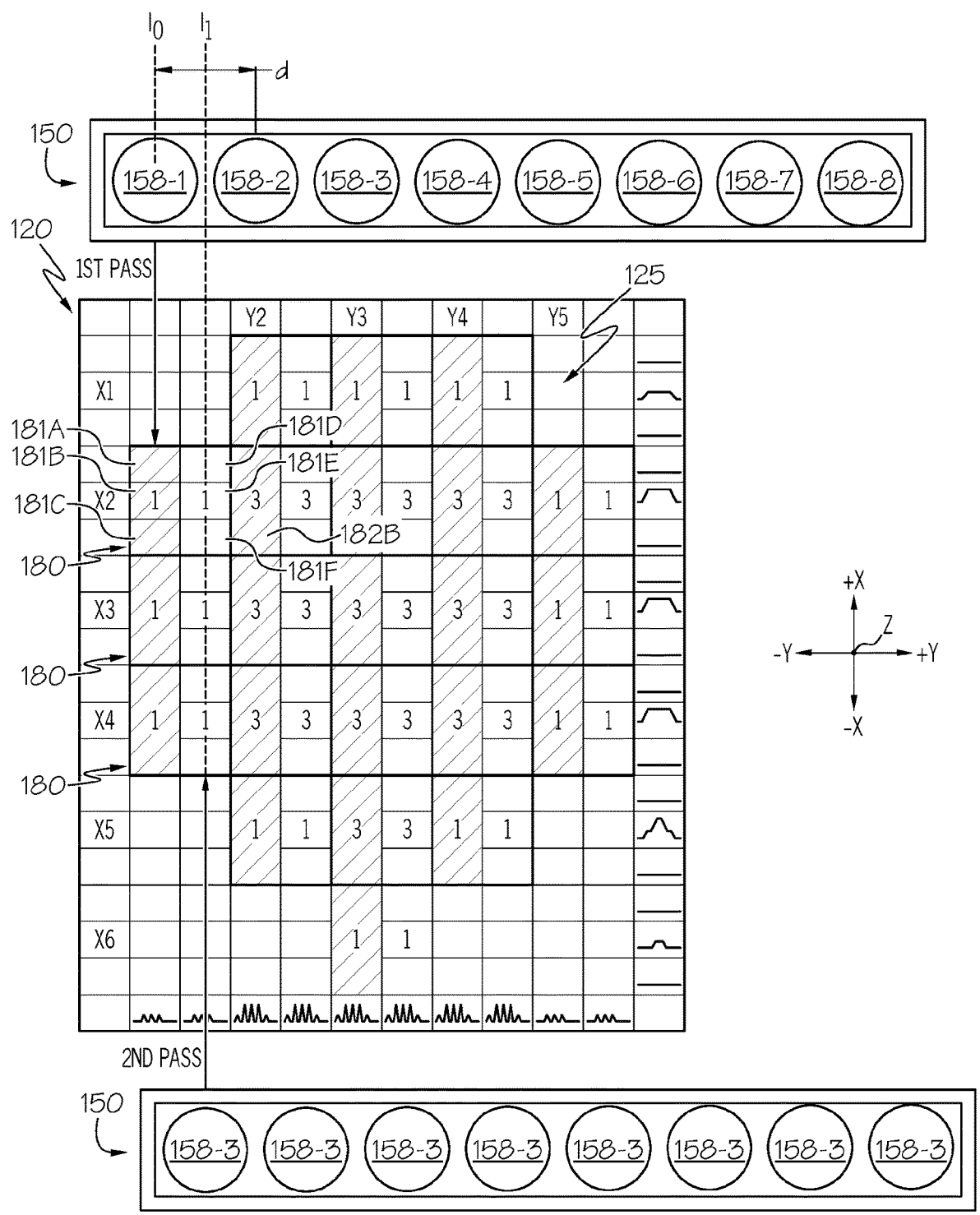
FIG. 21C depicts a top down view of a build area where a sub-pixel index of the print head is implemented between a first pass and a second pass to deposit binder with an increased resolution across the layer of powder according to one or more embodiments shown and described herein.

FIG. 21C depicts a top down view of a build area 120 having a layer of powder (e.g., build material 40) deposited therein and an illustrative representation of a design deposition pattern 125 defining the pixels 180 and sub-pixels 181A-181F a numerical value depicting the a drop volume illustrating a grayvalue amount of binder for deposition at predefined locations. As used herein, "grayvalue" refers to the integer multiple of a smallest unit of drop volume achievable for the print head. FIG. 21C further depicts a printing assembly 150 having a plurality of jet nozzles 158-1 to 158-8. The printing assembly 150 located at the top of the figure is positioned at position $I_0$ with the plurality of jet nozzles 158-1 to 158-8 mapped to traverse a first pass trajectory across the build area 120. The printing assembly 150 located at the bottom of the figure has been index an index distance to position $I_1$ with the plurality of jet nozzles 158-1 to 158-8 mapped to traverse a second pass trajectory across the build area 120.

The center location of a pixel 180 and an adjacent pixel corresponds to the jet-spacing (d) of one jet nozzle 158 to an adjacent jet nozzle 158. Whereas the center of a sub-pixel 181A-181F may be defined within the build instructions as an incremental amount of the jet-spacing (d), thus optionally defining one or more sub-pixel centers 181A-181F within a pixel 180. The sub-pixels 181A-181F may further be assigned a drop volume of binder for deposition by a jet nozzle 158 during a build operation. The size (or foot print) of the sub-pixel may depend on the drop volume of a droplet of binder to be deposited on the corresponding portion of the layer of powder (e.g., build material 40) that the center of the sub-pixel 181A-181F maps to according to the design deposition pattern 125. In some embodiments, the size sub-pixel may be based on the speed the printing assembly 150 traverses the build area 120, the nature or type of the build material 40 (FIG. 1B), the temperature of the build environment, and the like.

Still referring to FIG. 21C, a sub jet-spacing index distance of the printing assembly 150 is implemented between a first pass and a second pass to deposit binder with an increased resolution across the layer of powder within the build area 120. As depicted, a portion of the build material 40 on the build area 120 corresponding to a pixel 180 defined in the deposition pattern 125 receives a first volume of binder along a first pass trajectory within a first sub-pixel 181B and a second volume of binder within second sub-pixel 181E along a second pass trajectory that is indexed from the first pass trajectory by an index distance greater than zero and less than the jet-spacing (d). The binder droplet makes a spot that has a size or diameter with the build material 40 that corresponds to the jet nozzle 158 as it traverses the build area 120. However, in some instances the release of a binder droplet from a jet nozzle 158 must account for the speed at the printing assembly 150 is moving because as the droplet travels from the jet nozzle 158 to the build material 40 the trajectory of the droplet includes a velocity vector in the direction of the printing assembly 150 as well as a velocity component in the direction from the jet nozzle to the build material. That is, compensation with respect to where binder is released with respect to where it is expected to impact the build material may be needed depending on the speed at which the printing assembly 150 traverses the build area 120.

Figure 21D:
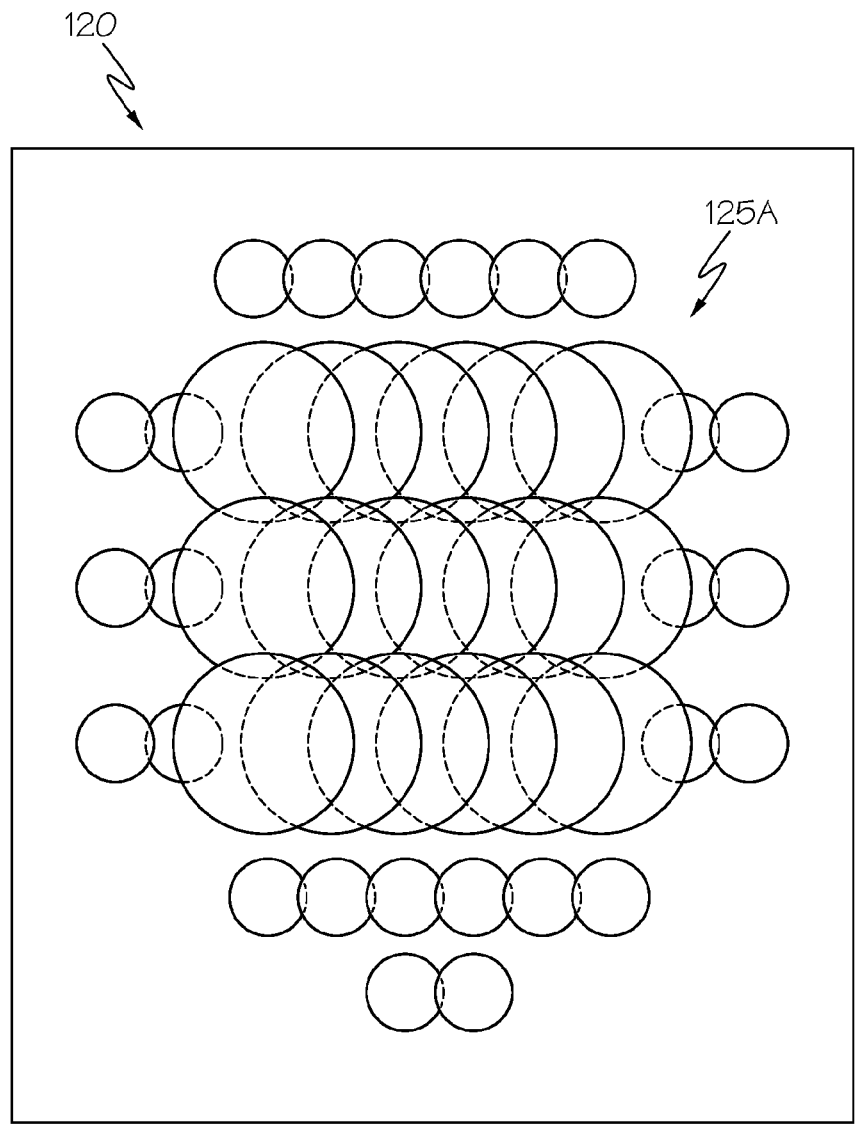
FIG. 21D depicts a top down view of a build area overlaid with an applied deposition pattern of binder according to the design deposition pattern depicted in FIG. 21C according to one or more embodiments shown and described herein.

Turning to FIG. 21D, an illustrative applied deposition pattern 125A resulting from the deposition of binder according to the design deposition pattern depicted in FIG. 21C is depicted. As the binder disperses within the build material 40, the binder may overlap with binder and powder within adjacent sub-pixels. Additionally, as the binder disperses, the binder may seep and/or wick into and/or throughout a volume of the porous layer of powder defining a voxel 30 (FIG. 1A). Depending on the drop volume of the droplet of binder, the thickness (depth along the Z-axis) of the layer of powder, the density of the powder and other variables, the binder may disperse into lower layers of powder further curing a lower layer to an upper layer. It is understood that once the binder finishes wicking and/or curing that the part While a predefined amount of binder for a pixel may be deposited at once within a pixel during a single pass, by dividing the predefined amount of binder for a pixel up into one or more sub-pixel regions during one or more passes of the printing assembly 150 with indexing of the printing assembly 150 between passes binder may be more uniformly integrated with neighboring voxels of build material (e.g., powder) in the build area 120.

Figure 21E:
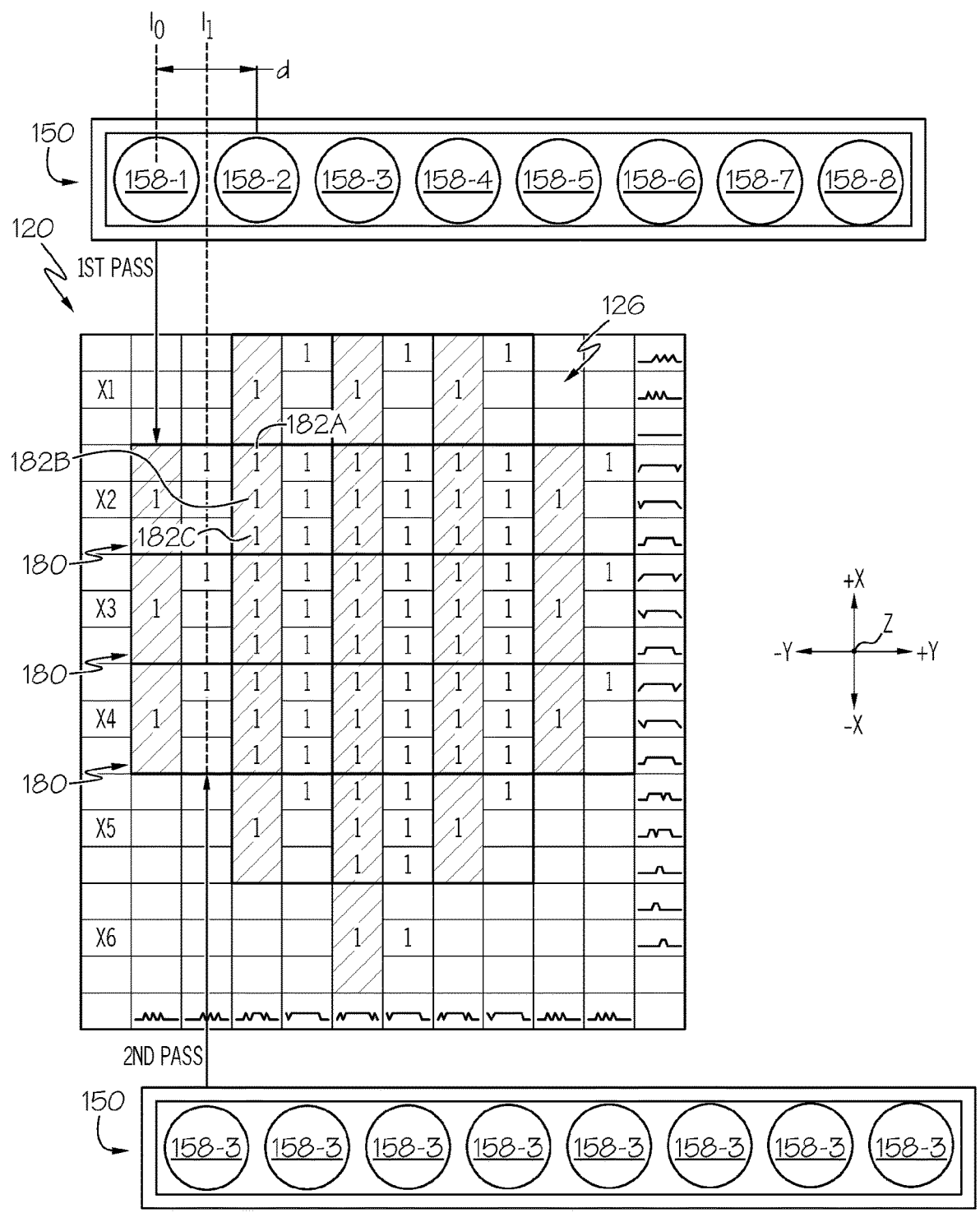
FIG. 21E depicts another illustrative build area where the same amount of binder per pixel as depicted in FIG. 21C is dispensed using a combination of large and small drops at varying locations within the pixel according to one or more embodiments shown and described herein.

Referring to FIG. 21E, another illustrative build area 120 is depicted where the same drop volumes per pixel 180 depicted in FIG. 21C are now dispensed using a multiple smaller drop volumes of binder at varying locations within the pixel 180. For example, in FIG. 21C, the design deposition pattern 125 prescribes one large drop volume (3) in a single location as shown in sub-pixel 182B whereas the design deposition pattern 126 depicted in FIG. 21E for the same layer of a build instead now defines the three smaller drop volumes of binder for placement in three different sub-pixels 182A-182C within the pixel 180 during traversal of a first pass trajectory of the printing assembly 150. The three smaller drops may each be ⅓ the volume of one large volume drop. In other words, the 3-unit drop volume defined for dispensing in one location within a pixel may be allocated into 1-unit drop volumes whose centers are at three different locations within the same pixel as evidenced when comparing the deposition pattern 125 of FIG. 21C with the deposition pattern 126 of FIG. 21E. The size or amount of binder dispensed may be proportional to volume of the voxel defined, in part, by the pixel, which may also be referred to as the region of influence of a drop in the powder. The amount of binder dispensed for a particular pixel may be determined based on the desired saturation of the particular pixel. The desired saturation of a particular pixel may be determined based on the location of the pixel with respect to the edge of a component that is being built and/or the number of vertically adjacent layers to be built on top of the particular pixel.

Figure 21F:
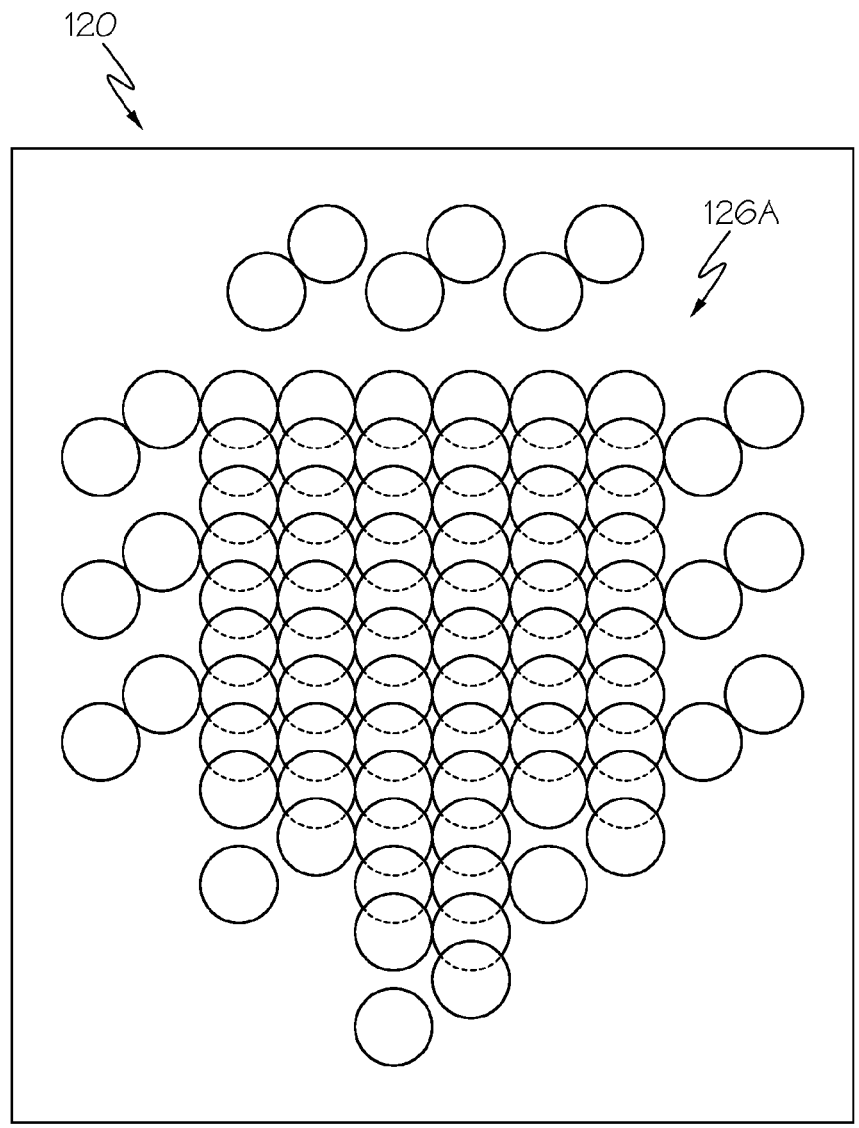
FIG. 21F depicts a top down view of a build area overlaid with an applied deposition pattern of binder according to the design deposition pattern depicted in FIG. 21E according to one or more embodiments shown and described herein.

Turning to FIG. 21F, an illustrative applied deposition pattern 126A resulting from the deposition of binder according to the design deposition pattern depicted in FIG. 21D is depicted. Again, as the binder disperses within the build material 40, the binder may overlap with binder and powder within adjacent sub-pixels. Additionally, as the binder disperses, the binder may seep and/or wick into and/or throughout a volume of the porous layer of powder defining a voxel 30 (FIG. 1A). Depending on the drop volume of the droplet of binder, the thickness (depth along the Z-axis) of the layer of powder, the density of the powder and other variables, the binder may disperse into lower layers of powder further curing a lower layer to an upper layer. When viewing the applied deposition pattern 126A of FIG. 21F with the applied deposition pattern 125A of FIG. 21D, it can be observed that a more uniform distribution of binder may be achieved by further varying the drop volume and drop location, which is possible because the jet nozzles may be indexed by sub jet-spacing index distances between passes. It is understood that indexing of the jet nozzles may be accomplished by indexing individual print heads and/or indexing the printing assembly 150.

Figure 21G:
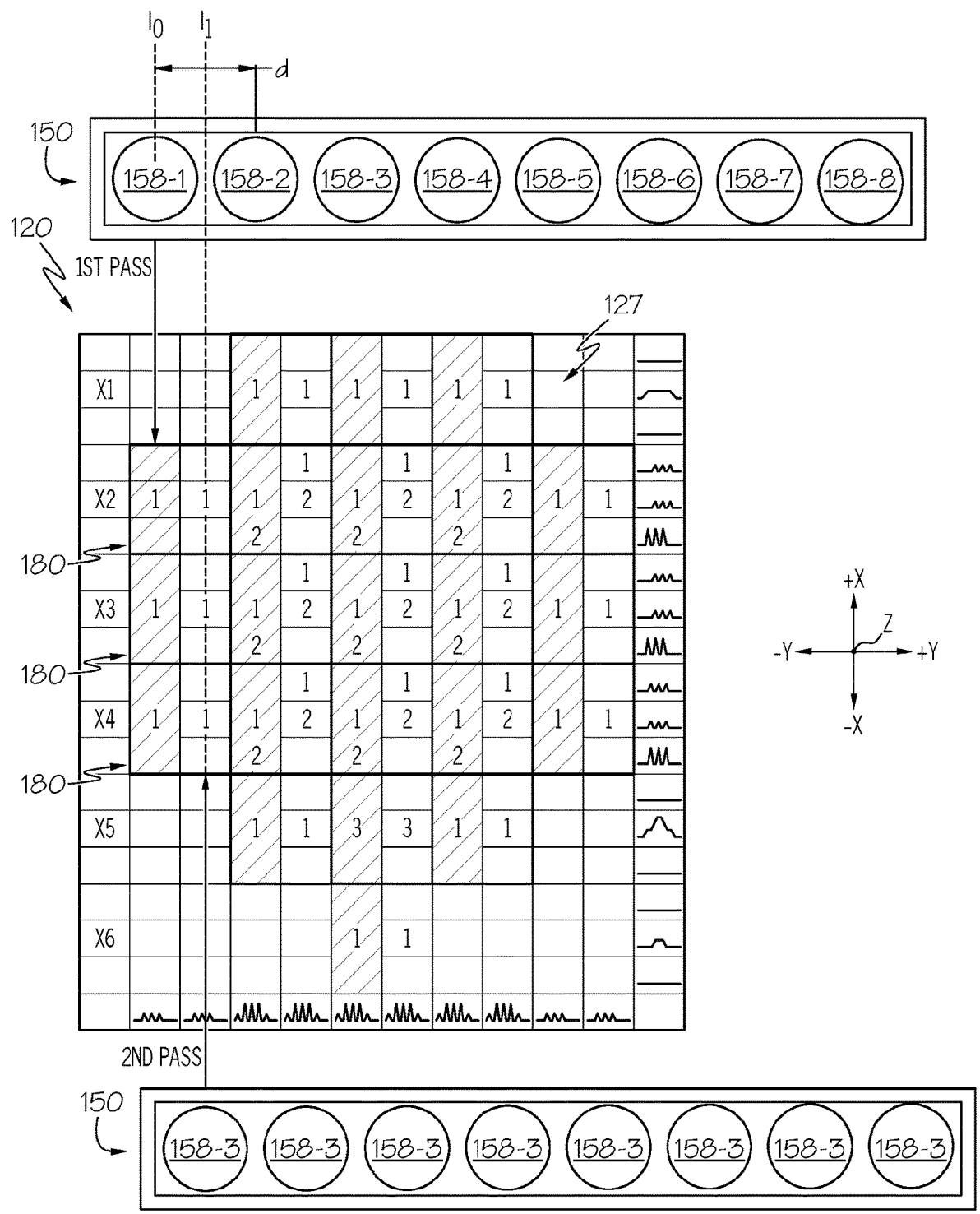
FIG. 21G example of a deposition pattern of binder material over the build area using a combination of large and small drops at varying locations within the pixel according to one or more embodiments shown and described herein.

More specifically, this is accomplished by the fine and coarse motion control of the printing assembly provided by the printing head position control assembly comprising a first actuator assembly 102 configured to move the printing head along the longitudinal axis and a second actuator assembly 103 configured to move the printing head along a latitudinal axis. FIG. 21G provides yet another example of a deposition pattern of binder material over the build area 120 using a combination of large and small drops at varying locations within the pixel.

In further embodiments of the apparatus, the printing assembly 150 may be indexed between passes over a single layer of powder or between layers of powder to randomize the location of a jet nozzle 158 or print head 156 that may be malfunctioning. The indexing may be accomplished by moving the printing assembly 150 along the latitudinal axis with the second actuator assembly 103. The indexing motion of the printing assembly 150 may be predetermined by the slicing engine when determining the deposition pattern for building the component or on-the-fly by the electronic control unit of the apparatus when, for example, a malfunctioning jet nozzle 158 or print head 156 is detected. An advantage of predefining the random indexing of the printing assembly 150 with the slicing engine is that the association of a jet nozzle 158 with various a trajectories along the longitudinal axis may be known through a build process of a component. For example, a history of jet nozzle 158 and trajectory alignment for each pass during a build process may be generated and used for post-production analysis of a component should one or more jet nozzles or print heads is determined to have malfunctioned during the build.

As used herein, the term "predefined random index" or "predefined random indexing" refers to the randomized indexing values defined by the slicing engine when developing the executable instructions for the apparatus to execute during a build. Furthermore, the term "predefined" refers to the prior planning of indexing the printing assembly 150 by the slicing engine and the term "random" refers to the aspect that the amount a printing assembly 150 is indexed, in one instance, may be different from the amount the printing assembly 150 is indexed in a second instance and may not be bound to any functional relationship except, for example, a build size of a component. That is, if a build size of a component has a build width of 100 units and the printing assembly 150 has jet nozzles 158 positioned along a latitudinal axis to cover a build width up to 150 units, the randomly chosen index value may be 1 to 50 units so that the entire build width which requires deposition of binder during a pass of the printing assembly over the build area may be associated with a jet nozzle 158. The term "units" used herein may refer to any know unit of measure used by the apparatus, for example inches, meters, millimeters, etc. Additionally, the unit values used herein are merely for explanatory purposes and not intended to limit the disclosure.

Moreover, the randomness of the indexing values may be determined by the slicing engine so that a jet nozzle corresponding to a first trajectory along a longitudinal axis during a first pass may be randomly assigned to a second trajectory along a longitudinal axis during a second pass (e.g., a consecutive pass with respect to the first pass). It is understood that indexing of the printing assembly 150 may not be executed between every pass of the printing assembly 150 over the build area 120. However, in some instances the slicing engine may be configured, for example, by an engineer or operator when developing the executable instructions, to include an indexing command or step between each consecutive pass of the printing assembly 150 over the build area or at less frequent intervals, such as every other pass, every second pass or any randomly chosen number of passes between 1 and the total number of passes defined to build a component.

In some instances, the electronic control unit of the apparatus 100 may be configured to execute indexing of the printing assembly 150 independently from the predefined random indexes determined by the slicing engine. That is, the electronic control unit of the apparatus 100 may "on-the-fly," between passes, implement an indexing operation of the printing assembly 150. Such an operation may be triggered by a sensor or other indication that a print head or a jet nozzle is malfunctioning. In some instances, however, the electronic control unit may implement a random amount of indexing of the printing assembly 150 after a predetermined number of passes over the build area 120.

Figure 22A:
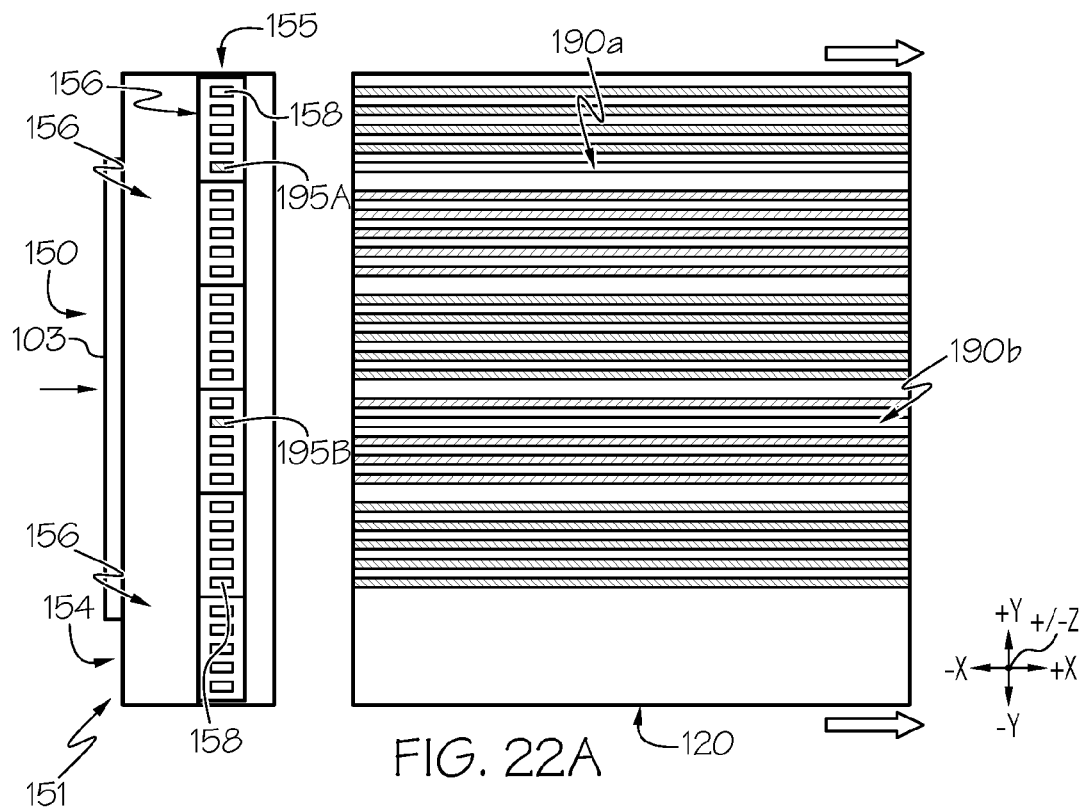
FIG. 22A illustratively depicts a build area and a printing assembly configured in a home position with malfunctioning jets according to one or more embodiments shown and described herein.
Figure 22B:
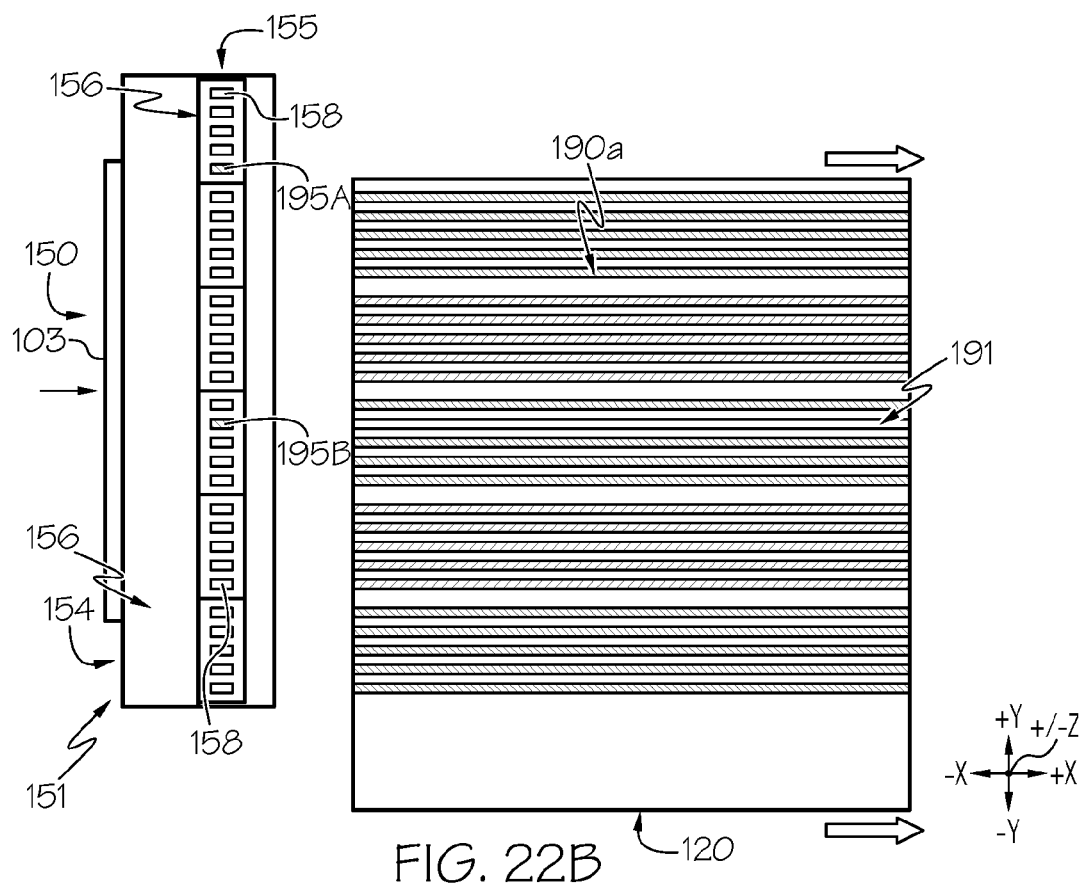
FIG. 22B illustratively depicts the build area and the printing assembly of FIG. 22A configured in an indexed position with malfunctioning jets according aligned to different trajectories according to one or more embodiments shown and described herein.

Referring to FIGS. 22A and 22B, an illustrative depiction of an index of a printing assembly 150 having malfunctioning jet nozzles 195a and 195b is shown. As depicted in FIG. 22A, the malfunctioning jet nozzles 195a and 195b fail to deposit binder along corresponding trajectories 190a and 190b, respectively, as the printing assembly 150 traverses the build area 120 having a first layer of powder. However, during a subsequent pass, which may be a return pass along the same layer, or a pass over a subsequently laid layer of powder, the printing assembly 150 is indexed an index distance, for example, the distance of one or more jet-spacing (d) (i.e., the spacing from one jet nozzle to an adjacent jet nozzle) so that the malfunctioning jet corresponds to a different trajectory. Prior to the printing assembly 150 traversing the build area, the control system 10 maps build instructions for pixels defined in the deposition pattern to the jet nozzles 158 configured to traverse the build area 120 based on their planned trajectory such that a jet nozzle 158 is configured to deposit binder according to the build instructions associated with their current latitudinal position along the latitudinal axis.

After at least one pass over the build area 120, the control system may execute an instruction in the build instructions to index the printing assembly 150 a predefined random index causing the jet nozzles 158 of the printing assembly 150 to move a lateral distance along the latitudinal axis in a first direction. Now that the jet nozzles 158 align with new trajectories over the build area 120 the control system 10 remaps the build instructions for pixels defined in the deposition pattern to the jet nozzles configured to traverse the build area 120 based on their new trajectory after indexing such that a jet nozzle 158 is configured to deposit binder according to the build instructions associated with their current latitudinal position along the latitudinal axis. Remapping of the deposition pattern include digitally shifting the deposition pattern in a second direction opposite the first direction which the jet nozzles were indexed so that jet nozzles may be assigned the build instructions for the portion of the component that corresponds to their new trajectory after being indexed. In other words, in response to a mechanical shift in a first direction a digital shift in a second direction, opposite the first direction, but in the same absolute amount is needed to continue to build the component on the build area 120.

Turning to FIG. 22B, the first malfunctioning jet 195a is now positioned along a non-build trajectory (that is not used for the subsequent pass) and the second malfunctioning jet 195b now corresponds to a different trajectory 191 after a mechanical indexing of the printing assembly 150 and/or individual print heads 156 occurs. A different functioning jet nozzle 158 now corresponds to the prior trajectory 190b previously executed by the second malfunctioning jet nozzle 195b, which now receives binder from the functioning jet nozzle 158 rather than being further deprived of binder should the malfunctioning jet nozzle 195b have subsequently traversed the same trajectory. The randomized shifting of the plurality of jets with respect to the trajectories along the longitudinal axis minimizes repeated passes of a malfunctioning jet over a particular section of the build area thereby improving the resulting green strength and integrity of the component. That is, a functioning jet may apply binder to a trajectory that a malfunctioning jet failed to apply binder to in a prior pass.

In operation, the control system 10 maps build instructions for pixels defined in the deposition pattern to the jet nozzles 158 configured to traverse the build area 120 based on their planned trajectory such that a jet nozzle 158 is configured to deposit binder according to the build instructions associated with their current latitudinal position along the latitudinal axis. Furthermore, the control system 10 of the apparatus 100 may cause select ones of the plurality of jet nozzles to dispense one or more drops of binder on a powder layer based on a deposition pattern defined by a slicing engine as the printing head traverses along the longitudinal axis applying binder, where the first jet of the plurality of jets corresponds to a first trajectory assigned by the slicing engine.

The control system 10 of the apparatus 100 may then index the printing head by an integer number of pixels along the latitudinal axis such that the first jet corresponds to a second trajectory and another jet corresponds to the first trajectory assigned by the slicing engine and subsequently cause the indexed printing head to traverse along the longitudinal axis and apply binder to the powder layer in the deposition pattern defined by the slicing engine. The control system 10, in response to the indexing, remaps build instructions for pixels defined in the deposition pattern to the jet nozzles 158 configured to traverse the build area 120 based on their new trajectory such that a jet nozzle is configured to deposit binder according to the build instructions associated with their current latitudinal position along the latitudinal axis after indexing.

In some embodiments, an image processing device 14 (FIG. 1B) (e.g., an in situ monitoring system) may be utilized to examine the build area between passes to determine whether a print head or jet nozzle is malfunctioning by identifying trajectories that did or did not receive the predefined amounts of binder. The electronic control unit may be configured to then adjust a prescribed trajectory of a jet nozzle that has been identified to be malfunctioning on subsequent build passes to minimize the effect of the malfunctioning jet nozzle of the overall build. More specifically, an in situ monitoring system configured to may determine a malfunction of one or more jets of the plurality of jets, and provide a notification signal to the electronic control unit identifying the one or more malfunctioning jets. The electronic control unit may then develop one or more indexing commands for indexing the printing head between predefined passes such that a malfunctioning jet is configured to not traverse the same trajectory during consecutive passes while determined to be in a malfunctioning state.

The prior embodiments describe and depict systems and methods for controlling binder or other material application to a build area by implement additional control of the printing assembly 150 through a second actuator assembly 103 that controls positioning of printing assembly 150 along the latitudinal axis. A further consideration when applying binder is the bleed effect. That is, binder jet printing involves layerwise deposition of drops of liquid binder into powder. Drops of binder penetrate the powder and undergo a phase change (curing) to bind the powder particles together layer by layer. However, as it becomes desirable to increase the speed at which layers are built, deposited binder may not have sufficient energy and/or time to undergo a phase change before additional binder is added in subsequent print layers. That is, binder cure time may be rate limiting. This results in downward flow of binder beyond that layer in which the binder is deposited. Printed geometry with regions having downward-facing surfaces are at risk of having areas that become excessively wet resulting in surface defects and weak green strengths.

Figures 23A, 23B:
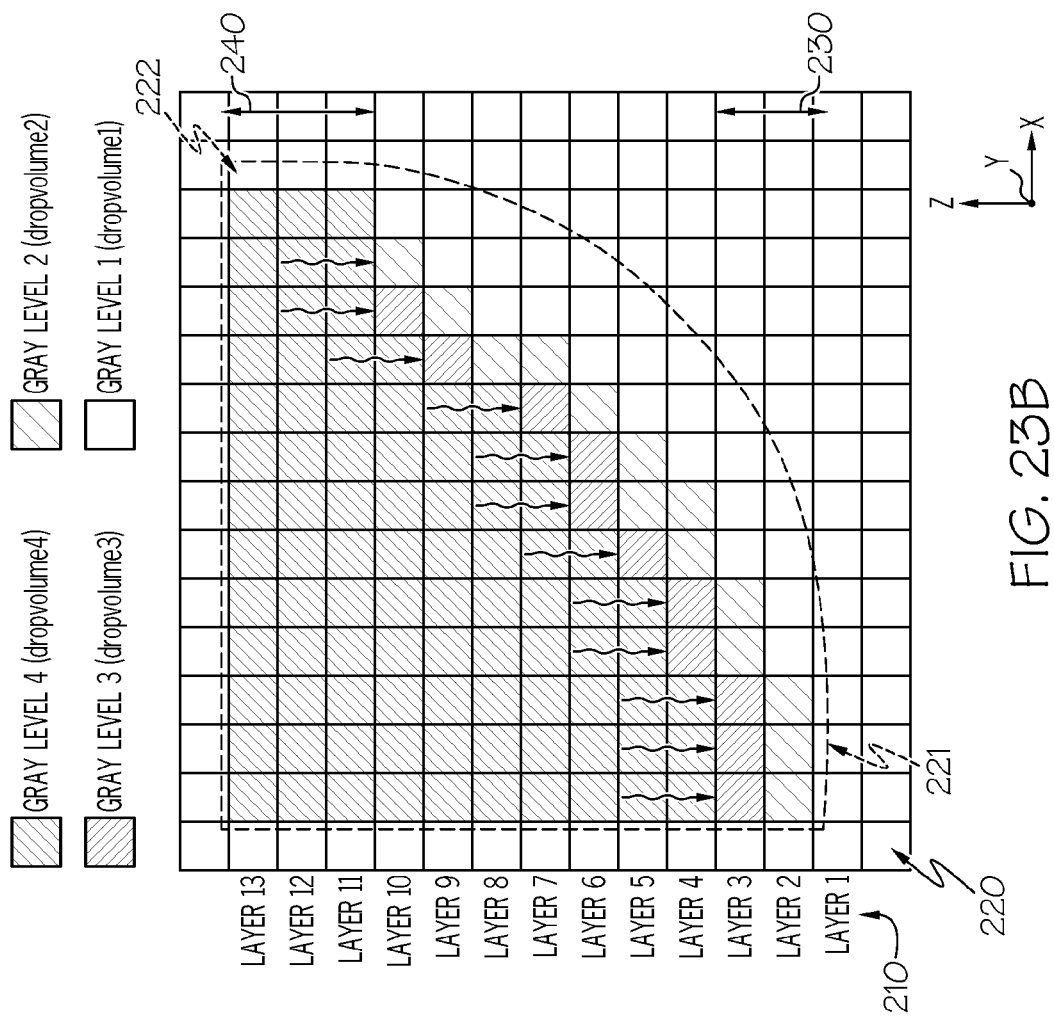
FIG. 23A depicts a model of a part for building having downward-facing surfaces according to one or more embodiments shown and described herein.
FIG. 23B illustratively depicts a cross-section of the model of FIG. 23A for building having predefined allocations of binder to control binder bleed according to one or more embodiments shown and described herein.

The following provides a solution to this issue of binder bleed by controlling the amount of binder that is deposited in layers having one or more layers applied above (along the Z-axis). Turning now to FIGS. 23A-23B, an apparatus 100 may be configured to deposit an increasing amount of binder in adjacent vertical layers such that binder bleed between layers does not negatively affect downward-facing surfaces of components and/or the green strength of a component. FIG. 23A depicts an illustrative component 200 for building with the apparatus 100. FIG. 23B depicts a cross-section of the component 200 represented by build layer 210 and portions 220 per layer.

A slicing engine or similar tool configured to generate executable instructions defining print head movements, design deposition patterns, and amounts for binder or other materials may define a layer-to-layer amount of binder to apply to vertically adjacent portions 220 of powder estimating a voxel when binder is received. The amount of binder to apply to vertically adjacent portions 220 of powder may be defined by the total number of adjacent layers over an attenuation length. For example, a first portion of powder in a stack of multiple layers (e.g., 2 or more, 3 or more, 4 or more, 5 or more) may be receive a first amount of binder that is less that the amount of binder deposited in a second portion of powder positioned above the first voxel. The amount of binder deposited in successive vertically aligned voxels of powder in subsequent layers of powder progressively increases to a predetermined volume. In some embodiments, the amount of binder dispensed in successive vertically aligned portions 220 of powder in subsequent layers of powder progressively increases over an attenuation length defined by a predetermined number of layers of powder. Similarly, the amount of binder dispensed in successive vertically aligned portions 220 of powder in subsequent layers of powder may progressively increase over an attenuation length defined by a predetermined number of layers of powder when the predetermined number of layers is greater than a predetermined thickness threshold. That is, the slicing engine may be configured to only apply bleed control for layers having greater than a predetermined thickness threshold (i.e., greater than a predetermined number of layers).

The amount of binder dispensed in successive vertically aligned portions of powder in subsequent layers may be based upon one or more properties. These may include, but are not limited to, a property of the powder material such as a packing density of a powder material, an amount of time a binder wicks before setting or curing, the type of binder or type of powder, an exposure time of a curing energy source (e.g., an infrared, ultraviolet or other energy source) and/or other properties.

In operation, controlling binder bleed as disclosed herein enables an apparatus to apply more layers of a build more efficiently and at a faster pace without being limited by a binder's curing rate.

Referring back to FIG. 24, the computer readable and executable instructions, when executed by the processor of the control system 10, returns the method 300 to step 302 and repeats the steps shown and described herein for the second pass (e.g., a return pass over the current layer of powder on the build area 120). In particular, the computer readable and executable instructions, when executed by the processor of the control system 10, transmits a signal to the first actuator assembly 102 of the apparatus 100 to translate the printing assembly 150 from the translated position 253 to the home position 151, such that the printing head 154 moves over the build area 120 during the second pass. The computer readable and executable instructions, when executed by the processor of the control system 10, transmits a signal to the printing head 154 to release material from the plurality of print heads 156 of the first print head row 155 and the second print head row 157 to thereby deposit additional material onto the pixels of the build area 120 as the printing head 154 moves over the build area 120 in the second pass. Accordingly, in this instance the printing head 154 moves over the build area 120 from the translated position 253 to the home position 151 as additional material is released from the printing head 154 during the second pass.

In other embodiments, the control system 10 transmits a signal to the first actuator assembly 102 of the apparatus 100 to translate the printing assembly 150 from the translated position 253 to the home position 151 prior to initiating the second pass, such that the printing head 154 again moves over the build area 120 from the home position 151 to the translated position 253 during the second pass. In this instance, the printing head 154 moves over the build area 120 from the home position 151 to the translated position 253 as additional material is released from the printing head 154 during the second pass. The control system 10 repeats the steps described in detail above until the three-dimensional part to be printed by the apparatus 100 is complete and no additional material is to be deposited at step 306.

Although the present example of the exemplary method 300 depicts and describes the printing assembly 150 of the apparatus 100 being initially positioned at the home position 151 prior to moving to the translated position 253, and the plurality of print heads 156 of the first print head row 155 and/or the second print head row 157 being arranged in the default position (FIG. 18A) prior to the actuated position (FIG. 18B), it should be understood that in other embodiments the printing assembly 150 may initially be positioned at the translated position 253 and the plurality of print heads 156 of the print head rows 155, 157 arranged in the actuated position without departing from the scope of the present disclosure. Moreover, it should be understood that the exemplary method 300 described and shown herein may be performed by various other printing assemblies other than the printing assembly 150, such as, for example, the three-row printing assembly described above. It should further be understood that in some embodiments one or more steps of the method 300 described above may be adjusted, varied, and/or omitted entirely, including but not limited to steps of releasing materials from the plurality of jet nozzles 158 onto the plurality of pixels of the build area 120; determining whether the printing assembly 150 is at the translated position 253; ceasing material release from the plurality of jet nozzles 158; ceasing movement of the printing assembly 150; and/or the like.

Figure 25:
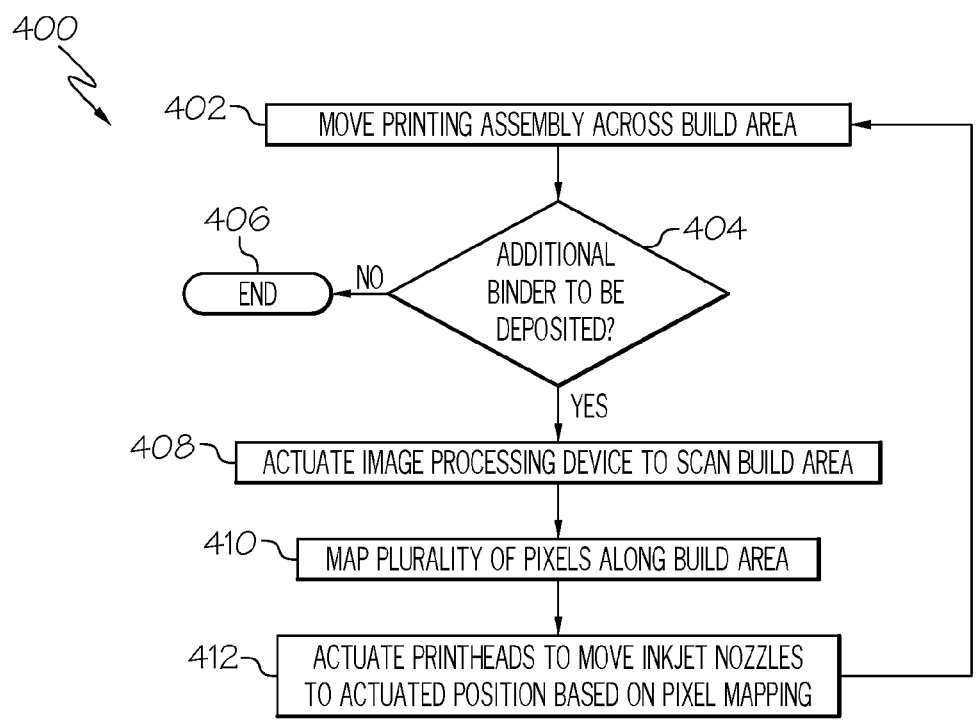
FIG. 25 depicts a flow diagram of an illustrative method of depositing material with a printing assembly with movable rows of print heads according to one or more embodiments shown and described herein.

Referring now to FIGS. 18A-18B in conjunction with the flow diagram of FIG. 25, an exemplary method 400 of actuating the multiple print head rows 155, 157 of the printing assembly 150 as the manufacturing apparatus 100 builds an object is schematically depicted. More specifically, movement of the multiple print head rows 155, 157 of the plurality of print heads 156 for depositing binder material 50 and/or other materials 114, 115 along the build area 120 serves to reduce an occurrence of a resolution defect on the printed object or part during the image transfer process due to lack of jetting redundancy. The depiction of FIGS. 18 and 25, and the accompanying description below, is not meant to limit the subject matter described herein or represent an exact description of how materials may be deposited from the printing assembly 150, but instead is meant to provide a simple schematic overview to illustrate the general movement of multiple print head rows 155, 157 of print heads 156 of the printing assembly 150 to improve jetting redundancy as described herein.

Referring to FIG. 18A and at step 402, the computer readable and executable instructions, when executed by the processor of the control system 10, transmits a signal to the first actuator assembly 102 to move the printing assembly 150 across the build area 120 in a first pass. In particular, the printing assembly 150 translates across the rail 104 of the apparatus 100 and along the working axis 116, thereby moving the printing head 154 over the build area 120 in the +X direction of the coordinate axes of the figures. The control system 10 transmits a signal to the plurality of print heads 156 of the first print head row 155 and the second print head row 157 to release a material from the plurality of jet nozzles 158 as the printing head 154 of the printing assembly 150 moves over the build area 120. The material (e.g., the binder material 50, the first material 114, the second material 115, and the like) is transferred to the printing head 154 and deposited onto the build area 120 through the plurality of jet nozzles 158 of the plurality of print heads 156 in both the first print head row 155 and the second print head row 157.

In the present example, the plurality of print heads 156 of the first print head row 155 and the plurality of print heads 156 of the second print head row 157 deposit material along the build area 120. Accordingly, at least some of the plurality of jet nozzles 158 of the plurality of print heads 156 from the first print head row 155 and the second print head row 157 jet material on at least one pixel positioned along the build area 120. In this instance, the plurality of print heads 156 of the first print head row 155 and the second print head row 157 are in a default position relative to one another as the printing assembly 150 deposits material onto the build area 120 of the apparatus 100. As will be described in greater detail herein, in other embodiments the plurality of print heads 156 of the first print head row 155 may deposit a different material than the plurality of print heads 156 of the second print head row 157 (see FIG. 27).

Still referring to FIG. 18A, the computer readable and executable instructions, when executed by the processor of the control system 10, determines whether the printing assembly 150 has reached the translated position 253 located in the +/−X direction at or past an edge of the build area 120 where material is to be deposited by the printing assembly 150 in the first pass. The control system 10 determines whether the printing assembly 150 has reached the translated position 253 by, for example, monitoring a relative position of the printing assembly 150 along the rail 104 as the printing assembly 150 translates along the working axis 116 of the apparatus 100 (i.e., +X direction of the coordinate axes of the figures) to the translated position 253. In response to determining that the printing assembly 150 is not positioned at the translated position 253, the control system 10 transmits a signal to the first actuator assembly 102 to continue translating the printing assembly 150 across the build area 120 at step 402. The control system 10 further transmits a signal to the printing head 154 to release material from the plurality of jet nozzles 158 of the plurality of print heads 156 of the first print head row 155 and the second print head row 157.

Alternatively, in response to determining that the printing assembly 150 is positioned at the translated position 253, the computer readable and executable instructions, when executed by the processor of the control system 10, transmits a signal to the printing head 154 to terminate release of the material from the plurality of jet nozzles 158 of the plurality of print heads 156 of the first print head row 155 and the second print head row 157. Additionally and/or simultaneously, the control system 10 transmits a signal to the first actuator assembly 102 to terminate movement of the printing assembly 150 along the working axis 116 by ceasing actuation of the first actuator assembly 102. With the printing assembly 150 positioned at the translated position 253, the plurality of pixels positioned along the build area 120 have received material thereon from at least the first print head row 155 or the second print head row 157 during the first pass of the printing assembly 150 over the build area 120 in the +X direction of the coordinate axes.

Referring now to FIG. 18B and at step 404, the control system 10 determines whether binder or other material is to be deposited from the printing assembly 150. This determination by the control system 10 may be performed via various means and/or systems as described in detail above. In response to determining that an additional layer of material (e.g., binder) is not to be deposited from the printing assembly 150 at step 404, the control system 10 transmits a signal to the apparatus 100 to end the additive manufacturing process of method 400 at step 406, if the part being built is complete.

Alternatively, in response to determining that an additional layer of material (e.g., binder) is to be deposited from the printing assembly 150 at step 404, the computer readable and executable instructions, when executed by the processor of the control system 10, transmits a signal to the image processing device 14 of the apparatus 100 (see FIG. 1B) to scan the build area 120 at step 408. In particular, the image processing device 14 captures one or more images of the three-dimensional part produced by the apparatus 100 along the build area 120 to identify a progressive development of the part during the additive manufacturing process. The image processing device 14 is positioned above the build area 120 (i.e., in the +Z direction of the coordinate axes of the figures) to effectively image the part printed (see FIG. 1B). The image-processing device 14 may comprise various devices or systems capable of generating a visual rendition of the contents positioned within a focal range of the device 14.

Referring to FIG. 25 at step 410, with the image scan of the build area 120 captured by the image processing device 14, the computer readable and executable instructions, when executed by the processor of the control system 10, maps the plurality of pixels positioned along the build area 120. In particular, each of the plurality of pixels along the build area 120 are mapped based on the image scan generated by the image processing device 14 to determine a print/production progress of the three-dimensional part. In this instance, the control system 10 may identify the build characteristics of particular pixels along the build area 120 to determine if any may have not adequately received material thereon. For instance, the pixel may have been aligned with a particular jet nozzle 158 that did not effectively deposit material at said pixel during the prior pass of the printing assembly 150 (e.g., a first pass). For example, a jet nozzle 158 that may have experienced a misfire, or clogging, during the prior pass may have been inhibited from depositing an adequate amount of material to one or more pixels that were aligned with said jet nozzle 158 due to a relative position of the print head row 155, 157 including said jet nozzle 158.

Accordingly, the computer readable and executable instructions, when executed by the processor of the control system 10, perform a mapping of the plurality of pixels to identify a necessary development of the part at each of the plurality of pixels. By mapping the plurality of pixels and determining the progressive development of the part at each pixel thus far, the control system 10 of the apparatus 100 may adjust a position and/or arrangement of the plurality of print heads 156 of the printing assembly 150 for the subsequent pass (e.g., a second pass) to increase a likelihood that the plurality of pixels receive an adequate quantity of material disposed thereon from one or more different jet nozzles 158 of the plurality of jet nozzles 158.

Referring back to FIG. 18B and at step 412, the computer readable and executable instructions, when executed by the processor of the control system 10, transmits a signal to at least one actuator 160 in the printing head 154 to actuate at least one of the plurality of print heads 156 of the first print head row 155 and/or the second print head row 157 relative to one another. In particular, the actuation of the first print head row 155 and/or the second print head row 157 is based on the mapping of the plurality of pixels at step 410. Actuation of at least one actuator 160 that is coupled to at least one of the first print head row 155 and/or the second print head row 157 of the plurality of print heads 156 provides for a translation of said row of print heads 156 relative to at least the other row of print heads 156 in a direction that is transverse to the working axis 116 of the apparatus (i.e., +/−Y direction of the coordinate axes of the figures). In the present example, the printing assembly 150 includes a pair of actuators 160 coupled to the first print head row 155 and the second print head row 157 of print heads 156, respectively, such that both print head rows 155, 157 are movable relative to one another and relative the support bracket 152 of the printing assembly 150. It should be understood that in some embodiments actuation of the image processing device 14 to scan the build area 120 and map the plurality of pixels positioned thereon may be performed during a first pass of the printing assembly 150. In this instance, the control system 10 may actuate the print heads 156 of at least one of the print head rows 155, 157 prior to step 402 and 404.

In this instance, the plurality of jet nozzles 158 of each of the plurality of print heads 156 included in the first 155 and the second print head row 157 is repositioned from a default position to an actuated position that differs from the default position by at least some incremental distance (e.g., incremental distances "A"-"G" of FIGS. 17A-17G). Accordingly, during a second pass of the printing assembly 150 over the build area 120, at least one of the pixels positioned along the build area 120 will receive material from at least one jet nozzle 158 of the plurality of jet nozzles 158 that is different from the jet nozzle 158 that previously deposited, or attempted to deposit, material to said pixel during the first pass. It should be understood that lateral movement of the print heads of the first print head row 155 and the second print head row 157 relative to one another, and relative to a prior position of said print head rows 155, 157 from the default position, provides an enhanced jetting redundancy of the manufacturing process by increasing a reliability that a complete resolution of each of the plurality of pixels on the build area 120 receives an adequate deposition of material thereon.

Referring back to FIG. 25, the computer readable and executable instructions, when executed by the processor of the control system 10, returns the method 400 to step 402 and repeats the steps shown and described herein for the second pass. In particular, the computer readable and executable instructions, when executed by the processor of the control system 10, transmits a signal to the first actuator assembly 102 to translate the printing assembly 150 from the translated position 253 to the home position 151, such that the printing head 154 moves over the build area 120 during the second pass. The computer readable and executable instructions, when executed by the processor of the control system 10, transmits a signal to the plurality of print heads 156 to release material from the first print head row 155 and the second print head row 157, respectively, to thereby deposit additional material onto the plurality of pixels of the build area 120 as the printing head 154 moves over the build area 120 in the second pass. Accordingly, in this instance the printing head 154 moves over the build area 120 from the translated position 253 to the home position 151 as additional material is released from the printing head 154 during the second pass.

In other embodiments, the control system 10 transmits a signal to the first actuator assembly 102 of the apparatus 100 to translate the printing assembly 150 from the translated position 253 to the home position 151 prior to initiating the second pass, such that the printing head 154 again moves over the build area 120 from the home position 151 to the translated position 253 during the second pass. In this instance, the printing head 154 moves over the build area 120 from the home position 151 to the translated position 253 as additional material is released from the printing head 154 during the second pass.

As described in greater detail above, in some embodiments the control system 10 may actuate the plurality of print heads 156 of the first print head row 155 and/or the second print head row 157 relative to one another and the support bracket 152 during a first pass and/or a second pass in various manners. For example, such movement of the print heads 156 may be randomly generated by the control system 10 or predetermined based on calculated measurements of the previous positions of the plurality of print heads 156 during the prior pass of the printing assembly 150. In either instance, movement of the print head rows 155, 157 of print heads 156 prior to each pass of the printing assembly 150 provides an enhanced, material jetting redundancy of the manufacturing process by increasing a reliability that a complete resolution of each of the plurality of pixels on the build area 120 receives an adequate deposition of material thereon from more than one jet nozzle 158. The control system 10 proceeds to repeats the steps described in detail above until the three-dimensional part to be printed by the apparatus 100 is complete and no additional material is to be deposited at step 406.

Although the present example of the exemplary method 400 depicts and describes the printing assembly 150 of the apparatus 100 being initially positioned at the home position 151 prior to moving to the translated position 253, and the plurality of print heads 156 of the first print head row 155 and/or the second print head row 157 being arranged in the default position (FIG. 18A) prior to the actuated position (FIG. 18B), it should be understood that in other embodiments the printing assembly 150 may initially be positioned at the translated position 253 and the plurality of print heads 156 of the print head rows 155, 157 arranged in the actuated position without departing from the scope of the present disclosure. Moreover, it should be understood that the exemplary method 400 described and shown herein may be performed by various other printing assemblies other than the printing assembly 150, such as, for example, the three-row printing assembly described above. It should further be understood that in some embodiments one or more steps of the method 400 described above may be adjusted, varied, and/or omitted entirely, including but not limited to steps of releasing materials from the plurality of jet nozzles 158 onto the plurality of pixels of the build area 120; determining whether the printing assembly 150 is at the translated position 253; ceasing material release from the plurality of jet nozzles 158; ceasing movement of the printing assembly 150; and/or the like.

Figure 19A:
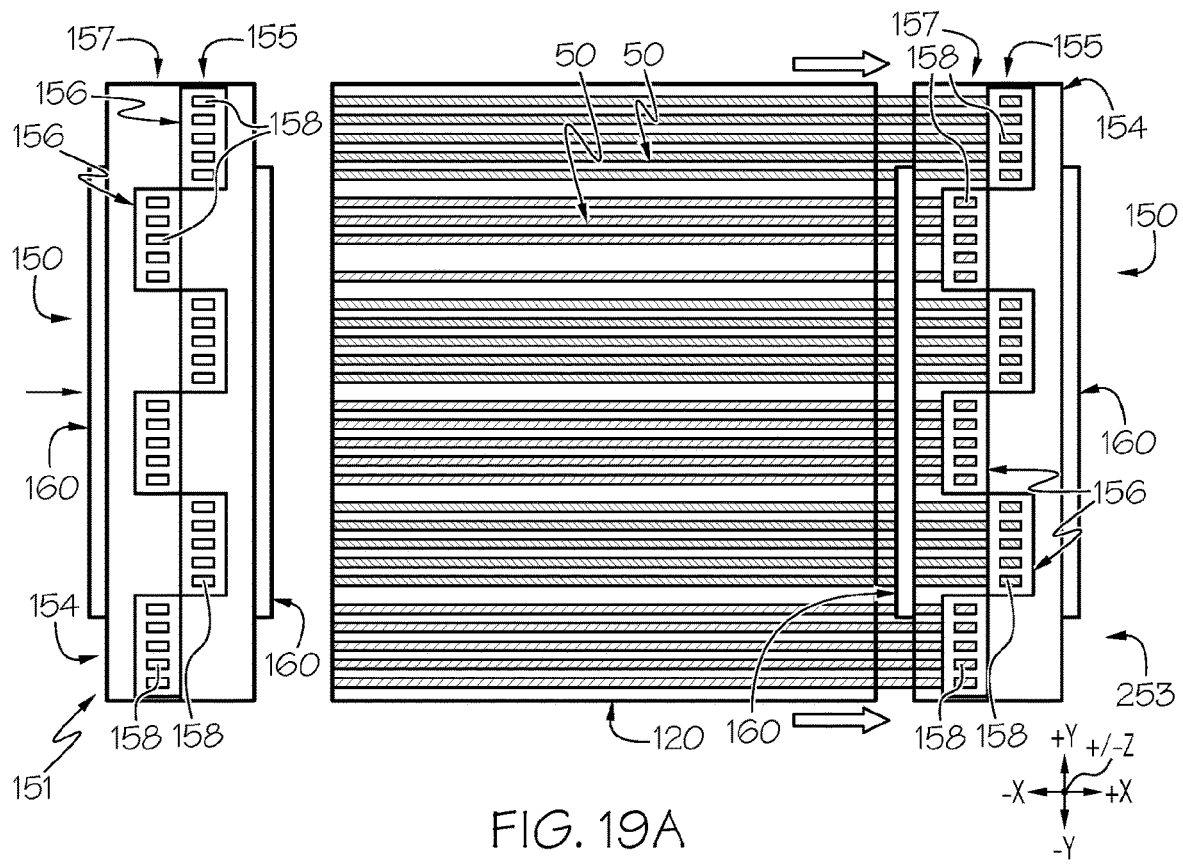
FIG. 19A schematically depicts an embodiment of a printing assembly for a manufacturing apparatus with a first material deposited from a first print head row of print heads and a second material deposited from a second print head row of print heads along a first pass according to one or more embodiments shown and described herein.
Figure 19B:
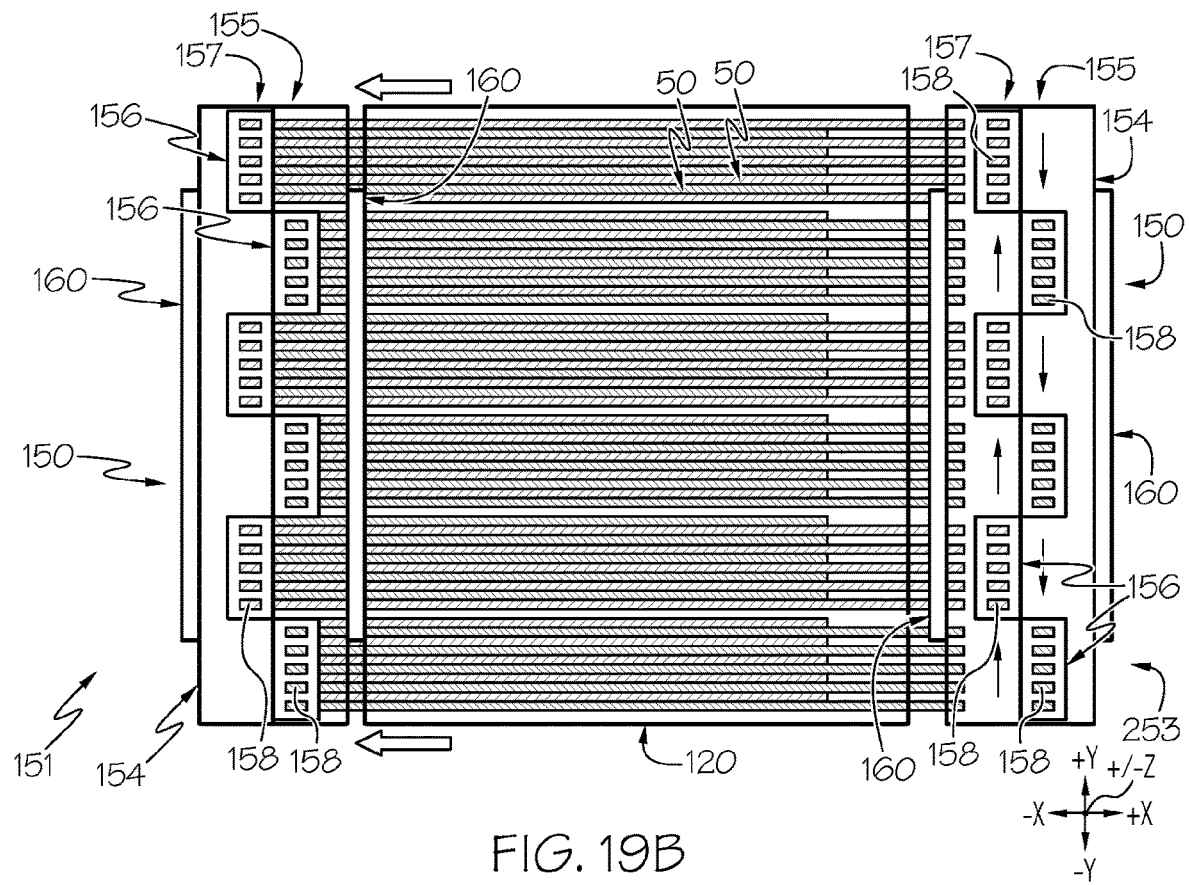
FIG. 19B schematically depicts the printing assembly of FIG. 19A with the first material deposited from the first print head row of print heads and the second material deposited from the second print head row of print heads at different locations along a second pass according to one or more embodiments shown and described herein.
Figure 26:
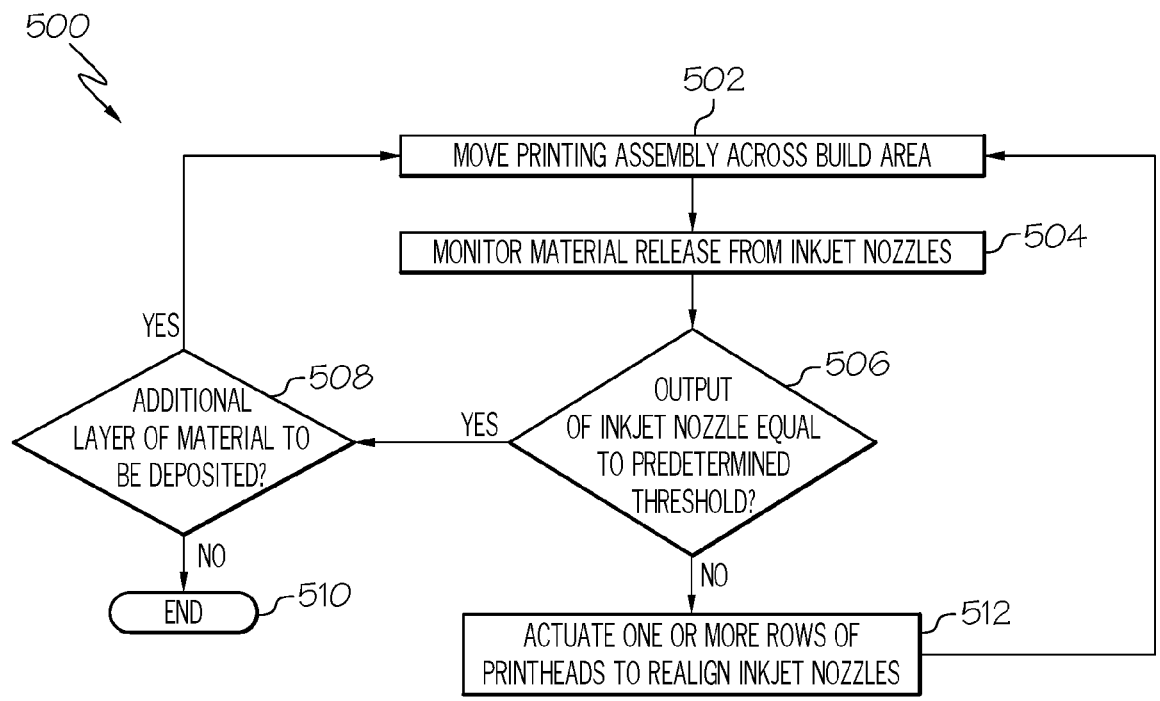
FIG. 26 depicts a flow diagram of an illustrative method of depositing multiple materials with a printing assembly with movable rows of print heads according to one or more embodiments shown and described herein.

Referring now to FIGS. 19A-19B in conjunction with the flow diagram of FIG. 26, an exemplary method 500 of actuating the multiple print head rows 155, 157 of the printing assembly 150 as the manufacturing apparatus 100 builds an object is schematically depicted. More specifically, movement of the multiple print head rows 155, 157 of the plurality of print heads 156 for depositing binder material 50 and/or other materials 114, 115 along the build area 120 serves to reduce an occurrence of a resolution defect on the printed object or part during the image transfer process due to lack of jetting redundancy. The depiction of FIGS. 19A-19B and 26, and the accompanying description below, is not meant to limit the subject matter described herein or represent an exact description of how materials may be deposited from the printing assembly 150, but instead is meant to provide a simple schematic overview to illustrate the general movement of multiple print head rows 155, 157 of print heads 156 of the printing assembly 150 to improve jetting redundancy as described herein.

Referring to FIG. 19A and at step 502, the computer readable and executable instructions, when executed by the processor of the control system 10, transmits a signal to the first actuator assembly 102 to move the printing assembly 150 across the build area 120 in a first pass. In particular, the printing assembly 150 translates across the rail 104 of the apparatus 100 and along the working axis 116, thereby moving the printing head 154 over the build area 120 in the +X direction of the coordinate axes of the figures. The control system 10 transmits a signal to the plurality of print heads 156 of the first print head row 155 and the second print head row 157 to release a material from the plurality of jet nozzles 158 as the printing head 154 of the printing assembly 150 moves over the build area 120. The material (e.g., the binder material 50, the first material 114, the second material 115, and the like) is transferred to the printing head 154 and deposited onto the build area 120 through the plurality of jet nozzles 158 of the plurality of print heads 156 in both the first print head row 155 and the second print head row 157.

In the present example, the plurality of print heads 156 of the first print head row 155 and the plurality of print heads 156 of the second print head row 157 deposit material along the build area 120. Accordingly, at least some of the plurality of jet nozzles 158 of the plurality of print heads 156 from the first print head row 155 and the second print head row 157 jet material on at least one pixel positioned along the build area 120. In this instance, the plurality of print heads 156 of the first print head row 155 and the second print head row 157 are in a default position relative to one another as the printing assembly 150 deposits material onto the build area 120 of the apparatus 100. As will be described in greater detail herein, in other embodiments the plurality of print heads 156 of the first print head row 155 may deposit a different material than the plurality of print heads 156 of the second print head row 157 (see FIG. 27).

Still referring to FIG. 19A and at step 504, the compute readable and executable instructions executed by the processor causes the control system 10 to monitor a release of material from the plurality of jet nozzles 158 of the plurality of print heads 156 from both the first print head row 155 and the second print head row 157 as material is jet onto the build area 120. In particular, a release of material may be monitored by detecting and measuring a quantity, volume, velocity, and the like of material being jetted from the plurality of print heads 156. In embodiments, the apparatus 100 may include one or more sensors (not shown) that are configured to detect the release of material from the plurality of print heads 156. In this instance, the control system 10 measures an output of the print heads 156, and in particular a material output from the plurality of jet nozzles 158 for each of the print heads 156 within the first print head row 155 and the second print head row 157, respectively.

The compute readable and executable instructions executed by the processor causes the control system 10 to determine whether the printing assembly 150 has reached the translated position 253 located in the +/−X direction at or past an edge of the build area 120 where material is to be deposited by the printing assembly 150 in the first pass. The control system 10 determines whether the printing assembly 150 has reached the translated position 253 by, for example, monitoring a relative position of the printing assembly 150 along the rail 104 as the printing assembly 150 translates along the working axis 116 of the apparatus 100 (i.e., +X direction of the coordinate axes of the figures) to the translated position 253.

Referring to FIG. 26, in response to determining that the printing assembly 150 is not positioned at the translated position 253, the computer readable and executable instructions executed by the processor causes the control system 10 to transmit a signal to the first actuator assembly 102 to continue translating the printing assembly 150 across the build area 120 at step 502. The control system 10 further transmits a signal to the printing head 154 to release material from the plurality of jet nozzles 158 of the plurality of print heads 156 of the first print head row 155 and the second print head row 157 and to monitor an output of material released from the plurality of jet nozzles 158 at step 504.

Alternatively, in response to determining that the printing assembly 150 is positioned at the translated position 253, the control system 10 transmits a signal to the printing head 154 to terminate release of material from the plurality of jet nozzles 158 of the plurality of print heads 156. Additionally and/or simultaneously, the instructions executed by the processor causes the control system 10 to transmit a signal to the first actuator assembly 102 to terminate movement of the printing assembly 150 along the working axis 116 by ceasing actuation of the first actuator assembly 102. With the printing assembly 150 positioned at the translated position 253, the plurality of pixels positioned along the build area 120 have received material thereon from at least the first print head row 155 or the second print head row 157 during the first pass of the printing assembly 150 over the build area 120 in the +X direction of the coordinate axes.

Still referring to FIG. 26 at step 506, the computer readable and executable instructions, when executed by the processor of the control system 10, determines whether an output of the printing head 154 is equal to a predetermined threshold output. In some embodiments, the control system 10 may determine whether an output of a particular print head row 155, 157 of print heads 156 is equal to a predetermined threshold of said print head row 155, 157. In other embodiments, the control system 10 may determine whether an output of each individual print head 156 of each print head row 155, 157 satisfies the predetermined output threshold. In further embodiments, the control system 10 may determine whether an output of each jet nozzle 158 of each of the plurality of print heads 156 within the print head rows 155, 157 have released material equivalent to a predetermined threshold.

This determination by the control system 10 may be performed via various devices and/or systems capable of detecting, monitoring, and/or measuring an output of the material from the plurality of jet nozzles 158. In the present example, the printing assembly 150 includes at least one sensor (e.g., a camera) for each of the plurality of print heads 156 of the first print head row 155 and the second print head row 157, such that the plurality of sensors are configured to monitor a material output from each of the plurality of jet nozzles 158. In response to the control system 10 determining that the output of material from the plurality of jet nozzles 158 of each of the plurality of print heads 156 of the first print head row 155 and the second print head row 157 are equal to the predetermined threshold, the computer readable and executable instructions executed by the processor causes the control system 10 to determine whether an additional layer of material (e.g., binder) is to be deposited from the printing assembly 150 at step 508.

Still referring to FIG. 26, in response to determining that an additional layer of material (e.g., binder) is not to be deposited at step 508, the control system 10 transmits a signal to the apparatus 100 to end the additive manufacturing process of method 500 at step 510. Alternatively, in response to determining that an additional layer of material (e.g., binder) is required to be deposited at step 508, the computer readable and executable instructions executed by the processor causes the control system 10 to return to step 502 and repeat the steps shown and described herein for the second pass.

Referring now to FIG. 19B and at step 512, in response to the control system 10 determining that the output of material from the plurality of jet nozzles 158 of each of the plurality of print heads 156 of the first print head row 155 and the second print head row 157 are not equal to the predetermined threshold, the control system 10 actuates at least one of the plurality of print heads 156 of the first print head row 155 or the second print head row 157. In particular, by identifying that the material output from the plurality of jet nozzles 158 did not meet the predetermined output threshold the control system 10 determines that the material released from the printing assembly 150 onto the plurality of pixels along the build area 120 was not sufficient such that a printing defect and/or error may have occurred during the prior pass of the printing assembly 150.

As discussed in detail above, such defects and/or errors may be caused by a misfire and/or clog of one or more of the plurality of jet nozzles 158 of the plurality of print heads 156. In this instance, moving the first print head row 155 and/or the second print head row 157 of the plurality of print heads 156 relative to one another and relative to the support bracket 152 realigns the plurality of jet nozzles 158 with the plurality of pixels. In this instance, the plurality of print heads 156 are actuated only in response to the control system 10 determining the occurrence of a possible error such that the plurality of print heads 156 of the print head rows 155, 157 otherwise remain in a fixed arrangement relative to one another. Accordingly, each of the pixels along the build area 120 may receive material from at least a different jet nozzle 158 during a second pass than from the jet nozzle 158 that was aligned with said pixel during a first pass of the printing assembly 150.

Still referring to FIG. 19B, with the plurality of jet nozzles 158 realigned in response to the plurality of print heads 156 of the first print head row 155 and the second print head row 157 moving from, for example, a default position to an actuated position, a jetting resolution of the apparatus 100 may be enhanced. In other words, maintaining a jet nozzle 158 that may not have released an adequate quantity of material onto a particular pixel in identical alignment with said pixel during a subsequent pass of the printing assembly 150 over the build area 120 may be reduced. The computer readable and executable instructions executed by the processor causes the control system 10 to return to step 502 and repeat the steps shown and described herein for the second pass.

Although the present example of the exemplary method 500 depicts and describes the printing assembly 150 of the apparatus 100 being initially positioned at the home position 151 prior to moving to the translated position 253, and the plurality of print heads 156 of the first print head row 155 and/or the second print head row 157 being arranged in the default position (FIG. 4) prior to an actuated position (FIGS. 2-11), it should be understood that in other embodiments the printing assembly 150 may initially be positioned at the translated position 253 and the plurality of print heads 156 of the print head rows 155, 157 arranged in the actuated position without departing from the scope of the present disclosure. Moreover, it should be understood that the exemplary method 500 described and shown herein may be performed by various other printing assemblies other than the printing assembly 150, such as, for example, the three-row printing assembly described above. It should further be understood that in some embodiments one or more steps of the method 500 described above may be adjusted, varied, and/or omitted entirely, including but not limited to steps of releasing materials from the plurality of jet nozzles 158 onto the plurality of pixels of the build area 120; determining whether the printing assembly 150 is at the translated position 253; ceasing material release from the plurality of jet nozzles 158; ceasing movement of the printing assembly 150; and/or the like.

Figure 20A:
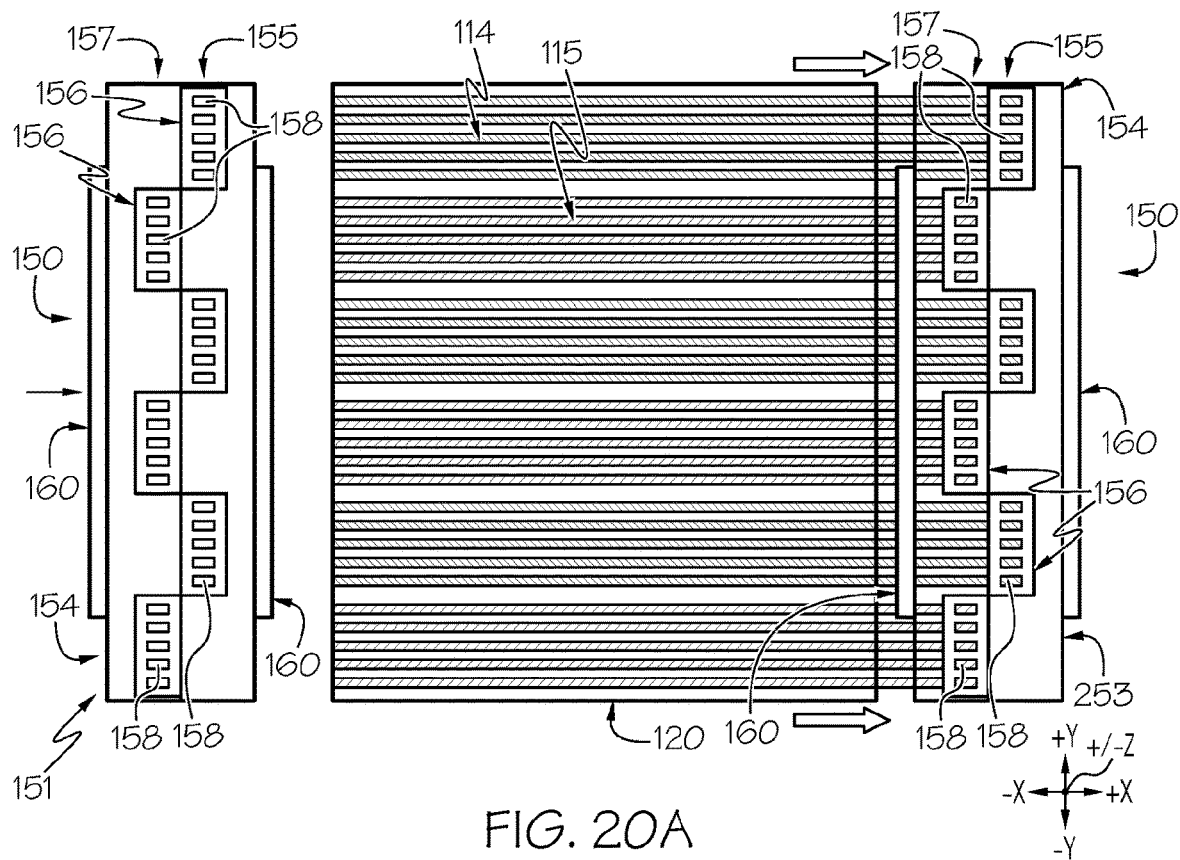
FIG. 20A schematically depicts an embodiment of a printing assembly for a manufacturing apparatus with a first material deposited from a first print head row of print heads and a second material deposited from a second print head row of print heads along a first pass according to one or more embodiments shown and described herein.
Figure 20B:
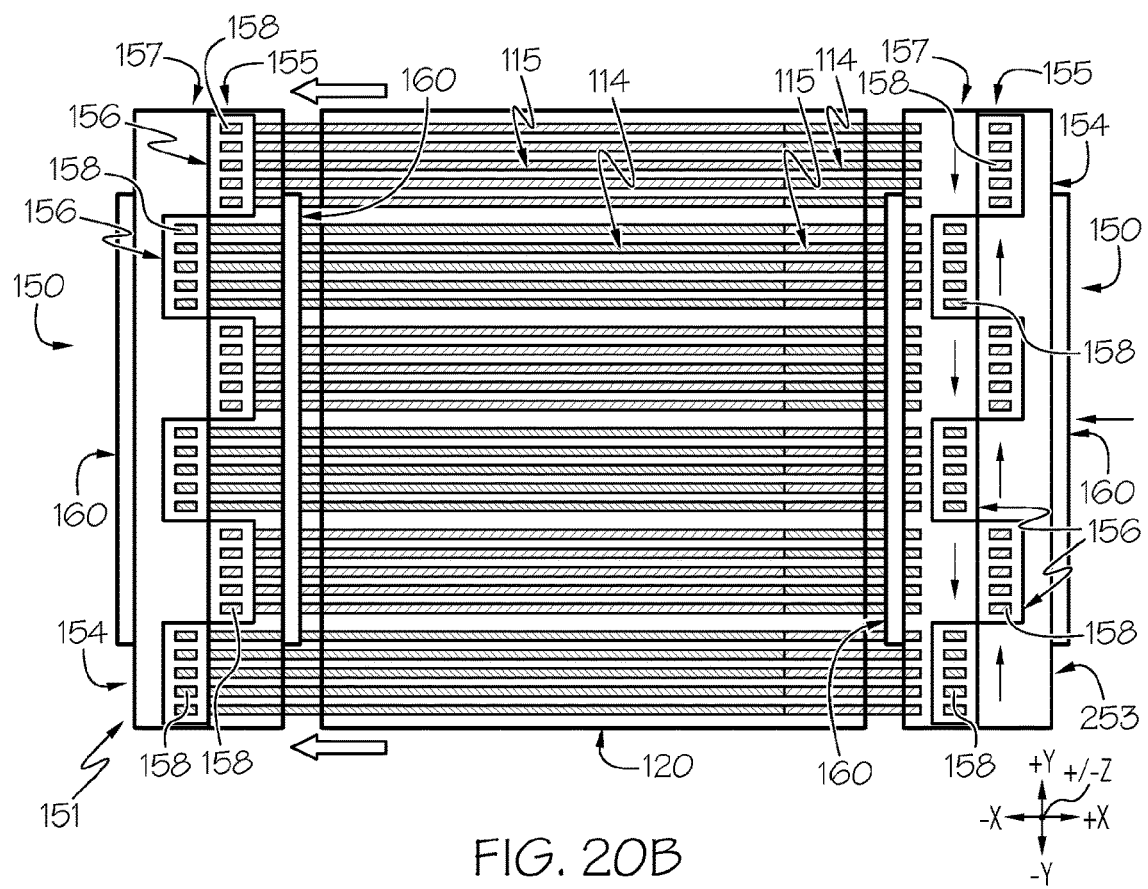
FIG. 20B schematically depicts the printing assembly of FIG. 20A with a first material deposited from a first print head row of print heads and a second material deposited from a second print head row of print heads along a first pass according to one or more embodiments shown and described herein.
Figure 27:
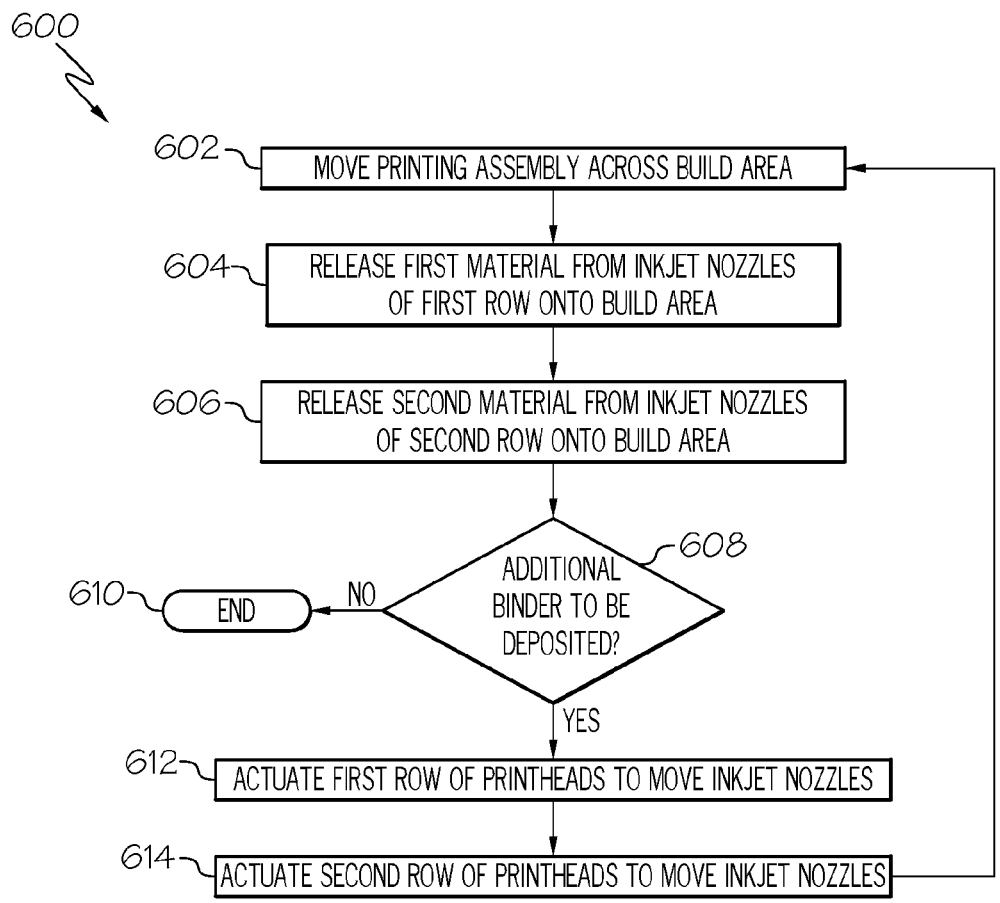
FIG. 27 depicts a flow diagram of an illustrative method of depositing material with the printing assembly of FIG. 1 with movable rows of print heads that deposit multiple materials according to one or more embodiments shown and described herein.

Referring now to FIGS. 20A-20B in conjunction with the flow diagram of FIG. 27, an exemplary method 600 of actuating the multiple print head rows 155, 157 of the printing assembly 150 as the manufacturing apparatus 100 builds an object is schematically depicted. More specifically, movement of the multiple print head rows 155, 157 of the plurality of print heads 156 for depositing the binder material 50 and/or other materials 114, 115 along the build area 120 serves to reduce an occurrence of a resolution defect on the printed object or part during the image transfer process. The depiction of FIGS. 20A-20B and 27, and the accompanying description below, is not meant to limit the subject matter described herein or represent an exact description of how materials may be deposited from the printing assembly 150, but instead is meant to provide a simple schematic overview to illustrate the general movement of multiple print head rows 155, 157 of print heads 156 of the printing assembly 150 to jet multiple materials as described herein.

Referring to FIG. 20A and at step 602, the computer readable and executable instructions, when executed by the processor of the control system 10, transmits a signal to the first actuator assembly 102 to translate the printing assembly 150 across the build area 120 in a first pass. In particular, the printing assembly 150 translates across the rail 104 of the apparatus 100 and along the working axis 116, thereby moving the printing head 154 over the build area 120 in the +X direction of the coordinate axes of the figures. In the present example, the plurality of print heads 156 of the first print head row 155 are communicatively coupled with the first fluid reservoir 110 via the first conduit 111 (see FIG. 1B) such that the plurality of print heads 156 of the first print head row 155 are operable to deposit the first material 114 along the build area 120. Further, the plurality of print heads 156 of the second print head row 157 are communicatively coupled with the second fluid reservoir 112 via the second conduit 113 (see FIG. 1B) such that the plurality of print heads 156 of the second print head row 157 are operable to deposit the second material 115 along the build area 120. It should be understood that in other embodiments, the print heads 156 of both the first print head row 155 and the second print head row 157 may be coupled to the same reservoir and/or the material stored within the first fluid reservoir 110 and the second fluid reservoir 112 may be the same.

At step 604, the computer readable and executable instructions, when executed by the processor of the control system 10, transmits a signal to the plurality of print heads 156 of the first print head row 155 to release the first material 114 from the first fluid reservoir 110 through the plurality of jet nozzles 158 of the print heads 156 defining the first print head row 155. The first material 114 is transferred to the print heads 156 and deposited onto the build area 120 through the plurality of jet nozzles 158 as the printing assembly 150 moves across the build area 120. At step 606, the control system 10 transmits a signal to the plurality of print heads 156 of the second print head row 157 to release the second material 115 from the second fluid reservoir 112 through the plurality of jet nozzles 158 of the print heads 156 defining the second print head row 157. The second material 115 is transferred to the print heads 156 and deposited onto the build area 120 through the plurality of jet nozzles 158 as the printing assembly 150 moves across the build area 120.

Accordingly, each of the plurality of jet nozzles 158 of the plurality of print heads 156 from the first print head row 155 and the second print head row 157 deposits at least one of the materials 114, 115 on at least one pixel positioned along the build area 120. In this instance, the plurality of print heads 156 of the first print head row 155 and the second print head row 157 are in a default position relative to one another (see FIG. 4) as the printing assembly 150 deposits the first material 114 and the second material 115 onto the build area 120 of the apparatus 100.

Referring now to FIG. 20B, the computer readable and executable instructions, when executed by the processor of the control system 10, determines whether the printing assembly 150 has reached the translated position 253 located in the +/−X direction at or past an edge of the build area 120 where material is to be deposited by the printing assembly 150 in the first pass. The control system 10 determines whether the printing assembly 150 has reached the translated position 253 by, for example, monitoring a relative position of the printing assembly 150 along the rail 104 as the printing assembly 150 translates along the working axis 116 of the apparatus 100 (i.e., +X direction of the coordinate axes of the figures) to the translated position 253.

In response to determining that the printing assembly 150 is not positioned at the translated position 253, the control system 10 transmits a signal to the first actuator assembly 102 to continue translating the printing assembly 150 across the build area 120 at step 602; releasing the first material 114 from the plurality of print heads 156 of the first print head row 155; and releasing the second material 115 from the plurality of print heads 156 of the second print head row 157.

Alternatively, in response to determining that the printing assembly 150 is positioned at the translated position 253, the computer readable and executable instructions, when executed by the processor of the control system 10, transmits a signal to the printing head 154 to terminate release of the first material 114 and the second material 115 from the plurality of print heads 156 of the first print head row 155 and the second print head row 157, respectively. Additionally and/or simultaneously, the control system 10 transmits a signal to the first actuator assembly 102 to terminate movement of the printing assembly 150 along the working axis 116.

Still referring to FIG. 20B, with the printing assembly 150 positioned at the translated position 253 the plurality of pixels positioned along the build area 120 have at least received one of the first material 114 and the second material 115 thereon during the first pass of the printing assembly 150 based on a relative position of the pixel. Accordingly, with the first print head row 155 and the second print head row 157 of print heads 156 remaining in a relatively fixed position during the first pass of the printing assembly 150 over the build area 120, each of the plurality of pixels along the build area 120 may only receive one of either the first material 114 or the second material 115 based on an alignment of the pixel to a jet nozzle 158 of a print head 156 of either the first print head row 155 or the second print head row 157.

Referring to FIG. 27 at step 608, with movement of the printing assembly 150 ceased and release of the materials 114, 115 from the print head rows 155, 157 of print heads 156 terminated, the computer readable and executable instructions executed by the processor of the control system 10 causes the apparatus 100 to determine whether an additional layer of material (e.g., binder) is to be deposited by the printing assembly 150. This determination by the control system 10 may be performed via various means and/or systems as described in detail above. In response to determining that additional layers of material are not required to be deposited at step 608, the control system 10 transmits a signal to the apparatus 100 to end the additive manufacturing process of method 600 at step 610.

Referring back to FIG. 20B and in response to determining that additional binder or other material is required to be deposited by the printing assembly 150 at step 608, the control system 10 transmits a signal to at least one actuator 160 coupled to the plurality of print heads 156 of the first print head row 155 at step 612. In this instance, the plurality of jet nozzles 158 of the plurality of print heads 156 defining the first print head row 155 are moved relative the plurality of jet nozzles 158 of the plurality of print heads 156 defining the second print head row 157. At step 614, the control system 10 transmits a signal to at least one actuator 160 coupled to the plurality of print heads 156 of the second print head row 157. In this instance, the plurality of jet nozzles 158 of the plurality of print heads 156 defining the second print head row 157 are moved relative the plurality of jet nozzles 158 of the plurality of print heads 156 defining the first print head row 155. It should be understood that in other embodiments the plurality of print heads 156 of the second print head row 157 does not include an actuator coupled thereto such that step 614 is omitted.

Referring back to FIG. 27, the computer readable and executable instructions, when executed by the processor of the control system 10, returns the method 600 to step 602 and repeats the steps shown and described herein for the second pass. In particular, the computer readable and executable instructions, when executed by the processor of the control system 10, transmits a signal to the first actuator assembly 102 to translate the printing assembly 150 across the build area 120 in a second pass. In particular, the printing assembly 150 translates across the rail 104 of the apparatus 100 and along the working axis 116, thereby moving the printing head 154 over the build area 120 in the −X direction of the coordinate axes of the figures. The computer readable and executable instructions, when executed by the processor of the control system 10, transmits a signal to the plurality of print heads 156 of the first print head row 155 to release the first material 114 through the plurality of jet nozzles 158 of the print heads 156 defining the first print head row 155. The control system 10 transmits a signal to the plurality of print heads 156 of the second print head row 157 to release the second material 115 through the plurality of jet nozzles 158 of the print heads 156 defining the second print head row 157.

Accordingly, the first material 114 is transferred from the first fluid reservoir 110 to the print heads 156 of the first print head row 155 and deposited onto the build area 120 through the plurality of jet nozzles 158 as the printing assembly 150 moves across the build area 120 in the second pass. The second material 115 is transferred from the second fluid reservoir 112 to the print heads 156 of the second print head row 157 and deposited onto the build area 120 through the plurality of jet nozzles 158 as the printing assembly 150 moves across the build area 120 in the second pass. As seen in FIG. 20B, the first material 114 may be deposited during the second pass on pixels along the build area 120 that received the second material 115 during the first pass. Additionally, the second material 115 may be deposited during the second pass on pixels of the build area 120 that received the first material 114 during the first pass. In this instance, the apparatus 100 is operable to deposit multiple materials 114, 115 on the build area 120, and in particular along similar pixels of the build area 120 such that one or more pixels may receive multiple materials 114, 115 thereon. The control system 10 proceeds to repeats the steps described in detail above until the three-dimensional part to be printed by the apparatus 100 is complete and no additional layers of material are to be deposited at step 608.

Although the present example of the exemplary method 600 depicts and describes the printing assembly 150 of the apparatus 100 being initially positioned at the home position 151 prior to moving to the translated position 253, and the plurality of print heads 156 of the first print head row 155 and/or the second print head row 157 being arranged in the default position prior to moving to a plurality of actuated positions, it should be understood that in other embodiments the printing assembly 150 may initially be positioned at the translated position 253 and the plurality of print heads 156 of the print head rows 155, 157 arranged in a position other than the default position without departing from the scope of the present disclosure. Moreover, it should be understood that the exemplary method 600 described and shown herein may be performed by various other printing assemblies other than the printing assembly 150, such as, for example, the three-row printing assembly described above. It should further be understood that in some embodiments one or more steps of the method 600 described above may be adjusted, varied, and/or omitted entirely, including but not limited to steps of releasing materials from the plurality of jet nozzles 158 onto the plurality of pixels of the build area 120; determining whether the printing assembly 150 is at the translated position 253; ceasing material release from the plurality of jet nozzles 158; ceasing movement of the printing assembly 150; and/or the like.

Figure 28:
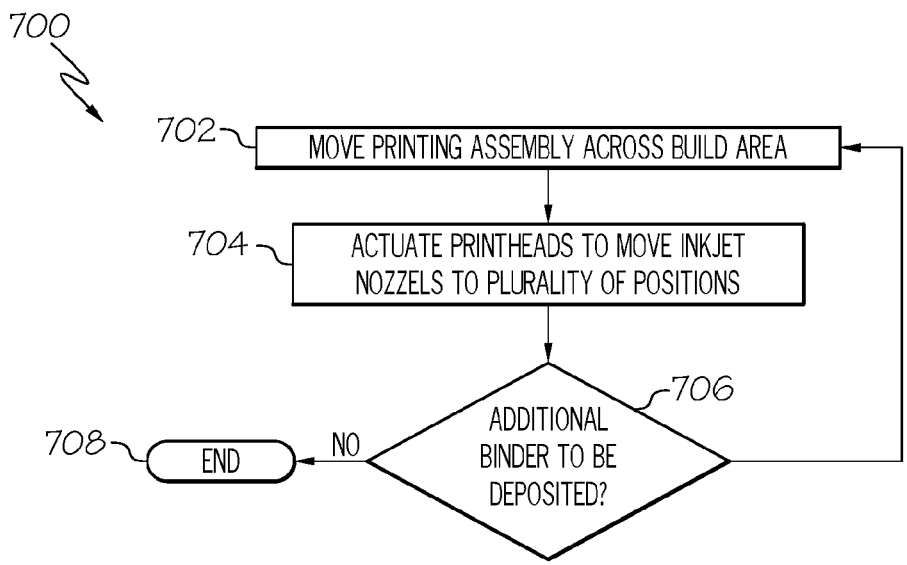
FIG. 28 depicts a flow diagram of an illustrative method of depositing material with the printing assembly of FIG. 1 with movable rows of print heads that translate to a plurality of positions according to one or more embodiments shown and described herein.

Referring now to the flow diagram of FIG. 28, an exemplary method 700 of actuating the multiple print head rows 155, 157 of the printing assembly 150 as the manufacturing apparatus 100 builds an object is schematically depicted. More specifically, movement of the multiple print head rows 155, 157 of the plurality of print heads 156 for depositing binder material 50 and/or other materials 114, 115 along the build area 120 serves to reduce an occurrence of a resolution defect on the printed object or part during the image transfer process due to lack of jetting redundancy. The depiction of FIG. 28, and the accompanying description below, is not meant to limit the subject matter described herein or represent an exact description of how materials may be deposited from the printing assembly 150, but instead is meant to provide a simple schematic overview to illustrate the general movement of multiple print head rows 155, 157 of print heads 156 of the printing assembly 150 to improve jetting redundancy as described herein.

At step 702, the computer readable and executable instructions, when executed by the processor of the control system 10, transmits a signal to the first actuator assembly 102 to translate the printing assembly 150 across the build area 120 in a first pass. In particular, the printing assembly 150 translates across the rail 104 of the apparatus 100 and along the working axis 116, thereby moving the printing head 154 over the build area 120 in the +X direction of the coordinate axes of the figures. The computer readable and executable instructions, when executed by the processor of the control system 10, further transmits a signal to the plurality of print heads 156 of the first print head row 155 and the second print head row 157 to release a material from the plurality of jet nozzles 158 of each, as the printing head 154 moves over the build area 120. The material (e.g., the binder material 50, the first material 114, the second material 115, and the like) is transferred to the printing head 154 and deposited onto the build area 120 through the plurality of jet nozzles 158 of the plurality of print heads 156 in both the first print head row 155 and the second print head row 157.

In the present example, the plurality of print heads 156 of the first print head row 155 and the plurality of print heads 156 of the second print head row 157 deposit the same material (e.g., the binder material 50, the first material 114, the second material 115, and the like) along the build area 120. Accordingly, each of the plurality of jet nozzles 158 of the plurality of print heads 156 from the first print head row 155 and the second print head row 157 jet the material on at least one pixel positioned along the build area 120. In this instance, the plurality of print heads 156 of the first print head row 155 and the second print head row 157 are in a default position (see FIG. 4) relative one another as the printing assembly 150 begins to deposit the material onto the build area 120 of the apparatus 100.

Still referring to FIG. 28 and at step 704, the computer readable and executable instructions, when executed by the processor of the control system 10, transmits a signal to at least one actuator 160 of the printing head 154 to move at least one of the first print head row 155 and/or the second print head row 157 of the plurality of print heads 156 relative one another. In other words, as the printing assembly 150 moves across the build area 120 at step 702, and as the plurality of print heads 156 release material through the plurality of jet nozzles 158 onto the pixels of the build area 120, at least one actuator 160 that is coupled to at least one of the first print head row 155 and/or the second print head row 157 is simultaneously actuated. The first print head row 155 and/or the second print head row 157 is translated along a plurality of directions that are transverse to the working axis 116 of the apparatus (i.e., +/−Y direction of the coordinate axes of the figures) to thereby move the plurality of jet nozzles 158 of the print heads 156 located in the respective print head row 155, 157 from the default position (see FIG. 4) to a plurality of positions.

It should be understood that the first print head row 155 and/or the second print head row 157 of the plurality of print heads 156 are continuously actuated (i.e. translated) to the plurality of positions at step 704 as the printing assembly 150 moves across the build area 120 and releases the material thereon along the plurality of pixels of the build area 120. Accordingly, the first print head row 155 and/or the second print head row 157 is positioned in a plurality of arrangements relative one another at step 704 during the material deposition process. In the present example, the printing assembly 150 includes an actuator 160 coupled to each of the first print head row 155 and the second print head row 157 of print heads 156, respectively, such that both print head rows 155, 157 are movable relative one another and relative the support bracket 152 of the printing assembly 150. In this instance, the plurality of jet nozzles 158 of each of the plurality of print heads 156 defining the first print head row 155 and the second print head row 157 are continuously repositioned from a default position to an actuated position that differs from the default position by at least some incremental distance (e.g., incremental distances A-G of FIGS. 17A-17G). Accordingly, during a first pass of the printing assembly 150 over the build area 120 the plurality of pixels positioned along the build area 120 will receive material thereon from multiple jet nozzles 158 during the first pass.

It should be understood that in some embodiments movement of the first print head row 155 and the second print head row 157 relative one another, and relative to a prior position of said print head rows 155, 157 during the current pass of the printing assembly 150 over the build area 120, may be arbitrary. In this instance, the computer readable and executable instructions, when executed by the processor of the control system 10, transmits a signal to the actuators 160 to move the first print head row 155 and the second print head row 157 of the plurality of print heads 156 to a plurality of randomly generated positions relative one another. In this embodiment, a jetting redundancy by the printing assembly 150 is provided through the continuous repositioning of the plurality of print heads 156 of each print head row 155, 157 in an uncalculated manner such that the plurality of pixels along the build area 120 are effectively aligned with a plurality of jet nozzles 158 during a current pass of the printing assembly 150.

In other embodiments, movement of the first print head row 155 and the second print head row 157 relative one another, and relative to a prior position of said print head rows 155, 157 during the current pass of the printing assembly 150, may be predetermined by the control system 10. In this instance, the computer readable and executable instructions, when executed by the processor of the control system 10, transmits a signal to the actuators 160 to move the first print head row 155 and/or the second print head row 157 of the plurality of print heads 156 to a plurality of measured positions that vary relative to a prior position of the print head rows 155, 157 during said current pass. In this embodiment, a jetting redundancy by the printing assembly 150 is provided through the continuous repositioning of the plurality of print heads 156 of each print head row 155, 157 in a calculated manner such that the plurality of pixels along the build area 120 are effectively aligned with a plurality of jet nozzles 158 during a current pass of the printing assembly 150.

The control system 10 may determine the calculated positions of the plurality of print heads 156 of the print head rows 155, 157 through various systems, such as, for example, a camera image, a sensor output, a calibration pattern, and the like. In either instance, the continuous movement of the first print head row 155 and the second print head row 157 of print heads 156 during the first pass of the printing assembly 150 provides an enhanced, material jetting redundancy of the manufacturing process by increasing a reliability that a complete resolution of each of the plurality of pixels on the build area 120 receives an adequate deposition of material thereon from more than one jet nozzle 158.

Still referring to FIG. 28, the computer readable and executable instructions, when executed by the processor of the control system 10, determine whether the printing assembly 150 has reached the translated position 253 (see FIG. 1). The control system 10 determines whether the printing assembly 150 has reached the translated position 253 by, for example, monitoring a relative position of the printing assembly 150 along the rail 104 as the printing assembly 150 translates along the working axis 116 of the apparatus 100 (i.e., +X direction of the coordinate axes of the figures) to the translated position 253. In response to determining that the printing assembly 150 is not positioned at the translated position 253, the computer readable and executable instructions, when executed by the processor of the control system 10, transmits a signal to the first actuator assembly 102 to continue translating the printing assembly 150 across the build area 120 at step 502; releasing the material from the plurality of print heads 156 of the first print head row 155 and the second print head row 157; and moving the first print head row 155 and the second print head row 157 to a plurality of positions at step 704.

Alternatively, in response to determining that the printing assembly 150 is positioned at the translated position 253, the computer readable and executable instructions, when executed by the processor of the control system 10, transmits a signal to the printing head 154 to terminate release of the material from the plurality of jet nozzles 158 of the plurality of print heads 156. Additionally and/or simultaneously, the computer readable and executable instructions, when executed by the processor of the control system 10, transmits a signal to the first actuator assembly 102 to terminate movement of the printing assembly 150 along the working axis 116. With the printing assembly 150 positioned at the translated position 253, the plurality of pixels positioned along the build area 120 have received the material from more than one jet nozzle 158 during the first pass of the printing assembly 150 over the build area 120 due to the continuous movement of the first print head row 155 and the second print head row 157 during said first pass.

Still referring to FIG. 28, the computer readable and executable instructions, when executed by the processor of the control system 10, transmits a signal to each of the actuators 160 coupled to the first print head row 155 of print heads 156 and the second print head row 157 of print heads 156, respectively, to terminate movement of the print head rows 155, 157 relative one another. With movement of the printing assembly 150 ceased and actuation of the print head rows 155, 157 of print heads 156 terminated, the computer readable and executable instructions executed by the processor of the control system 10 causes the apparatus 100 to determine whether an additional layer of material (e.g., binder) is to be printed at step 706. This determination by the control system 10 may be performed via various means and/or systems as described in detail above. In response to determining that additional layers of material are not to be deposited by the apparatus 100 at step 706, the computer readable and executable instructions, when executed by the processor of the control system 10, transmits a signal to the apparatus 100 to end the manufacturing process of method 700 at step 708.

Alternatively, in response to determining that additional layers of material are to be deposited by the apparatus 100 at step 706, the computer readable and executable instructions, when executed by the processor of the control system 10, returns the method 700 to step 702 and repeats the steps shown and described herein for the second pass. In this instance the instructions by the processor of the control system 10 causes the apparatus 100 to repeat the steps described in detail above until the three-dimensional model to be printed by the apparatus 100 is complete and no additional layers are to be printed at step 706.

Although the present example of the exemplary method 700 depicts and describes the printing assembly 150 of the apparatus 100 being initially positioned at the home position 151 prior to moving to the translated position 253, and the plurality of print heads 156 of the first print head row 155 and/or the second print head row 157 being arranged in the default position prior to moving to a plurality of actuated positions, it should be understood that in other embodiments the printing assembly 150 may initially be positioned at the translated position 253 and the plurality of print heads 156 of the print head rows 155, 157 arranged in a position other than the default position without departing from the scope of the present disclosure. Moreover, it should be understood that the exemplary method 700 described and shown herein may be performed by various other printing assemblies other than the printing assembly 150, such as, for example, the three-row printing assembly described above. It should further be understood that in some embodiments one or more steps of the method 700 described above may be adjusted, varied, and/or omitted entirely, including but not limited to steps of releasing materials from the plurality of jet nozzles 158 onto the plurality of pixels of the build area 120; determining whether the printing assembly 150 is at the translated position 253; ceasing material release from the plurality of jet nozzles 158; ceasing movement of the printing assembly 150; and/or the like.

Figure 29:
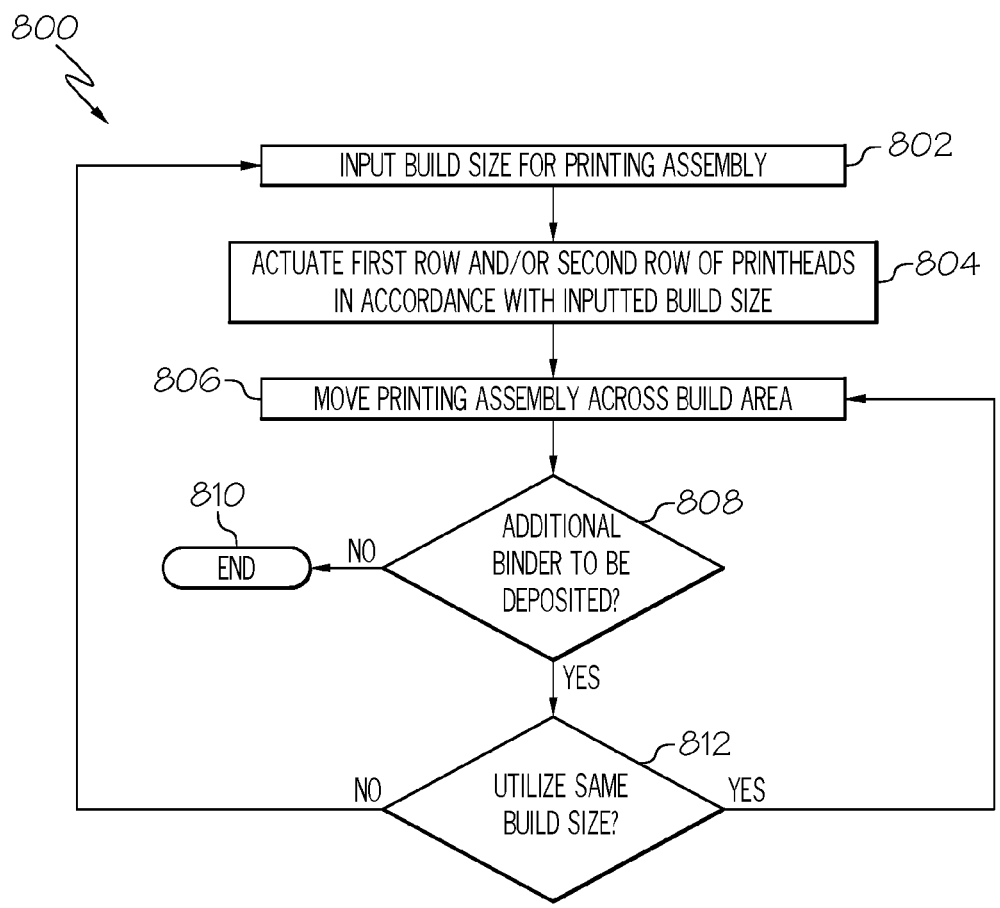
FIG. 29 depicts a flow diagram of an illustrative method of depositing material with a printing assembly with movable rows of print heads that deposit multiple materials at varying build sizes according to one or more embodiments shown and described herein.

Referring now to the flow diagram of FIG. 29, an exemplary method 800 of actuating the multiple print head rows 155, 157 of the printing assembly 150 as the manufacturing apparatus 100 builds an object is schematically depicted. More specifically, movement of the multiple print head rows 155, 157 of the plurality of print heads 156 for depositing binder material 50 and/or other materials 114, 115 along the build area 120 serves to reduce an occurrence of a resolution defect on the printed object or part during the image transfer process due to lack of jetting redundancy. The depiction of FIG. 29, and the accompanying description below, is not meant to limit the subject matter described herein or represent an exact description of how materials may be deposited from the printing assembly 150, but instead is meant to provide a simple schematic overview to illustrate the general movement of multiple print head rows 155, 157 of print heads 156 of the printing assembly 150 to improve jetting redundancy as described herein.

At step 802, the computer readable and executable instructions, when executed by the processor of the control system 10, receives an input of a programmable build size for the printing assembly 150 to employ prior to initiating the material deposition process. As briefly described above, the printing assembly 150 is configured to dynamically adjust an effective build size of the printing head 154 in response to moving at least one of the plurality of print heads 156 defining the first print head row 155 and/or the second print head row 157. It should be understood that a build size of the printing head 154 corresponds to a lateral width (in the +/−Y-axis of the coordinate axes of the figures) of a jetting range and/or field of view of the plurality of print heads 156 disposed therein. A jetting range of the printing head 154 may be dynamically adjusted (e.g., increased or decreased) by moving the plurality of print heads 156 of the first print head row 155 and the second print head row 157 relative to one another and the support bracket 152 of the printing assembly 150 to a plurality of arrangements (in the +/−Y axes of the coordinate axes of the figures).

For example, a build size and/or width of the printing head 154 may be relatively minimal by substantially aligning the plurality of print heads 156 of the first print head row 155 and the second print head row 157 with one another, in the +/−Y axes of the coordinate axes of the figures, such that an overall jetting range of the printing head 154 (in the +/−Y axes of the coordinate axes of the figures) is minimized. In other words, the plurality of print heads 156 of the first print head row 155 and the second print head row 157 are translated in the +/−Y axes of the coordinate axes of the figures to substantially overlap with one another in the +/−X axes of the coordinate axes of the figures. Examples of the printing head 154 of the printing assembly 150 including a relatively minimal build size in response to actuating the plurality of print heads 156 of the first print head row 155 and the second print head row 157 to form an overlap of the plurality of jet nozzles 158 (in the +/−Y axes of the coordinate axes of the figures) is shown in FIGS. 17A-17C.

By way of further example, a build size and/or width of the printing head 154 may be relatively great by substantially offsetting the plurality of print heads 156 of the first print head row 155 and the second print head row 157 with one another, in the +/−Y axes of the coordinate axes of the figures, such that an overall jetting range of the printing head 154 (in the +/−Y axes of the coordinate axes of the figures) is maximized. In other words, the plurality of print heads 156 of the first print head row 155 and the second print head row 157 are translated in the +/−Y axes of the coordinate axes of the figures to be substantially offset with one another in the +/−X axes of the coordinate axes of the figures. Examples of the printing head 154 of the printing assembly 150 including a relatively maximum build size in response to actuating the plurality of print heads 156 of the first print head row 155 and the second print head row 157 to laterally extend the plurality of jet nozzles 158 (in the +/−Y axes of the coordinate axes of the figures) is shown in FIGS. 17D-17G.

Still referring to FIG. 29 at step 804, the computer readable and executable instructions, when executed by the processor of the control system 10, actuates the first print head row 155 and/or the second print head row 157 of the plurality of print heads 156 in accordance with the build size input at step 802. It should be understood that a build size input may be arbitrary such that the effective print width of the printing assembly 150 is randomly generated; it may be precalculated by the control system of the apparatus 100 such that the effective print width of the printing assembly 150 is predefined; and/or it may be manually identified by an operator of the apparatus 100. At step 806, the computer readable and executable instructions, when executed by the processor of the control system 10, transmits a signal to the first actuator assembly 102 to translate the printing assembly 150 across the build area 120 in a first pass. In particular, the printing assembly 150 translates across the rail 104 of the apparatus 100 and along the working axis 116, thereby moving the printing head 154 over the build area 120 in the +X direction of the coordinate axes of the figures. The computer readable and executable instructions, when executed by the processor of the control system 10, further transmits a signal to the plurality of print heads 156 of the first print head row 155 and the second print head row 157 to release a material from the plurality of jet nozzles 158 of each, as the printing head 154 moves over the build area 120. The material (e.g., the binder material 50, the first material 114, the second material 115, and the like) is transferred to the printing head 154 and deposited onto the build area 120 through the plurality of jet nozzles 158 of the plurality of print heads 156 in both the first print head row 155 and the second print head row 157.

In the present example, the plurality of print heads 156 of the first print head row 155 and the plurality of print heads 156 of the second print head row 157 deposit the same material (e.g., the binder material 50, the first material 114, the second material 115, and the like) along the build area 120. Accordingly, each of the plurality of jet nozzles 158 of the plurality of print heads 156 from the first print head row 155 and the second print head row 157 jet the material on at least one pixel positioned along the build area 120. In this instance, the plurality of print heads 156 of the first print head row 155 and the second print head row 157 are in an actuated position relative one another, in accordance with the inputted build size of step 802, as the printing assembly 150 begins to deposit the material onto the build area 120 of the apparatus 100.

Still referring to FIG. 29, the computer readable and executable instructions, when executed by the processor of the control system 10, determines whether the printing assembly 150 has reached the translated position 253 located in the +/−X direction at or past an edge of the build area 120 where material is to be deposited by the printing assembly 150 in the first pass. The control system 10 determines whether the printing assembly 150 has reached the translated position 253 by, for example, monitoring a relative position of the printing assembly 150 along the rail 104 as the printing assembly 150 translates along the working axis 116 of the apparatus 100 (i.e., +X direction of the coordinate axes of the figures) to the translated position 253. In response to determining that the printing assembly 150 is not positioned at the translated position 253, the control system 10 transmits a signal to the first actuator assembly 102 to continue translating the printing assembly 150 across the build area 120 at step 802. The control system 10 further transmits a signal to the printing head 154 to release material from the plurality of jet nozzles 158 of the plurality of print heads 156 of the first print head row 155 and the second print head row 157.

Alternatively, in response to determining that the printing assembly 150 is positioned at the translated position 253, the computer readable and executable instructions, when executed by the processor of the control system 10, transmits a signal to the printing head 154 to terminate release of the material from the plurality of jet nozzles 158 of the plurality of print heads 156 of the first print head row 155 and the second print head row 157. Additionally and/or simultaneously, the control system 10 transmits a signal to the first actuator assembly 102 to terminate movement of the printing assembly 150 along the working axis 116 by ceasing actuation of the first actuator assembly 102. With the printing assembly 150 positioned at the translated position 253, the plurality of pixels positioned along the build area 120 have received material thereon from at least the first print head row 155 or the second print head row 157 during the first pass of the printing assembly 150 over the build area 120 in the +X direction of the coordinate axes.

Still referring to FIG. 29 and at step 808, the control system 10 determines whether a layer of material (e.g., binder) is to be deposited from the printing assembly 150. This determination by the control system 10 may be performed via various means and/or systems as described in detail above. In response to determining that an additional layer of material (e.g., binder) is not to be deposited from the printing assembly 150 at step 808, the control system 10 transmits a signal to the apparatus 100 to end the manufacturing process of method 800 at step 810. Alternatively, in response to determining that an additional layer of material (e.g., binder) is to be deposited from the printing assembly 150 at step 808, the computer readable and executable instructions, when executed by the processor of the control system 10, verifies whether an identical build size of the printing assembly 150 is to be utilized by the apparatus 100 for a second pass of the printing assembly 150 across the build area 120 at step 812.

In response to the control system 10 of the apparatus 100 determining that a different build size is to be effectively employed by the printing assembly 150 at step 812, the instructions executed by the processor of the control system 10 returns the method 800 to step 802 and repeats the steps shown and described herein for the second pass determine a new effective build size of the printing assembly 150. Alternatively, in response to the control system 10 of the apparatus 100 determining that an identical build size is to be effectively employed by the printing assembly 150 at step 812, the executed by the processor of the control system 10 returns the method 800 to step 806 and repeats the steps shown and described herein for the second pass. In either instance, the instructions causes the apparatus 100 to repeat the steps described in detail above until the three-dimensional model to be printed by the apparatus 100 is complete or no additional layers of material are to be deposited at step 808.

Although the present example of the exemplary method 800 depicts and describes the printing assembly 150 of the apparatus 100 being initially positioned at the home position 151 prior to moving to the translated position 253, and the plurality of print heads 156 of the first print head row 155 and/or the second print head row 157 being arranged to define a selected build size prior to the printing assembly 150 moving across the build area 120, it should be understood that in other embodiments the printing assembly 150 may initially be positioned at the translated position 253 and the build size of the printing assembly 150 employed during and/or after the printing assembly 150 moves across the build area 120 during a first pass. Additionally, the plurality of print heads 156 of the print head rows 155, 157 may be arranged in a plurality of other positions other than those shown and described in FIGS. 17A-17G above without departing from the scope of the present disclosure. Moreover, it should be understood that the exemplary method 800 described and shown herein may be performed by various other printing assemblies other than the printing assembly 150, such as, for example, the three-row printing assembly described above. It should further be understood that in some embodiments one or more steps of the method 800 described above may be adjusted, varied, and/or omitted entirely, including but not limited to steps of releasing materials from the plurality of jet nozzles 158 onto the plurality of pixels of the build area 120; determining whether the printing assembly 150 is at the translated position 253; ceasing material release from the plurality of jet nozzles 158; ceasing movement of the printing assembly 150; and/or the like.

Figure 30:
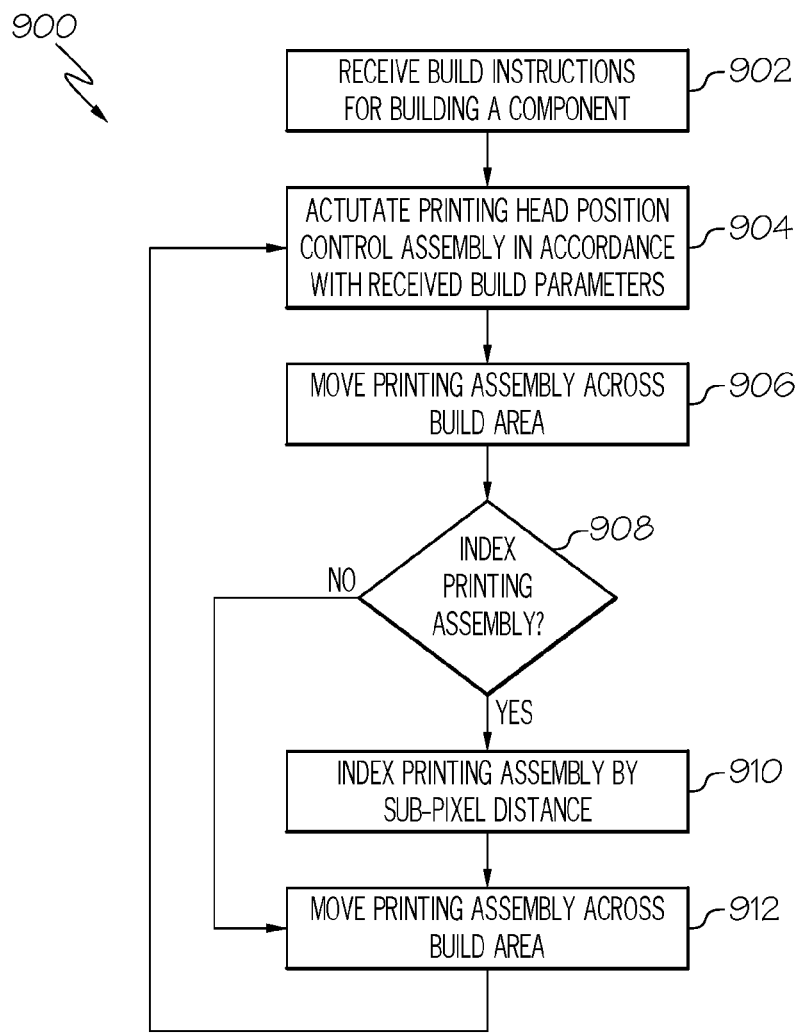
FIG. 30 depicts a flow diagram of an illustrative method of depositing material with a printing assembly with an indexable printing assembly that provide sub-pixel jet nozzle movement for high-resolution material deposition according to one or more embodiments shown and described herein.

Referring now to the flow diagram of FIG. 30, an exemplary method 900 of indexing a printing assembly 150 using a second actuator assembly as described and depicted with reference to FIGS. 21A-21E is depicted. More specifically, the method 900 may be implemented by a control system 10 (e.g., an electronic control unit) of the apparatus 100 depicted and described herein. It should be understood that while FIGS. 24-32 depict and describe various methods, each of the methods and steps thereof may be combined to form logic and operations that are carried out by the apparatus 100 described herein.

Referring to FIG. 30, in particular, at block 902, an electronic control unit may receive build instructions for building a component. The build instructions may be generated by a computing device 15 (FIG. 1B) implementing logic such as a slicing engine that defines how an apparatus may operate and what materials to use to build a particular component based on an inputted a model or drawing.

The slicing engine may define a plurality of pixels and/or sub-pixel centers. Once the layers, pixels, and/or sub-pixel centers are defined, a slicing engine may begin determining the amount of binder to deposit within each pixel within each layer. The predetermined amount of binder and the pixels defining a binder-receiving surface of a layer are combined to define a design deposition pattern for the layer of the component to be built. The build instructions may include a deposition pattern (e.g., 125, 126, or 127, FIGS. 21C-21E, respectively) defining the locations and amounts of binder to be deposited on layers of powder on the build area 120. The build instructions further include predefined motion controls for the first and second actuator assemblies 102 and 103.

At block 904, the electronic control unit of the apparatus may actuate the printing head position control assembly (e.g., the first actuator assembly 102, the second actuator assembly 103, and other components) in accordance with the received build instructions. For example, the electronic control unit transmits one or more control signals that cause the first actuator 102 and/or the second actuator 103 to perform a movement defined by the build instructions. As described above, the actuators may include, without limitation, a worm drive actuator, a ball screw actuator, a pneumatic piston, a hydraulic piston, an electro-mechanical linear actuator, or the like. As such, a control signal from the electronic control unit may cause a motor associated with a worm drive actuator or a ball screw actuator to energize for a period of time or until a number of revolutions are completed to cause the predetermined motion defined by the build instructions. In some instances, the first actuator assembly 102 and/or the second actuator assembly 103 may include a position sensor (e.g., 102a and/or 103a) that provides the electronic control unit with position information in a feedback control signal such that the electronic control unit may track the position of the printing assembly 150 in response to the provided control signals. In some instances the electronic control unit may make adjustments to the control signal provided to the first actuator assembly 102 and/or the second actuator assembly 103 based on the position information provided by the position sensor (e.g., 102a and/or 103a). In embodiments, the position sensor (e.g., 102a and/or 103a) may be an ultrasonic sensor, a light based sensor, a magnetic sensor, or the like embedded in or coupled to the first actuator assembly 102 and/or the second actuator assembly 103.

At block 906, the electronic control unit causes the printing assembly 150 including at least one printing head 154 to traverse the build area 120 in a first pass trajectory along the longitudinal axis in a first direction. Moreover, the electronic control unit causes select ones of the plurality of jet nozzles 158 to dispense one or more drops of binder or other material onto the build area 120. The electronic control unit is communicatively coupled to one or more of the plurality of print heads 156 such that control signals generated by the electronic control unit cause the jet nozzles associated with the print heads 154 to dispense binder or other material at predefined locations in predefined amounts as the printing assembly 150 traverses the build area 120 as defined by a deposition pattern for a layer of powder of a build (e.g., 125, FIG. 21C). Referring briefly back to FIG. 21C the first pass of the printing assembly 150 may deposit binder in locations and amounts as depicted by an illustrative representation of a deposition pattern 125. During the first pass, the jet nozzles 158 (e.g., depicted in FIG. 21A) are aligned with the first pass trajectories depicted with hash markings and deposit amounts of binder as indicated by the values within each sub-pixel region along the first pass trajectory.

Once a pass of the build area is completed by the printing assembly 150, the electronic control unit, based on the build instructions, determines whether indexing of the printing assembly 150 along the latitudinal axis is required, at block 908. If indexing is required, ("YES" at block 908) the electronic control unit transmits a control signal to the second actuator assembly 103 to index the printing assembly 150 a predefined amount (e.g., an index distance), for example, greater than zero and less than a jet-spacing (d) (or any integer multiple of the fractional jet-spacing (d) thereof) as defined by the build instructions, at block 910. Referring to FIGS. 21A and 21B the index distance is the distance from positon $I_0$ to position $I_1$.

The method 900 of FIG. 30 moves from block 910 to block 912. The printing assembly 150 is again moved across the build area 120, this time in a second pass in a second direction opposite the first direction along the longitudinal axis, and the electronic control unit causes select ones of the plurality of jet nozzles 158 to dispense one or more drops of binder onto the build area 120, at block 912. As described above, the binder may be dispensed in multiple locations and in various amounts at locations on the layer of powder corresponding to a pixel defined in the deposition pattern as the printing assembly traverse the longitudinal axis (e.g., the working axis 116).

As described above, the electronic control unit is communicatively coupled to one or more of the plurality of print heads 156 such that control signals generated by the electronic control unit cause the jet nozzles associated with the print heads 154 to dispense binder or other material at predefined locations in predefined amounts as the printing assembly 150 traverses the build area 120 as defined by a deposition pattern (e.g., 125, FIG. 21C) for a layer of powder of a build. Referring briefly back to FIG. 21C the first pass of the printing assembly 150 may deposit binder in locations and amounts as depicted by the illustrative representation of a deposition pattern 125. During the second pass, the jet nozzles 158 (e.g., depicted in FIG. 21B) are aligned with the second pass trajectories depicted with no hash markings in FIG. 21B and deposit amounts of binder as indicated by the values annotated within each sub-pixel region along the second pass trajectory.

If indexing of the printing assembly is not required, ("NO" at block 908), then the method 900 proceeds to block 912, where the printing assembly 150 may move across the build area in a second pass in a second direction opposite the first direction along the longitudinal axis as described herein. The method 900 depicted in FIG. 30 may be repeated throughout the build of a component.

In some embodiments, either independent of or in conjunction with the method 900 depicted and described with reference to FIG. 30, the method 1000 depicted and described with reference to FIG. 31 may implement a predefined random index of the printing assembly during a build to reduce the impact of a potentially malfunctioning printing head 154 or jet nozzle 158 on the overall quality and strength of the component being built.

Figure 31:
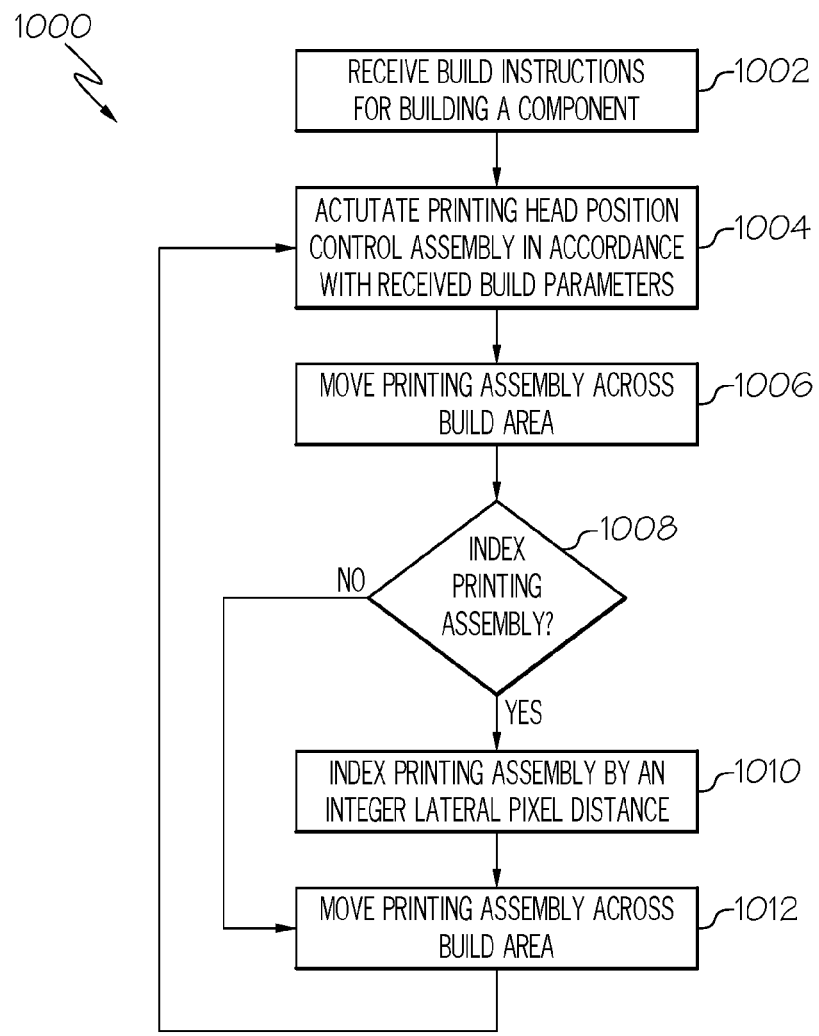
FIG. 31 depicts a flow diagram of an illustrative method of depositing material with a printing assembly with an indexable printing assembly that provides predefined random indexing of one or more of the plurality of jet nozzles according to one or more embodiments shown and described herein.

Referring to FIG. 31, a flow diagram of an exemplary method 1000 of randomly indexing a printing assembly 150 using a second actuator assembly as described and depicted with reference to FIGS. 22A-22B is depicted. For brevity and to reduce repetition, blocks 1002-1004 of method 1000 correspond to blocks 902-904 of method 900 depicted and described with reference to the flow diagram of FIG. 30.

At block 1006, the electronic control unit causes the printing assembly 150 including at least one print head 156 and jet nozzle 158 to traverse the build area 120 in a first pass trajectory along the longitudinal axis in a first direction. Moreover, the electronic control unit causes select ones of the plurality of jet nozzles 158 to dispense one or more drops of binder or other material onto the build area 120. The electronic control unit is communicatively coupled to one or more of the plurality of print heads 156 such that control signals generated by the electronic control unit cause the jet nozzles 158 associated with the print heads 154 to dispense binder or other material at predefined locations in predefined amounts as the printing assembly 150 traverses the build area 120 as defined by a deposition pattern for a layer of powder of a build (e.g., 125, FIG. 21C). However, from time to time, and for various reasons a jet nozzle 158 or a print head 156 may malfunction causing binder or other material to not be applied in the prescribed manner. For example, referring to FIG. 22A, jet nozzles 195a and 195b are both malfunctioning and as they traverse the build area 120, they fail to deposit binder along their respective trajectories 190a and 190b. In other words, the malfunctioning jet nozzles 195a and 195b fail to deposit binder at prescribed locations based on the deposition pattern defining pixels, sub-pixels, and amounts of binder to deposit in each. To reduce the impact of the component not receiving binder or other material during a pass due to a malfunctioning print head 156 or jet nozzle 158, the build instructions defined by the slicing engine may include random shifting or indexing of the printing assembly 150 so that the same jet nozzle 158 does not traverse the same trajectory on a consecutive pass or at least from time to time is aligned with a different trajectory.

Accordingly, the electronic control unit, at block 1008, determines whether an index of the printing assembly is prescribed by the build instructions and the corresponding predefined random index distance. If no index is prescribed at the completion of a pass of the printing assembly 150 over the build area 120, ("NO" at block 1008), then the method advances to block 1012. If indexing is prescribed at the completion of a pass of the printing assembly 150 over the build area 120, ("YES" at block 1008), then the method advances to block 1010. At block 1010, the electronic control unit transmits a control signal to the second actuator assembly 103 to index the printing assembly 150 a predefined amount (e.g., the predefined random index distance), for example, a predefined integer multiple of a jet-spacing (d) such that a first jet nozzle 158 of the plurality of jet nozzles 158 that corresponds to a first trajectory assigned by the build instructions during one pass of the printing assembly along the longitudinal axis is moved to corresponds to a second trajectory and another jet nozzle 158 corresponds to the first trajectory for a subsequent pass. Referring to FIG. 22B in view of FIG. 22A, the printing assembly is indexed five jet-spacing (d) units such that the jet nozzle 158 moves in a lateral direction five jet-spacing (d) units. More specifically, the second malfunctioning jet 195b now corresponds to a new trajectory 191 as opposed to its previous trajectory 190b.

The method 1000 of FIG. 31 moves from block 1010 to block 1012. The printing assembly 150 is again moved across the build area 120, this time in a second pass in a second direction opposite the first direction along the longitudinal axis, and the electronic control unit causes select ones of the plurality of jet nozzles 158 to dispense one or more drops of binder onto the build area 120, at block 1012. As described above, the binder may be dispensed in multiple locations and in various amounts within a pixel as the printing assembly traverse the longitudinal axis (e.g., the working axis 116). The method 1000 depicted in FIG. 31 may be repeated throughout the build of a component and in some instances be combined with the method 900 described in FIG. 30.

Figure 32:
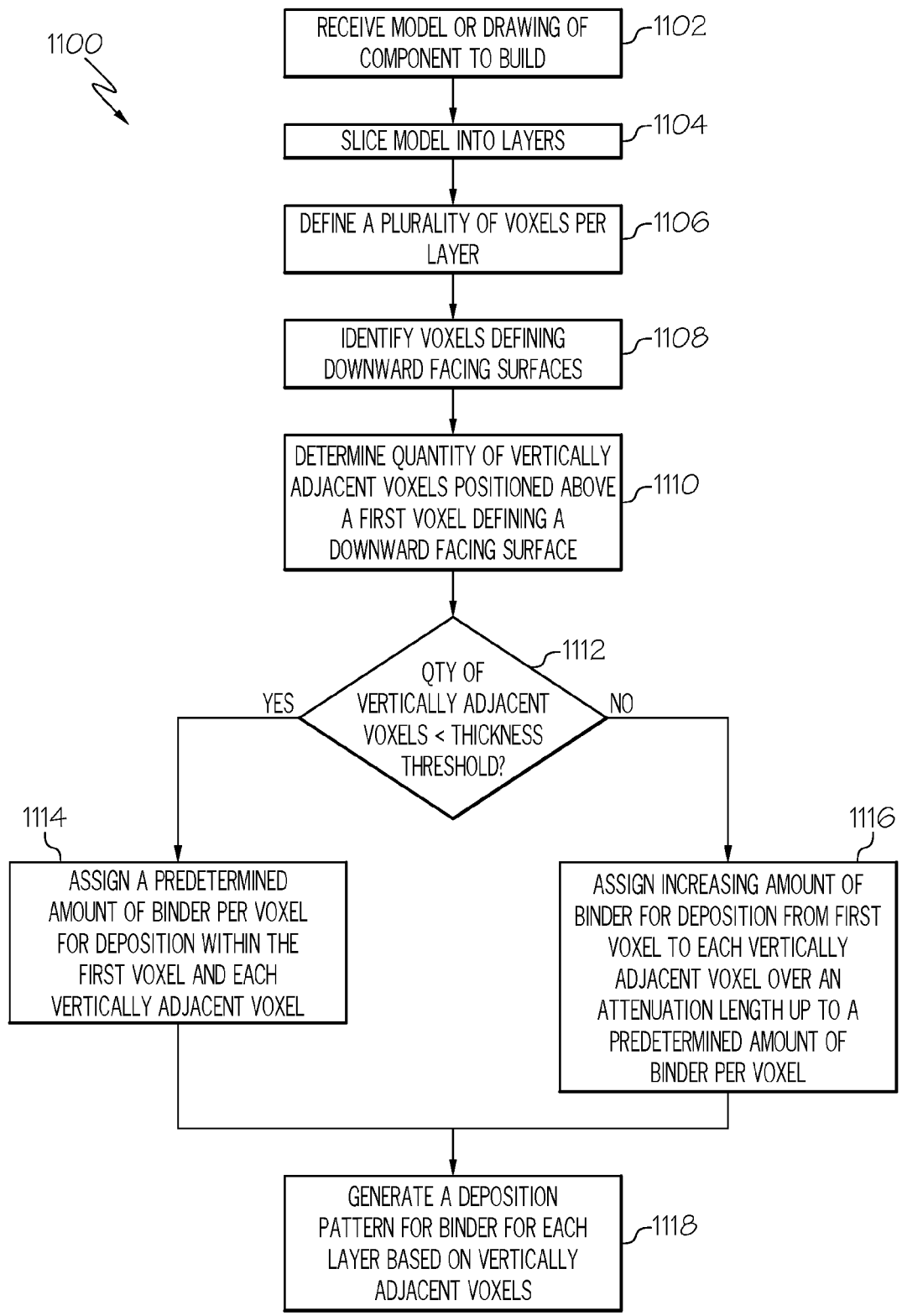
FIG. 32 depicts a flow diagram of an illustrative method of controlling binder bleed between layers according to one or more embodiments shown and described herein.

Referring now to FIG. 32, an illustrative flow diagram of a method 1100 for controlling binder bleed within a component build is depicted. In addition to controlling the location and amounts of binder within a layer of a component being built by the apparatus 100, there may also be a need to control binder bleed. Binder bleed refers to the occasions where binder from an upper layer of a component propagates into a lower layer before having time to cure or bond with the powder layer in which it was applied. As discussed above with reference to FIGS. 23A-23B, this can be a rate limiting parameter with respect to how fast subsequent layers may be built. However, the methods described herein provide a solution that reduce or eliminate the rate limiting effect of binder bleed during a build operation with the apparatus. Accordingly, components may be built at faster rates than those without implementing such methods and apparatuses.

The method described herein may be performed by an electronic control unit or computing device 15 implementing a slicing engine and/or other motion control generating code for building a component with the apparatus 100. Referring in particular to FIG. 32, at block 1102 a slicing engine may receive a model or drawing 200 (FIG. 23A) of a component to build. The slicing engine incorporates logic that defines build instructions including generating executable instructions for the apparatus 100 to execute and build the modeled component. The slicing engine may first slice the model into a plurality of layers 210 (FIG. 23B), at block 1104. Each layer may have a predetermined thickness and one or more assigned material types. At block 1106, the slicing engine may define a plurality of portions 220 per layer. A portion 220 is a three-dimensional portion that defines a unit volume of the component to be built where build material and binder are designed to combine to form a voxel. The portion 220 may be an estimation of the actual dispersion behavior within the selected build material. Accordingly, the portion 220 may be estimated to have a thickness that is equal to, or less than, or greater than the layer thickness and have a surface area about the size of the jet-spacing (d). It is understood that the portion 220 may be further defined based on the properties of the binder and build material, the environment in which the component is built (e.g., temperature, pressure, curing energy source, etc.), the predicted or modeled interaction of the binder and build material. For purposes of explanation, the portions 220 are assumed to have a cubic shape; however, this is only for purposes of explanation. The slicing engine may further identify portions 220 that define a downward facing surface 221 of the component, at block 1108. The portions 220 defining the downward facing surface may be considered important with respect to controlling binder bleed as excess binder within these portions may result in poor surface finishes. Once the layers, image voxels, and surface defining voxels are defined, a slicing engine may determine the drop volume of binder to deposit within each portion of powder (e.g., to achieve the desired voxel) within each layer of the component. At block 1110, the slicing engine determines the quantity of vertically adjacent voxels positioned above each first portion defining a downward facing surface 221.

At block 1112, the slicing engine determines how to treat each of the vertically adjacent voxels with respect to the amount of binder that should be applied. The determination may be made based on whether a series of vertically adjacent portions is less than, equal to, or greater than a predetermined thickness threshold. The thickness threshold is predetermined based on characteristics of the binder, powder, build speed, component features, whether a curing energy is applied, the amount of time the curing energy is applied, the energy at which it is applied and/or other aspects of the build. Referring back to block 1112, if the quantity of vertically adjacent portions 222 is less than or equal to a predetermined thickness threshold, then the method 1100 advances to block 1114. On the other hand, at block 1112, if the quantity of vertically adjacent voxels is not less than a predetermined thickness threshold, then the method 1100 advances to block 1116.

At block 1114, the slicing engine assigns a predetermined amount of binder per portion for deposition within the first portion and each vertically adjacent portion. If the thickness threshold 240 is three, as depicted for example in FIG. 23, then each of the vertically adjacent portions 222 are determined to receive the same amount of binder per voxel amount. However, if the quantity of vertically adjacent portions is not less than a predetermined thickness threshold, then at block 1116 the slicing engine assigns an increasing amount of binder for deposition from the first portion to each of the vertically adjacent portions over an attenuation length 230 up to a predetermined amount of binder per portion. For example, the binder per portion assigned in each of the vertically adjacent portions may be assigned in a linear, exponential, or other algorithmic proportion based on the vertically adjacent portions distances from the portion defining the downward facing surface. Using the method 1100 or variations thereof to determine drop volumes of binder per portion for portions extending from a downward facing surface 221, the slicing engine at block 1118 generates a design deposition pattern (e.g., 125 of FIG. 21C) for binder for each layer based on the vertically adjacent portions. The design deposition pattern may be executed by one or more of the methods and apparatuses described herein.

It should be understood that steps of the aforementioned processes may be omitted or performed in a variety of orders while still achieving the object of the present disclosure. The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Based on the foregoing, it should be understood that a printing assembly, includes a support bracket and a first print head row comprising a first plurality of print heads that are sequentially spaced apart from one another in a direction that is transverse to a working axis of the printing assembly. Each of the first plurality of print heads includes a plurality of jet nozzles thereon. The printing assembly further includes a second print head row comprising a second plurality of print heads sequentially spaced apart from one another in the direction transverse to the working axis. Each of the second plurality of print heads includes a plurality of jet nozzles, and the first print head row and the second print head row are spaced apart along the working axis. The printing assembly further includes an actuator coupled to a first print head of the first plurality of print heads, and is configured to move the first print head relative to the support bracket in the direction transverse to the working axis.

It is also understood that a manufacturing apparatus may include a printing head having a plurality of jets spaced apart from one another in a direction transverse to a longitudinal axis, where a distance from a first jet to a second jet positioned adjacent the first jet of the plurality of jets defines a jet-spacing. The manufacturing apparatus may further include a printing head position control assembly having a first actuator assembly configured to move the printing head along the longitudinal axis and a second actuator assembly configured to move the printing head along a latitudinal axis and an electronic control unit communicatively coupled to the printing head position control assembly. The electronic control unit may be configured to cause select ones of the plurality of jets to dispense one or more drops of binder while the printing head traverses a first pass trajectory along the longitudinal axis in a first direction, index the printing head to a second pass trajectory along the latitudinal axis by an index distance greater than zero and less than the jet-spacing, and cause select ones of the plurality of jets to dispense one or more drops of binder while the printing head traverses the second pass trajectory along the longitudinal axis in a second direction opposite the first direction.

In further embodiments, the manufacturing apparatus may include at least one printing head comprising a plurality of jets spaced apart from one another in a direction transverse to a longitudinal axis, where a distance from a first jet to a second jet positioned adjacent the first jet of the plurality of jets defines a jet-spacing. A printing head position control assembly of the manufacturing apparatus includes a first actuator configured to move the printing head along the longitudinal axis and a second actuator configured to move the printing head along a latitudinal axis. An electronic control unit communicatively coupled to the printing head position control assembly is configured to: cause select ones of the plurality of jets to dispense one or more drops of binder to a powder layer in a deposition pattern defined by a slicing engine as the printing head traverses along the longitudinal axis applying binder, where the first jet of the plurality of jets corresponds to a first trajectory assigned by the slicing engine. The electronic control unit may further index the printing head by an integer number of pixels along the latitudinal axis such that the first jet corresponds to a second trajectory and another jet corresponds to the first trajectory assigned by the slicing engine, and cause the indexed printing head to traverse along the longitudinal axis and apply binder to the powder layer in the deposition pattern defined by the slicing engine.

In yet further embodiments, it is understood that a manufacturing apparatus may include a printing head comprising a plurality of jets spaced apart from one another in a direction transverse to a longitudinal axis, a printing head position control assembly having a first actuator configured to move the printing head along the longitudinal axis; and an electronic control unit communicatively coupled to the printing head position control assembly. The electronic control unit is configured to cause select ones of the plurality of jets to dispense a predetermined volume of binder to a powder layer in a deposition pattern defined by a slicing engine as the printing head traverses the longitudinal axis applying binder, where an amount of binder dispensed in a first portion of powder in a first layer is less than the amount of binder dispensed in a portion of powder in a second layer located above the first portion of powder in the first layer.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A manufacturing apparatus, comprising:
   a printing head comprising a plurality of print heads comprising a plurality of jet nozzles spaced apart from one another in a direction transverse to a longitudinal axis, which is a working axis of the manufacturing apparatus, wherein a distance from a first jet nozzle to a second jet nozzle positioned adjacent the first jet nozzle of the plurality of jet nozzles defines a jet-spacing;
   a printing head position control assembly comprising a first actuator assembly configured to move the printing head along the longitudinal axis and a second actuator assembly configured to move the printing head along a latitudinal axis; and
   an electronic control unit communicatively coupled to the printing head position control assembly, the electronic control unit is configured to:
      cause select ones of the plurality of jet nozzles to dispense one or more drops of binder while the printing head traverses a first pass trajectory along the longitudinal axis in a first direction,
      index the printing head to a second pass trajectory along the latitudinal axis by an index distance greater than zero and less than the jet-spacing, and
      cause select ones of the plurality of jet nozzles to dispense one or more drops of binder while the printing head traverses the second pass trajectory along the longitudinal axis in a second direction opposite the first direction;
   wherein:
      the printing head includes a plurality of print head rows comprising a set of the plurality of print heads of the plurality of print heads, and each print head of the plurality of print head rows includes the plurality of jet nozzles;
      the printing head is sized and shaped to slidably receive the plurality of print heads therein;
      the plurality of print heads are configured to slidably translate within the plurality of print head rows, respectively, in a transverse direction relative to the working axis;
      each print head of the plurality of print heads includes a coupling feature attached thereto, wherein the coupling feature of each print head of the plurality of print heads in the plurality of print head rows is further attached to an actuator; and
      the actuator attached to the coupling feature is configured to move a respective one of the plurality of print heads of a first print head row and/or a second print head row upon an actuation of the actuator caused by execution, with the electronic control unit, of computer readable and executable instructions stored in a non-transitory memory of the electronic control unit.

2. The manufacturing apparatus of claim 1, wherein multiple drops of binder are dispensed within a pixel defining a 2-dimensional spatial portion of a layer of build material traversed by the printing head.

3. The manufacturing apparatus of claim 2, wherein the multiple drops of binder dispensed within the pixel vary in drop volume.

4. The manufacturing apparatus of claim 2, wherein the multiple drops of binder dispensed within the pixel vary in drop volume and location within the pixel.

5. The manufacturing apparatus of claim 1, wherein a total amount of binder predefined for dispensing within a pixel is dispensed in fractions of the total amount of binder over at least two passes of the printing head.

6. The manufacturing apparatus of claim 1, wherein the index distance is one-half the jet-spacing.

7. The manufacturing apparatus of claim 1, wherein the index distance is an integer multiple of a fractional value of the jet-spacing.

8. The manufacturing apparatus of claim 1, wherein the first print head row comprises the set of the plurality of print heads sequentially spaced apart from one another in a direction transverse to the working axis; and,
   wherein a first actuator coupled to a first print head of the plurality of print heads is configured to move the first print head along the latitudinal axis.

9. The manufacturing apparatus of claim 8, wherein the electronic control unit is further configured to:
   index one or more of the plurality of print heads to the second pass trajectory along the latitudinal axis by an index distance greater than zero and less than the jet-spacing.

10. The manufacturing apparatus of claim 8, wherein the actuator is one of a plurality of actuators, wherein each actuator of the plurality of actuators is coupled to a print head of the plurality of print heads.

11. A manufacturing apparatus, comprising:
a printing head comprises a plurality of print heads comprising a plurality of jet nozzles spaced apart from one another in a direction transverse to a longitudinal axis, which is a working axis of the manufacturing apparatus, wherein a distance from a first jet nozzle to a second jet nozzle positioned adjacent the first jet nozzle of the plurality of jet nozzles defines a jet-spacing;
a printing head position control assembly comprising a first actuator assembly configured to move the printing head along the longitudinal axis and a second actuator assembly configured to move the printing head along a latitudinal axis; and
an electronic control unit communicatively coupled to the printing head position control assembly, the electronic control unit is configured to:
cause select ones of the plurality of jet nozzles to dispense one or more drops of binder to a powder layer in a deposition pattern defined by a slicing engine as the printing head traverses along the longitudinal axis applying binder, wherein the first jet nozzle of the plurality of jet nozzles corresponds to a first trajectory assigned by the slicing engine,
index the printing head by an index distance along the latitudinal axis such that the first jet nozzle corresponds to a second pass trajectory and another jet nozzle corresponds to the first trajectory assigned by the slicing engine, and
cause the indexed printing head to traverse along the longitudinal axis and apply binder to the powder layer in the deposition pattern defined by the slicing engine;
wherein:
the printing head includes a plurality of print head rows comprising a set of the plurality of print heads of the plurality of print heads, and each print head of the plurality of print head rows includes the plurality of jet nozzles;
the printing head is sized and shaped to slidably receive the plurality of print heads therein;
the plurality of print heads are configured to slidably translate within the plurality of print head rows, respectively, in a transverse direction relative to the working axis;
each print head of the plurality of print heads includes a coupling feature attached thereto, wherein the coupling feature of each print head of the plurality of print heads in the plurality of print head rows is further attached to an actuator; and
the actuator attached to the coupling feature is configured to move a respective one of the plurality of print heads of a first print head row and/or a second print head row upon an actuation of the actuator caused by execution, with the electronic control unit, of computer readable and executable instructions stored in a non-transitory memory of the electronic control unit.

12. The manufacturing apparatus of claim 11, wherein the step of indexing the printing head along the latitudinal axis occurs between a first pass and a second pass over the same layer of powder.

13. The manufacturing apparatus of claim 11, wherein the step of indexing the printing head along the latitudinal axis occurs between after application of binder to a first layer of powder and before application of binder to a subsequent layer of powder.

14. The manufacturing apparatus of claim 11, further comprising an in situ monitoring system configured to:
determine a malfunction of one or more jet nozzles of the plurality of jet nozzles, and
provide a notification signal to the electronic control unit identifying the one or more malfunctioning jet nozzles.

15. The manufacturing apparatus of claim 14, wherein the electronic control unit is further configured to:
develop one or more indexing commands for indexing the printing head between predefined passes such that a malfunctioning jet nozzle is configured to not traverse the same trajectory during consecutive passes while determined to be in a malfunctioning state.

16. The manufacturing apparatus of claim 14, wherein the electronic control unit is further configured to:
develop a one or more indexing commands for indexing the printing head between predefined passes such that a malfunctioning jet nozzle does not traverse a trajectory defining an edge of the deposition pattern for a printed part.

17. The manufacturing apparatus of claim 11, wherein the slicing engine defines at least the predetermined number of layers and the deposition pattern of binder for printing a part.

18. The manufacturing apparatus of claim 11, wherein:
the first print head row comprises the set of the plurality of print heads sequentially spaced apart from one another in a direction transverse to the working axis; and
a first actuator coupled to a first print head of the plurality of print heads is configured to move the first print head along the latitudinal axis.

19. The manufacturing apparatus of claim 18, wherein the electronic control unit is further configured to:
index one or more of the plurality of print heads to the second pass trajectory along the latitudinal axis by an index distance along the latitudinal axis such that the first jet nozzle corresponds to the second pass trajectory and another jet nozzle corresponds to the first trajectory assigned by the slicing engine.

20. The manufacturing apparatus of claim 18, wherein the actuator is one of a plurality of actuators, wherein each actuator of the plurality of actuators is coupled to a print head of the plurality of print heads.

\* \* \* \* \*